United States Patent [19]

Wilson

[11] Patent Number: 5,485,405
[45] Date of Patent: Jan. 16, 1996

[54] INERTIAL ROTATION SENSING APPARATUS AND METHOD

[76] Inventor: S. Edward G. Wilson, 519 West 14 Street, North Vancouver, British Columbia, Canada, V7M 1R1

[21] Appl. No.: 41,059

[22] Filed: Mar. 31, 1993

[51] Int. Cl.$^6$ ............................ G01C 19/08; G01C 19/28
[52] U.S. Cl. ............................................ 364/559; 364/453
[58] Field of Search ........................... 364/559, 453, 364/449; 73/504, 505, 510; 33/318; 324/207.25

[56] References Cited

U.S. PATENT DOCUMENTS

| 3,793,737 | 2/1974 | Alth | 33/300 |
|---|---|---|---|
| 4,192,189 | 3/1980 | Presley | 73/505 |
| 4,269,073 | 5/1981 | McIntyre | 74/5.7 |
| 4,416,066 | 11/1983 | Romacker | 33/318 |
| 4,445,375 | 5/1984 | Wells | 73/504 |
| 4,449,191 | 5/1984 | Mehnert | 364/559 |
| 4,675,820 | 6/1987 | Smith et al. | 364/453 |
| 4,706,389 | 11/1987 | Eisenhammer | 33/318 |
| 5,048,963 | 9/1991 | Ignagni | 356/350 |
| 5,067,084 | 11/1991 | Kau | 73/510 X |
| 5,172,323 | 12/1992 | Schmidt | 364/453 |

OTHER PUBLICATIONS

Davies, E. J., An Experimental and Theoritical Study of Eddy Current Couplings and Brakes, IEEE Transactions on Power Apparatus and Systems, PAS No. 68, Aug. 1963, pp. 401–417.
Singh, A., Theory of Eddy–Current Brakes With Thick Rotating Disc, Proc. IEE, vol. 124, No. 4, Apr. 1977, pp. 373–376.
Udd, E., Fiberoptic VS Ring Laser Gyros: An Assessment of the Technology, LaserFocus/Electro–Optics, Dec. 1985, pp. 64–74.
Venkataratnam, K. and Raju, B. E., Analysis of Eddy–Current Brakes With Nonmagnetic Rotors, Proc. IEE, vol. 124, No. 1, Jan. 1977, pp. 67–71.
Venkataratnam, K. and Kadir, M. S. A., Normalized Force–Speed Curves of Eddy Current Brakes With Ferromagnetic Loss Drums, IEEE Transactions on Power Apparatus and Systems, vol. PAS–104, No. 7, Jul. 1985, pp. 1789–1796.

Primary Examiner—Ellis B. Ramirez
Assistant Examiner—M. Kemper

[57] ABSTRACT

An improved electro-mechanical inertial rotation sensor comprising a rotor which spins at substantially constant speed with respect to an inertial frame of reference. A pickoff generates a signal relating the rotational position of the rotor relative to the apparatus, as a function of time. A phase comparator compares this pickoff signal to a reference signal relating the rotational position of the rotor relative to a fixed orientation in an inertial frame of reference, as a function of time. Changes in phase between the two signals indicate changes in orientation of the apparatus with respect to the inertial frame of reference. In one embodiment, the rotor is driven through an Eddy current coupling and simultaneously braked by an Eddy current brake, in a matched torque drive. To generate an accurate reference signal, the rotations of the rotor with respect to the inertial frame of reference are accurately determined using parallel measurements from a similar rotor, used as a test rotor.

23 Claims, 17 Drawing Sheets

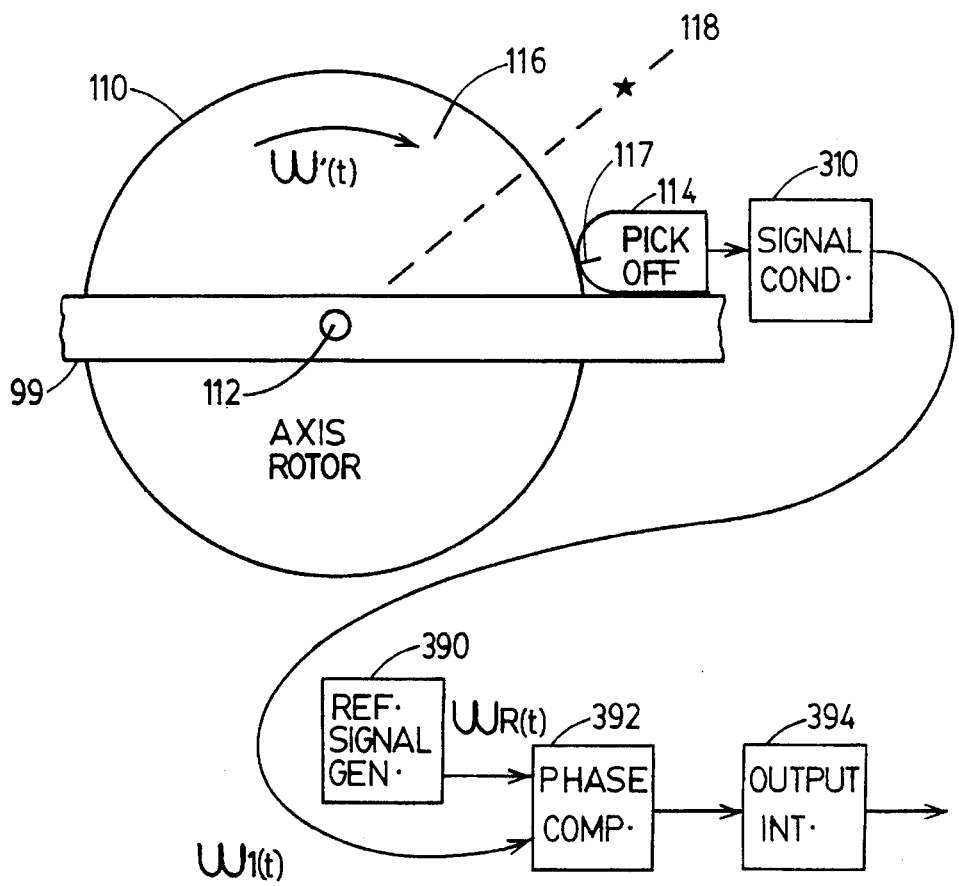
FIG·1
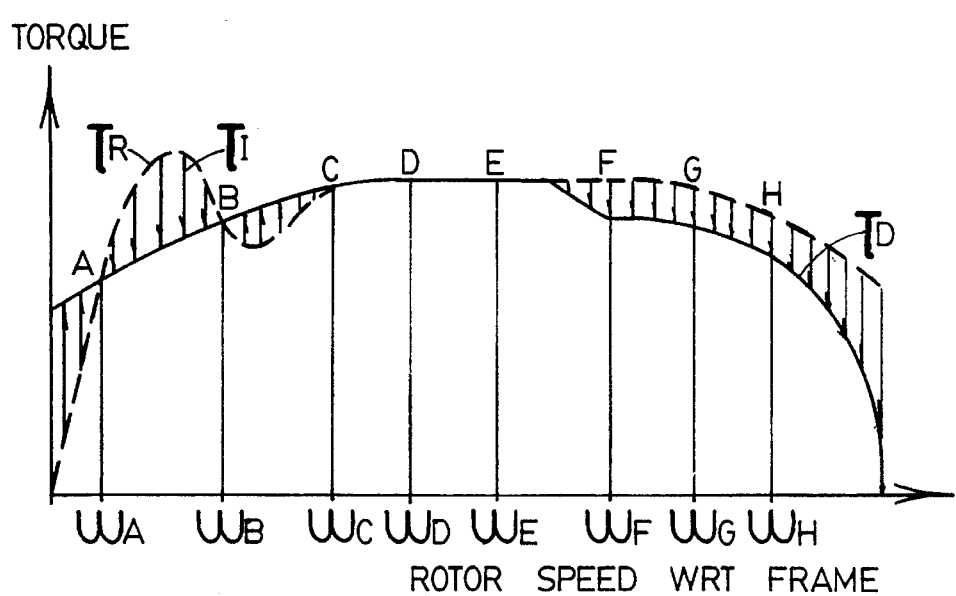
FIG·2A

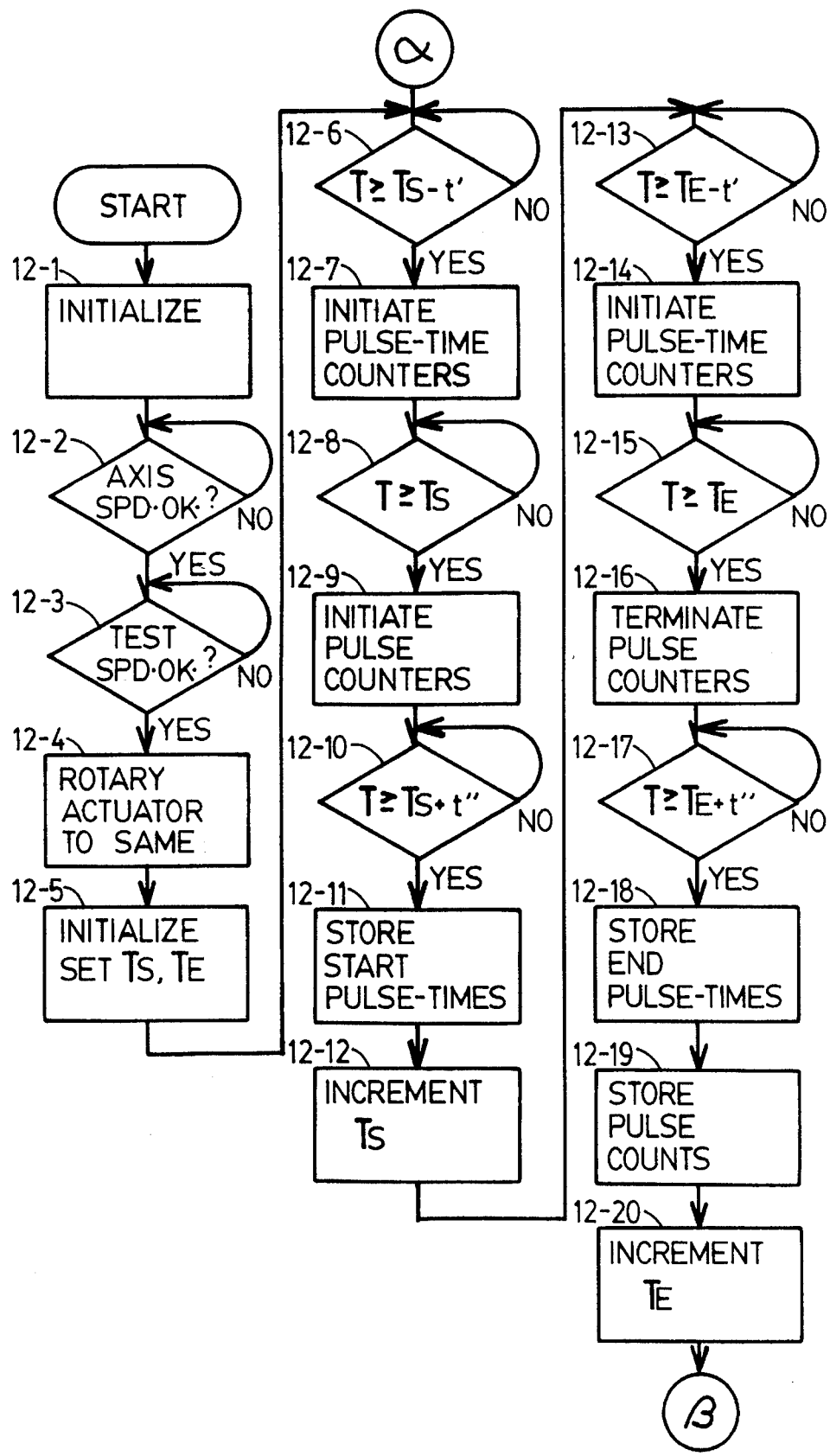
FIG. 12 (PART 1 OF 2)

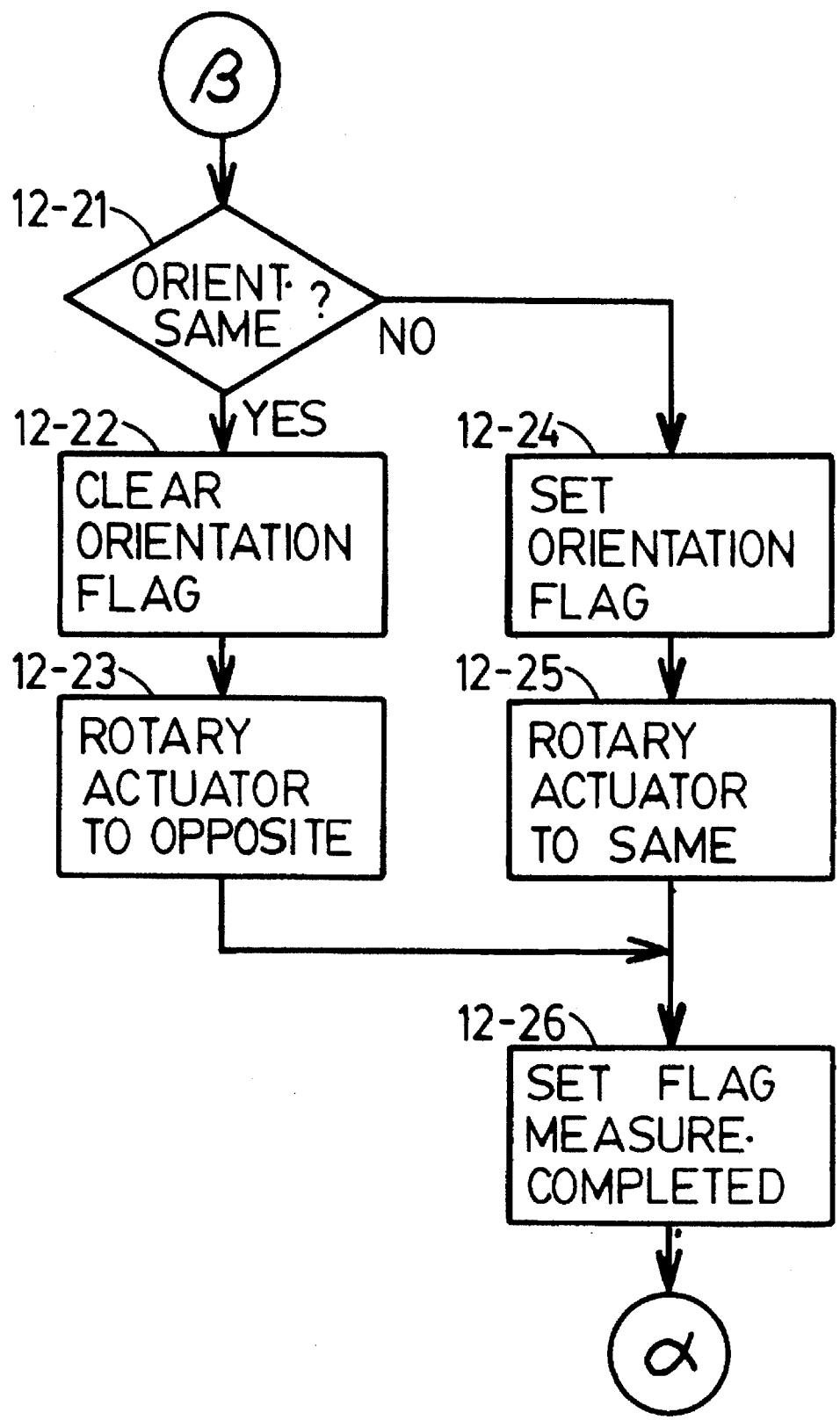
FIG. 12 (PART 2 OF 2)

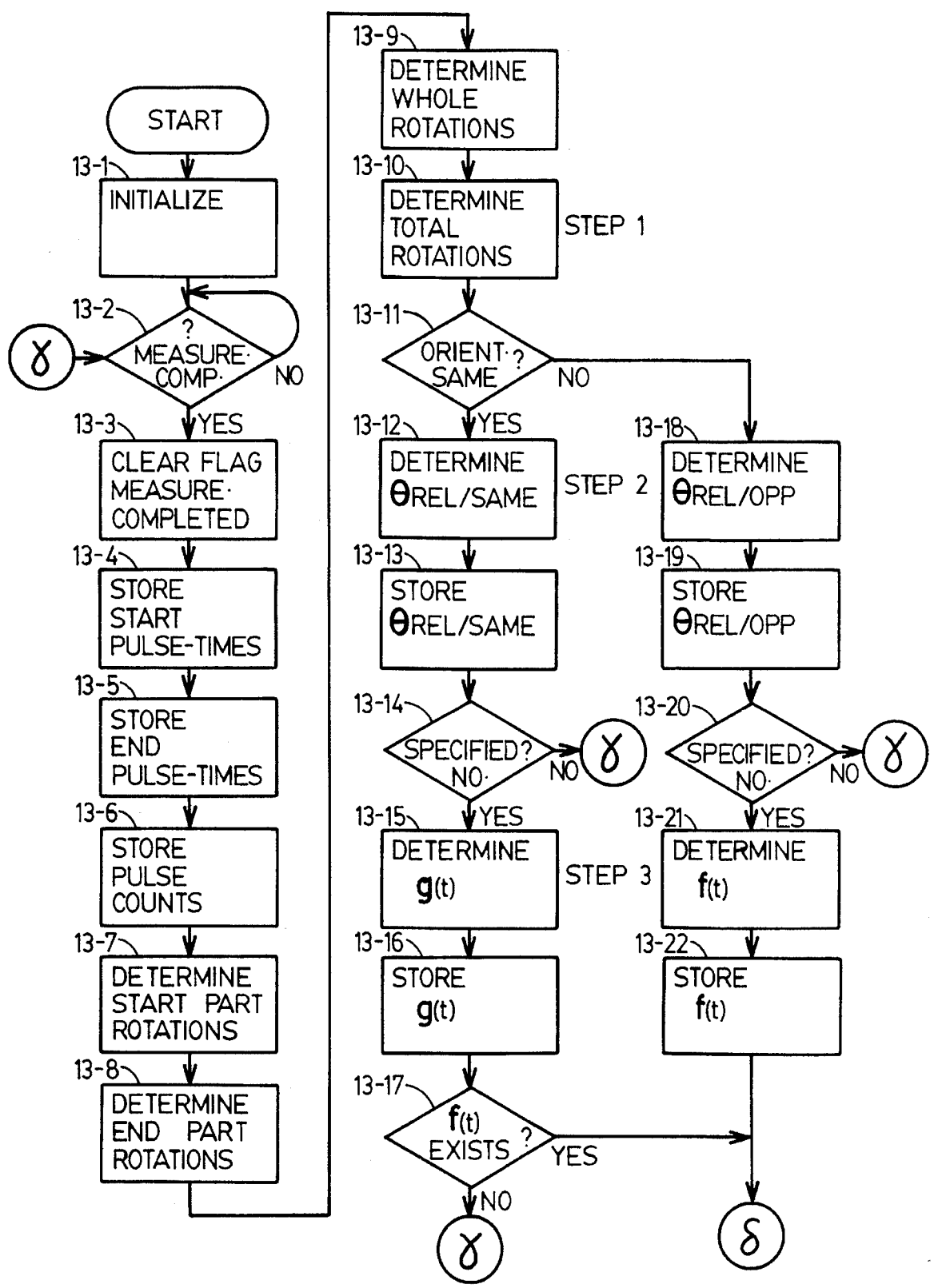
FIG. 13 (PART 1 OF 2)

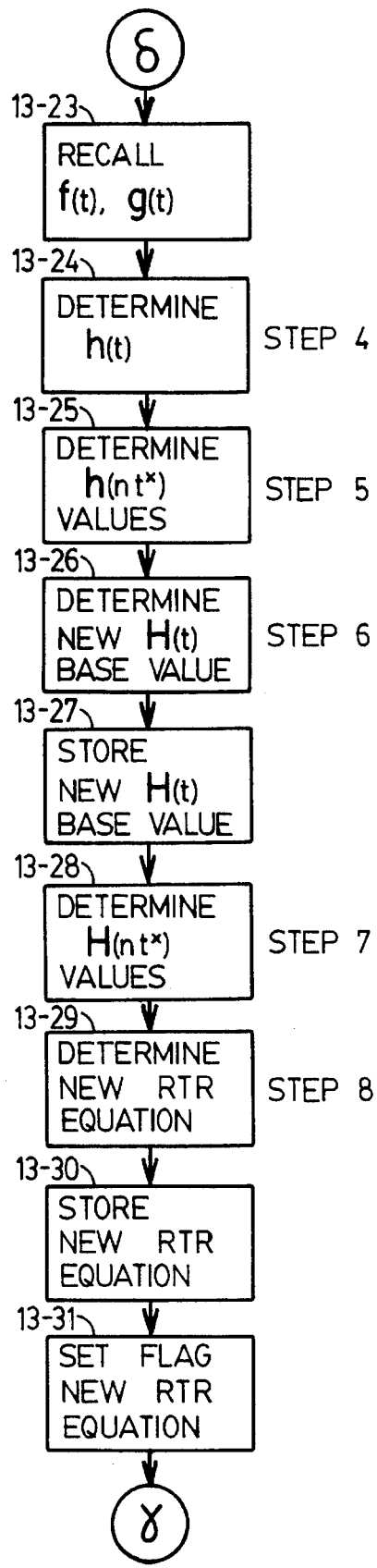
FIG. 13 (PART 2 OF 2)

INERTIAL ROTATION SENSING APPARATUS AND METHOD

FIELD OF THE INVENTION

This invention pertains to inertial rotation sensing apparatus, especially for navigable vehicles such as aircraft and in particular to electromechanical inertial rotation sensors used in attitude and heading reference systems.

BACKGROUND OF THE INVENTION

Inertial rotation sensors, for determining orientation and/or rate-of-turn with respect to an inertial frame of reference, are essential elements of attitude and heading reference systems used by navigable vehicles such as aircraft. (Hereafter, the expressions "with respect to" and "inertial frame of reference" are respectively abbreviated "WRT" and "IFR".) Since the beginning of this century, such determinations have typically been made using spinning mass gyroscopes. Progress in that art has resulted in many refinements and the development of various types of gyroscopes suited to specific applications. There now exists a large body of art related to them.

In spite of progress in the art of spinning mass gyroscopes, many limitations and problems still exist, and are particularly acute in applications requiring high accuracy. More specifically, these limitations and problems include: limited dynamic range (including limitations due to hysteresis and limited ability to measure high rates of rotation); slow reaction time; limited reliability (including susceptibility to shock damage); and, high cost (due to careful clean room assembly of precision complex machined components, etc.). These limitations, and others, are well known to those skilled in the art. See for example, Udd, E., 1985: "Fiberoptic vs Ring Laser Gyros: an Assessment of the Technology", Laser Focus/Electro-Optics December 1985, pp. 64–74.; and U.S. Pat. No. 4,675,820 issued Jun. 23, 1987 for an invention of Smith et al entitled "Inertial Reference System".

The above noted problems with spinning mass gyroscopes have in recent years prompted research and development of alternative forms of inertial rotation sensors. Such alternatives have included: devices exploiting the momentum of fluid streams; devices exploiting inertial forces acting on vibrating members; and, devices exploiting the tendency of various forms of waves to maintain their speed WRT an IFR. Generally, with the notable exception of 'optical gyroscopes' which exploit the 'Sagnac effect', these alternatives to spinning mass gyroscopes have limited capabilities, especially in applications requiring high accuracy.

Attempts have also been made to exploit the tendency of a rotating mass to continue rotating at a constant rate WRT an IFR irrespective of changes in orientation of the axis of rotation and irrespective of rotations of supporting structure about the axis of rotation: U.S. Pat. No. 3,793,737 issued Feb. 26, 1974 for an invention of Alth entitled "Self-Timed Reaction-Mass Compass", and U.S. Pat. No. 4,706,389 issued Nov. 17, 1987 for an invention of Eisenhammer entitled "Attitude Displacement Measurement Apparatus" exemplify this approach. The present invention also utilizes this approach but implements it in a manner substantially different from the prior art.

As exemplified by the devices of Alth, Eisenhammer, and the present invention, devices exploiting the tendency of a rotating mass to continue rotating, have certain advantages for overcoming problems and limitations of other prior art. For these specific devices, which comprise rotatable masses rotating continuously about axes fixed to the supporting structure, without gimbals or balance assemblies: hysteresis is eliminated because of continuous motion; high rates of rotation are, in principle, readily measurable; reaction time on the order of one rotational period of the rotating mass is, in principle, achievable; and, susceptibility to shock damage and costs are reduced by a simple and robust mechanical configuration.

The devices of Alth and Eisenhammer, utilize pairs of coaxial members which are counter-rotatingly driven with respect to each other. In such a configuration, the friction torques opposing the motions of the two members act in opposite directions and, in principle, cancel each other to eliminate the net external friction torque acting on the pair of members. This configuration also isolates the driving torque from motions of the supporting structure.

U.S. Pat. No. 3,793,737 Alth discloses a device having a pair of coaxial counter-rotating members with each member pierced by a radial slot. Twice during each revolution, the slots line up to reveal positions on a compass card situated below the counter-rotating members and attached to the supporting structure. The positions revealed on the compass card indicate the orientation of the supporting structure. According to Alth, the slots tend to maintain their lined-up positions (WRT an IFR), regardless of motions of the supporting structure.

However, the slots can maintain their lined-up positions WRT an IFR only while the two members maintain precisely equal but opposite speeds of rotation WRT an IFR. If the speeds of the two members differ by any amount, the positions of the lined-up slots will drift in the direction of the faster member. Alth apparently relies on the inertia of the two members and the frictional balance provided by the counter-rotating members configuration but otherwise makes no provision for speed control. Consequently, drift in the lined-up positions of the slots is inevitable. Accordingly, Alth's device lacks the stability required of a precision instrument.

U.S. Pat. No. 4,706,389 Eisenhammer discloses a device having a pair of coaxial counter-rotating blades driven by a motor assembly within a base case. An arrangement of sensors is used for determining the motions of the blades WRT the case. Data-processing apparatus is provided to determine the difference in the speeds of the two blades WRT the case. If the case rotates about the axis of rotation of the blades, the difference in the speeds of the two blades WRT the case will change. The device is therefore sensitive to rate-of-turn of the case about the axis of rotation.

Although not explicitly stated, the effect of this arrangement is to tie the blades to the fluid within the case, through fluid friction. This fluid friction implicitly provides speed control for the blades. Unfortunately, the fluid friction is a function of unpredictable factors including the history of case motions. Because the blades remain frictionally attached to the fluid within the case and, because of their own momentum, they do not immediately follow rotations of the case. Therefore, changes in the speeds of the blades WRT the case can be used to determine changes in the rate-of-turn of the case WRT the IFR.

Eisenhammer does not provide a means for discriminating between slow changes in the speeds of the blades and slow drift in the orientation of the device. Thus, Eisenhammer's device also lacks the stability required of a precision instrument.

As described above, prior art devices which exploit the tendency of a spinning mass to continue spinning at a constant rate WRT an IFR, in order to overcome problems and limitations associated with other prior art, are known. However, it is evident that there remains a need for a better sensor which additionally provides stability and precision. The present invention provides stability and precision through implementing the approach in a manner substantially different from the prior art.

SUMMARY OF THE INVENTION

The apparatus of the invention comprises an axis rotor which is made to rotate at substantially constant speed WRT an IFR about an axis fixed WRT a support frame (or body or carrying vehicle or other supporting structure) whose orientation WRT the IFR about that axis is to be determined. A pickoff generates a pickoff signal representing the rotational position of a predetermined point on the axis rotor relative to a predetermined point fixed WRT the frame, as a function of time. This pickoff signal is compared to a reference signal representing the rotational position of the predetermined point on the axis rotor relative to a predetermined point fixed WRT the IFR, as a function of time. From a comparison of the two signals, an orientation signal is generated to represent the rotational position or orientation, about the rotor axis, of the predetermined point on the frame relative to the predetermined point fixed WRT the IFR, as a function of time. The orientation signal thus represents the orientation of the frame WRT the IFR.

Note that components of the apparatus are illustrated and described as being attached to a support frame which may in turn be attached to a body or carrying vehicle or other supporting structure. Although such an arrangement has many advantages in a practical device, and here provides for convenience of description, in principle the components could be attached directly to the body or carrying vehicle or other supporting structure. Thus, references to positions or motions of or measurements made WRT the support frame, equivalently indicate positions or motions of or measurements made WRT the body or carrying vehicle or other supporting structure, and vice-versa.

In the preferred embodiment, the axis rotor pickoff signal is a pulse stream, wherein each pulse indicates one pass of the predetermined point on the axis rotor past the predetermined point on the frame. The reference signal is also a pulse stream wherein each pulse indicates one pass of the predetermined point on the axis rotor past the predetermined point fixed WRT the IFR. The axis rotor pickoff pulse stream and the reference pulse stream are compared by a phase comparator.

If the orientation of the frame WRT an IFR does not change, the phase relationship between the two pulse streams also does not change. If the orientation of the frame WRT an IFR changes about the spin axis of the rotor, the phase relationship changes by an equal amount. If the orientation of the frame changes about an axis orthogonal to the spin axis, the phase relationship between the two pulse streams again does not change. In summary, the phase relationship between the pulse streams is directly sensitive to the orientation of the frame WRT an IFR about the rotor spin axis, but insensitive to orientation about orthogonal axes. The phase relationship is determined by the phase comparator which generates a corresponding signal representing the orientation of the frame WRT the IFR, about the rotor's axis of rotation.

The axis rotor is made to rotate at substantially constant speed WRT the IFR using suitable rotational drive means. In the preferred embodiment, the rotor is driven through an Eddy current coupling and simultaneously braked by an Eddy current brake, wherein the driving and braking torque-speed curves are matched (coincident or parallel) over a useful speed range. In this Eddy current matched torque drive, the braking torque is controllably varied, using a rotor speed feedback control system whereby the rotor speed is maintained substantially constant WRT the IFR. Other ways of producing constant or substantially constant axis rotor speeds are also possible. One way is to pair the axis rotor with a second, coaxial counter-rotating member wherein the two members drive each other in opposite directions about their common axis. Such configurations are described by Alth and Eisenhammer, as discussed previously. Another way is for the rotational drive means to comprise centrifugal force sensing apparatus for rotor speed control. And yet another way is to simply let the axis rotor freewheel from a suitable initial rate.

But whatever rotational drive means is used, it is necessary to have accurate information about the motion of the axis rotor WRT an IFR, in order to produce the reference signal. (Note that because the rotor is continuously in motion, a reference to rotor motion generally indicates rotor position as a function of time.) Information about rotor motion or position is determined using reference signal means, as a predefined estimate, or obtained on an on-going periodic basis. In one embodiment, rotor motion WRT an IFR is determined using an optical rotation sensor.

In the preferred embodiment, rotations of the axis rotor WRT an IFR, as a function of time, are determined using data generated by the axis rotor and by a separate test rotor which is essentially identical to the axis rotor. The axis rotor is mounted with its axis of rotation fixed WRT the support frame. The test rotor, on the other hand, is mounted with its axis of rotation fixed WRT a pivot assembly which may be moved WRT the support frame. A rotary actuator is connected to the pivot assembly. On demand, the rotary actuator moves the pivot assembly between a first position and a second position, or vice-versa, or holds it at one of these two positions. At the first position, the axes of the axis rotor and the test rotor are parallel and the rotors rotate in the same direction: at the second position, the axes of the axis rotor and the test rotor are parallel and the rotors rotate in opposite directions.

During operation of the apparatus, the test rotor is held alternately at the two positions for time periods of preset duration. During a given time period, rotations of both the axis rotor and the test rotor, WRT the frame, are determined. From these rotations WRT the frame, rotations of the axis and test rotors WRT each other are determined. From rotations of the axis and test rotors WRT each other, at both first and second positions of the test rotor, rotations of the axis rotor WRT an IFR are determined. Rotations of the axis rotor are projected into the future on a continuing basis and used to produce the reference pulse stream.

The basic method by which rotations of the axis rotor relative to the test rotor are used to determine rotations of the axis rotor WRT an IFR can be simply summarized thus: For the two rotors, determine relative rotations, for both same and opposite directions of rotation, about parallel axes. Through interpolation and/or extrapolation, determine same and opposite relative rotations, for a same time period. The rotations of the axis rotor WRT the IFR during the time period is equal to half the sum of the relative rotations. The interpolation and/or extrapolation is predicated on the substantially constant speeds of the rotors WRT the IFR.

In a second mode of operation, the basic method is applied to determining the motion of the frame (or body or carrying vehicle or other supporting structure) when the frame itself has substantially constant speed WRT an IFR. In this mode, only a test rotor, or only a test rotor output, is used. Potential applications of this second mode include determination of the Earth's rotation vector for vehicle navigation, or for surveying purposes.

The apparatus described is for single axis orientation determinations. Three single axis orientation determinations, for three orthogonal axes, can be combined to determine the orientation or motion of the frame (or body or carrying vehicle or other supporting structure) in three dimensional space.

BRIEF DESCRIPTION OF THE DRAWINGS

FIG. 1 is a partly schematic and partly block diagram representation of apparatus for real time orientation determination.

FIG. 2A is a graphical representation of hypothetical driving and retarding torque-speed curves.

FIG. 12 is a logic flow diagram illustrating sequential steps for measurements control.

FIG. 13 is a logic flow diagram illustrating sequential steps to produce an RTR Equation.

DETAILED DESCRIPTION OF THE PREFERRED EMBODIMENT

1. Real Time Orientation Determination

Figure 2B:
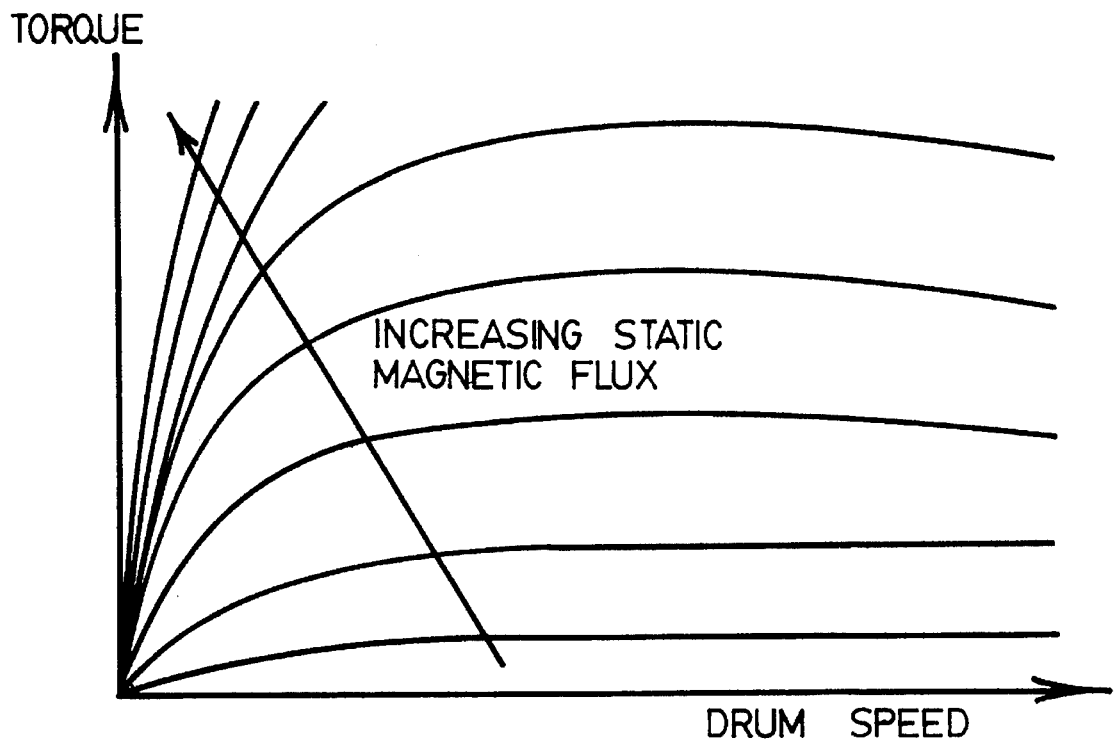
FIG. 2B is a graphical representation of torque-speed curves for Lundell type Eddy current couplings.

FIG. 1 is a simplified schematic and functional block diagram representation of apparatus for determining orientation of a support frame (or body or carrying vehicle or other supporting structure) WRT an IFR, about an axis fixed WRT the frame, in 'real time' (that is, in present, immediate time).

The apparatus represented in FIG. 1 comprises a support frame 99, a "first rotatable member" namely axis rotor 110, a "first relative position detector means" namely axis rotor pickoff 114, a signal conditioner 310, a reference signal generator 390, a phase comparator 392, and an output interface 394.

The term "rotatable member" is used in this description of the invention to indicate members which embody characteristics suitable for use as rotating inertial masses, such as flywheels, rotors, or gyroscope wheels. These characteristics are well-known to those skilled in the art.

In operation, a "first rotational drive means" (not shown, but which could for example be a matched torque rotor drive such as described later) initiates and maintains rotation of axis rotor 110, about its axis of rotation 112 substantially independently of motion of the support frame and at a speed which is substantially constant WRT an IFR and substantially greater than rotational speeds of the frame. (For example, the axis rotor speed WRT an IFR may be about 100 rev/sec=6000 rev/min.)

Axis rotor pickoff 114 detects the (periodically repeated) rotational position of the axis rotor 110 relative to support frame 99, as a function of time, and produces a "first output signal" namely axis rotor pickoff signal $\omega_1(t)$ representative thereof. Pickoffs of various types are well-known to those skilled in the art. These include: opto-electronic devices such as opto-interrupters, opto-reflectors, and discrete emitter and detector pairs, and electromagnetic devices such as inductive pulse generators and other electrostatic and magnetic sensors.

The axis rotor pickoff 114 is fixed WRT support frame 99 at predetermined point 117. Pickoff 114 produces the axis rotor pickoff signal $\omega_1(t)$ which is a pulse stream wherein each pulse indicates when a predetermined point 116 on the axis rotor is adjacent to the predetermined point 117 on the support frame. Pickoff 114 may, for example, be an opto-interrupter fixed at predetermined point 117, and which detects a slot at predetermined point 116 on the axis rotor. For convenience of illustration, pickoffs are depicted schematically throughout this application.

Signal conditioner 310 converts the raw pulse stream from pickoff 114, into a pulse stream with characteristics suitable for use by downstream components, and transmits this pulse stream to phase comparator 392. The construction and operation of signal conditioners are well-known to those skilled in the art.

"Reference signal means" (described later) are used to determine rotational position of the axis rotor WRT the IFR, as a function of time, and to produce a reference signal $\omega_R(t)$ representative thereof. In the preferred embodiment, these means include the reference signal generator 390 (shown in FIG. 1) which generates the reference signal $\omega_R(t)$ also as a pulse stream wherein each pulse indicates when the predetermined point 116 on the axis rotor is adjacent to an arbitrary reference point 118 which remains, WRT an IFR, at a fixed orientation about axis 112. In other words, reference point 118 has a fixed orientation in a plane orthogonal to axis 112. The true, but not directly determinable, rotational position of axis rotor 110 WRT an IFR, as a function of time, is designated in FIG. 1 and elsewhere by $\omega'(t)$. $\omega'(t)$ is also used to designate, where the context indicates, the true rotational speed of the axis rotor WRT an IFR.

"Comparator means" namely phase comparator 392 compares the pickoff signal $\omega_1(t)$ with the reference signal $\omega_R(t)$, and produces an orientation signal $\phi(t)$. The orientation signal $\phi(t)$ represents, as a function of time, the phase relationship between the two signals. The construction and operation of phase comparators are well-known to those skilled in the art.

The pickoff signal $\omega_1(t)$ represents, as a function of time, the position of point 116 on axis rotor 110 relative to point 117 on support frame 99. The reference signal $\omega_R(t)$ similarly represents, as a function of time, the position of point 116 on axis rotor 110 relative to an arbitrary reference point 118 which is fixed (about axis 112) WRT an IFR. The orientation signal $\phi(t)$ therefore represents, as a function of time, the relative position of point 117 on the frame and point 118 fixed WRT an IFR. Stated in other words, the orientation signal $\phi(t)$ represents the angular displacement between point 117 fixed WRT the frame and point 118 fixed WRT the IFR, or, equivalently, the orientation of the support frame 99 WRT the IFR.

During operation, if the orientation of support frame 99 changes, about axis 112, in the same (or opposite) direction as rotation of axis rotor 110, then pickoff signal $\omega_1(t)$ is delayed (or advanced) relative to reference signal $\omega_R(t)$ which remains constant. Consequently, orientation signal $\phi(t)$, which represents relative phase between the two signals, also changes. The magnitude and direction of change in orientation signal $\phi(t)$ is the same as the magnitude and direction of change in orientation of the frame.

If the orientation of support frame 99 changes, about an axis orthogonal to axis 112, both pickoff signal $\omega_1(t)$ and reference signal $\omega_R(t)$ remain constant. Consequently orientation signal $\phi(t)$ remains constant. Reference point 118, which has a fixed orientation in a plane orthogonal to axis 112, can be visualized as moving with such orthogonal rotations. Reference point 118 typically represents an arbitrary orientation about axis 112 without direct objective significance. And because reference point 118 moves with rotations of the apparatus about orthogonal axes, it generally does not maintain a fixed orientation in three-dimensional space.

Thus, orientation signal $\phi(t)$, responds directly to changes in orientation of the frame about axis 112, but does not respond to changes in orientation about orthogonal axes. Consequently, the apparatus can be characterized as a single axis orientation sensor, whose sensitive axis corresponds to the axis of rotation 112 of axis rotor 110. Every orientation of the frame about this sensitive axis, corresponds to a unique orientation signal $\phi(t)$: every change in orientation of the frame about this sensitive axis, results in a corresponding non-transient change in orientation signal $\phi(t)$.

Phase comparator 392 operates repetitively to determine orientation signal $\phi(t)$ and transmits this signal to output interface 394. Output interface 394 converts orientation signal $\phi(t)$ into a signal with characteristics suitable for further use. The construction and operation of output interfaces are well-known to those skilled in the art.

Generally, in order to determine orientation in three-dimensional space it is necessary to combine the orientation information from a suitable configuration of at least three such single axis orientation sensors. Such combinations of multiple orientation sensors are commonly employed and well-known to those skilled in the art who will readily understand how to adopt this invention for three-dimensional space applications. Orientation changes over time can be monitored and used to determine the angular speed of the frame.

2. Introduction to Rotational Drive Means

The term "first rotational drive means" is used in this description of the invention to indicate means whereby rotation of axis rotor 110, about axis 112, is initiated and maintained, substantially independently of motion of support frame 99 and at a speed $\omega'(t)$ which is substantially constant WRT an IFR and substantially greater than rotational speeds of the frame.

The first rotational drive means must make it possible for the axis rotor to perform its two primary functions: First, the axis rotor functions as an inertial reference: through its inertia and substantially constant rotational speed, it maintains its (periodically repeated) rotational position WRT an IFR, as a function of time. Second, the axis rotor functions as a scanning device: the pickoff signal $\omega_1(t)$ represents the (periodically repeated) rotational position of the axis rotor WRT the frame, as a function of time.

The requirement that the speed of the axis rotor remains substantially constant WRT an IFR, necessarily requires that this speed be substantially independent of random motions of support frame 99. However, it does not necessarily require that the speed remains absolutely constant, nor independent of long-term motions of the frame. In the preferred embodiment, as described later, the rotational position of the axis rotor WRT an IFR, as a function of time, is determined on a continuing periodic basis. For this, it is only necessary that rotor speed remains substantially constant, from one rotation to the next, that is, that any changes in the rotor speed be relatively slow and smooth functions of time.

The requirement that the rotational speed of the axis rotor be substantially greater than rotational speeds of the frame ensures that the axis rotor can properly function as a scanning device, with an adequate sampling rate under operating conditions. (The sampling rate corresponds to the frequency of the pickoff signal $\omega_1(t)$.) If the rotor speed is very much greater than the rotational speed of the frame, then the rotor speed WRT the frame will remain approximately constant in spite of motions of the frame. Consequently, friction torque and other torques which depend on rotor speed WRT the frame, will also remain approximately constant. Another consequence, with practical significance for speed control, is that an average rotor speed WRT the frame will be approximately equal to the constant rotor speed WRT an IFR.

In the preferred embodiment the first rotational drive means takes the form of a matched torque rotor drive, as described following.

3. Eddy Current Matched Torque Drive

With a matched torque rotor drive, the axis rotor 110 is simultaneously subject to driving torque (which tends to accelerate it) and to retarding torque (which tends to decelerate it). (The retarding torque equals friction torque plus braking torque. Friction torque is that due to bearing friction and windage, and depends on the type and configuration of the bearings, the external shape of the rotating components, and other factors. Braking torque is that applied deliberately by some suitable means.) With a matched torque rotor drive, the driving and retarding torque-speed curves are matched (as described following) over a suitable speed range so that rotor speed remains independent of motions of the support frame.

For purposes of illustration, consider FIG. 2A which shows hypothetical curves of driving torque $\tau_D$ and retarding torque $\tau_R$ vs rotor speed WRT the frame. The arrows indicate the magnitude and sense of the net torque or torque imbalance $\tau_I$ between the driving torque $\tau_D$ and the retarding torque $\tau_R$: up arrows indicate a net driving (accelerating) torque; down arrows indicate a net retarding (decelerating) torque.

At a given speed, if the driving torque does not equal the retarding torque, the net torque or torque imbalance $\tau_I$ will accelerate or decelerate the rotor. The rate of acceleration or deceleration of the rotor, $d\omega/dt$, varies directly as the magnitude of the torque imbalance, $\tau_I$, and varies inversely with the inertia of the rotor J, thus:

$$d\omega/dt \propto \tau_I/J \quad (1)$$

The requirement that the speed of the rotor changes only slowly, that is, $d\omega/dt$ remains small, is met by keeping the torque imbalance $\tau_I$ small, and by making the inertia of the rotor J correspondingly large. The requirement that any change in speed of the rotor be smooth is met by ensuring that the torque imbalance $\tau_I$ changes only in a smooth (or small stepwise) manner.

At a given speed, if the driving torque $\tau_D$ equals the retarding torque $\tau_R$, the torque imbalance $\tau_I$ will be 0 and the rotor will be at an equilibrium speed, with no tendency to accelerate or decelerate. Consider the points along the curves in FIG. 2A where the driving torque $\tau_D$ equals the retarding torque $\tau_R$: point A which corresponds to speed $\omega_A$; point B which corresponds to speed $\omega_B$; and all points along the curves between point C which corresponds to speed $\omega_C$ and point E which corresponds to speed $\omega_E$.

Point A is a point of stable equilibrium. If the rotor speed is disturbed to a higher speed WRT the frame, then the torque imbalance (with net retarding torque) will decelerate the rotor back to speed $\omega_A$. If the rotor speed is disturbed to a lower speed WRT the frame, then the torque imbalance (with a net driving torque) will accelerate the rotor back to speed $\omega_A$. If the speed of the rotor WRT the frame varies due to motions of the frame (WRT an IFR) about the axis of rotation, this will be reflected in accelerations and/or decelerations of the rotor. (Because of its inertia, the rotor tends to maintain its speed WRT an IFR. Consequently, variations in motion of the frame, WRT an IFR, lead to variations in the speed of the rotor WRT the frame.)

Point B is a point of unstable equilibrium. If the rotor speed is disturbed to a higher speed WRT the frame, then the torque imbalance (with net driving torque) will accelerate the rotor to even higher speeds. If the rotor speed is disturbed to a lower speed WRT the frame, then the torque imbalance (with net retarding torque) will decelerate the rotor to even lower speeds. If the speed of the rotor WRT the frame is disturbed due to motions of the frame about the axis of rotation, the rotor speed will seek a higher or lower point of equilibrium.

Points between point C and point E are points of astable equilibrium. Consider an arbitrary point D. If the rotor speed is disturbed to a higher speed WRT the frame, the torque imbalance will remain 0, and the rotor will maintain the new speed with no tendency to accelerate to a higher speed or decelerate to a lower speed. Similarly, if the rotor speed is disturbed to a lower speed WRT the frame, the torque imbalance will remain 0, and the rotor will maintain the new speed with no tendency to accelerate to a higher speed or decelerate to a lower speed. If the speed of the rotor WRT the frame is disturbed due to motions of the frame about the axis of rotation, this will not be reflected by accelerations or decelerations of the rotor. Thus, within the region between points C and E, the speed of the rotor is substantially independent of motions of the frame. These comments apply whether the arbitrary point D lies in the constant torque or in the non-constant torque portions of the torque-speed curves. The term "coincident" is used hereafter to indicate a zero torque imbalance over a speed range.

Between point F and point H there is a constant torque imbalance which tends to decelerate the rotor at a constant rate. Consider an arbitrary point G. If the rotor speed is disturbed to a higher speed WRT the frame, the torque imbalance will remain the same and the rotor will experience the same deceleration rate. Similarly, if the rotor speed is disturbed to a lower speed WRT the frame, the torque imbalance will remain the same and the rotor will experience the same deceleration rate. If the speed of the rotor WRT the frame is disturbed due to motions of the frame about the axis of rotation, this will not be reflected in any change to the deceleration rate. Thus, within the region between points F and H, the deceleration of the rotor is substantially independent of motions of the frame. These comments apply whether the arbitrary point G lies in the constant torque or in the non-constant torque portions of the torque-speed curves. Similar comments would apply in the case of a constant torque imbalance which tends to accelerate the rotor at a constant speed. The term "parallel" is used hereafter to indicate a constant torque imbalance over a speed range.

In summary, if the driving and retarding torque-speed curves are matched (coincident or parallel), the motions of the rotor will be unaffected by motions of the support frame. If the torque-speed curves are coincident, the rotor speed will remain constant. If the torque-speed curves are parallel but not coincident, the rotor will be subject to constant acceleration or deceleration.

If the driving and retarding torque-speed curves can be kept matched (coincident or parallel) over a speed range, and the magnitudes of either or both torques can be varied, the rotor speed WRT an IFR can be controlled so that it is maintained substantially constant and unaffected by motions of the support frame. This is the basis of the rotor speed feedback control system for maintaining the speed of the rotor substantially constant WRT an IFR, as described later.

For a matched torque drive, the driving and retarding torques may, in principle, be generated by any of a number of means, provided that a sufficiently close match (coincident or parallel) of the torque-speed curves over a suitable speed range can be obtained. In the preferred embodiment, driving torque is applied through an Eddy current coupling, and braking torque, which is the controllable component of the total retarding torque, is applied using an Eddy current brake.

Eddy current couplings and Eddy current brakes (magnetic dampers) are well-known. For examples, see: Davies, E. J., "An Experimental and Theoretical Study of Eddy Current Couplings and Brakes", IEEE Transactions on Power Apparatus and Systems, PAS No. 68, August 1963, pp. 401–417; Singh, A., "Theory of Eddy Current Brakes With Thick Rotating Disc", Proc IEE, Vol. 124, No. 4, April 1977, pp. 373–376; Venkataratnam, K. and Raju, B. E., "Analysis of Eddy Current Brakes With Nonmagnetic Rotors", Proc. IEE, Vol. 124, No. 1, January 1977, pp. 67–71; and, Venkataratnam, K. and Kadir, M. S. A., "Normalized Force-Speed Curves of Eddy Current Brakes With Ferromagnetic Loss Drums", IEEE Transactions on Power Apparatus and Systems, Vol. PAS-104, No. 7, July 1985, pp. 1789–1796.

For this application, the advantages of Eddy current couplings and brakes include the following: They are capable of operation at high speeds. They are non-contact, with no moving or wearing parts, and therefore have minimal maintenance requirements. They are electrically straight-forward and readily controlled to apply torques as required. They have a flexible configuration easily changed to fit a specific application. And, a wide latitude in parameter selection permits tailoring the apparatus to specific torque and torque-speed requirements.

The distinction between an Eddy current brake and an Eddy current coupling is an arbitrary one, depending on the direction of power flow. The magnitude of the force between a magnet and a relatively moving conductor is a complex function of a number of factors which include: the relative speed of the magnet and the conductor; the configurations of the magnet and conductor, including whether the conductor is in the form of a drum or a disc, and whether the conductor is thick or thin; the characteristics of the conductor material, particularly its conductivity and whether it is ferro-magnetic or non-magnetic; and the magnitude of the static magnetic flux. In the case of an electromagnet, the magnitude of the force depends on the magnitude of the electric current. The applied torque depends on the magnitude of the force and on the radius of application. These various factors are discussed in the references cited and elsewhere.

The torque-speed curves shown in FIG. 2B (from FIG. 11, page 409 of the above-mentioned article by Davies) illustrate typical shapes for Lundell-type Eddy current couplings with electrically excited field windings and ferro-magnetic loss drums. Of special note are the lowest curves, for low field currents (which correspond to low magnitudes of static magnetic flux): in these curves the torque is approximately constant over a wide speed range.

Figure 2C:
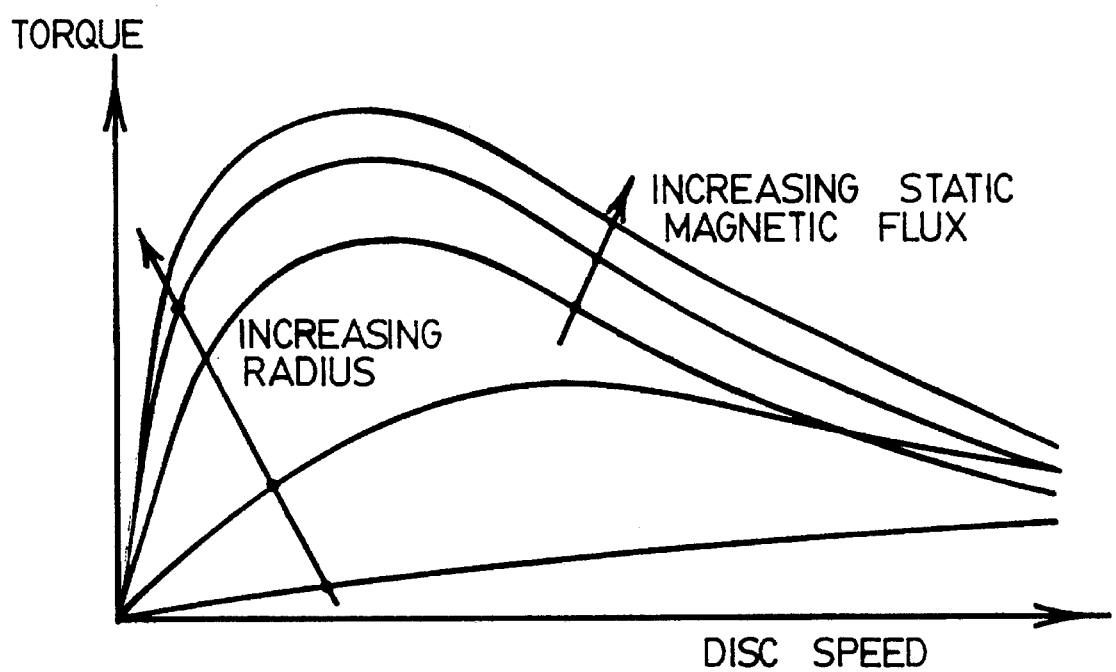
FIG. 2C is a graphical representation of torque-speed curves for non-magnetic disc, caliper type Eddy current brakes.

The torque-speed curves shown in FIG. 2C illustrate typical shapes for a caliper-type Eddy current brake acting on a non-magnetic thin disc. The upper curves are for a fixed radius of force application but varying magnitude of static magnetic flux. The magnitude of the braking torque initially increases almost linearly with speed up to a maximum, and thereafter decreases with increase in speed. The magnitude of the braking torque increases with static magnetic flux which, for an electromagnet, increases with the electric current. See, for example, Venkataratnam et al 1977, FIGS. 3, 6 and 7.

The lower curves in FIG. 2C are for varying radius of force application but a fixed magnitude of static magnetic flux. The braking torque is the product of the braking force and its radius of application. Consequently, for a given configuration and magnetic flux, if the radius of application is reduced by a factor of n, the amplitude of the braking torque curve will be reduced by the same factor n, and, because the relative speed will also be reduced by the same factor n, the curve will be 'stretched' to the right (in FIG. 2C) by the same factor n.

For an Eddy current coupled and braked matched—torque rotor drive, a suitable match (coincident or parallel) of the driving and retarding torque-speed curves over a rotor speed range of interest may be achieved using suitable combinations of Eddy current brake/coupling elements which produce torque-speed curves such as those shown in FIGS. 2B & 2C. These torque-speed curves include a wide variety of characteristics with curves of constant torque and curves of increasing and decreasing torque of varying slope. By combining these, torque-speed curves with desired slope and magnitude can be achieved.

Figure 2D:
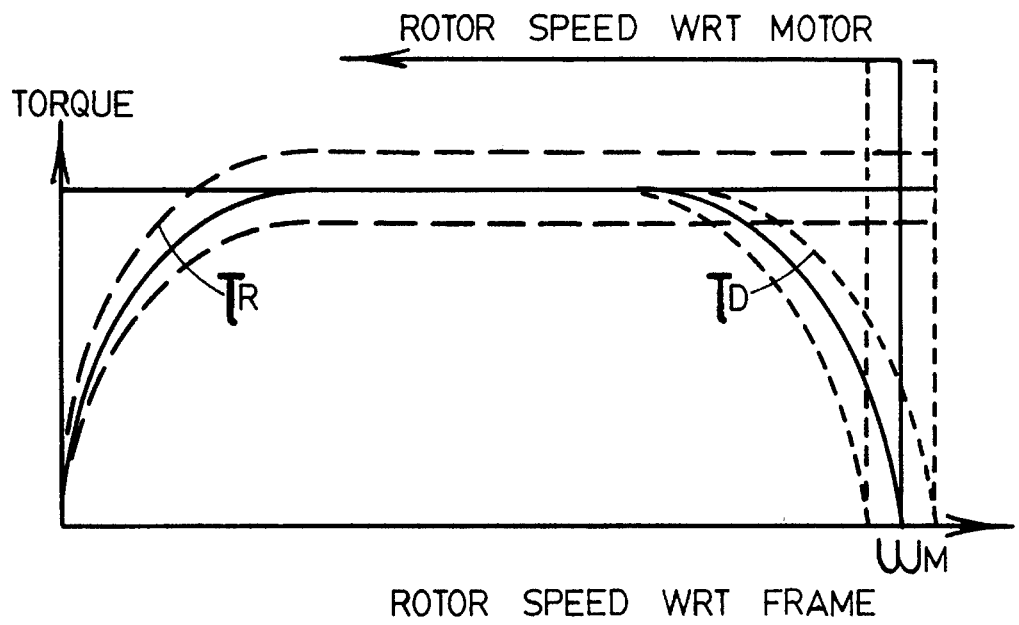
FIG. 2D is a graphical representation of torque-speed curves for an Eddy current matched torque rotor drive.

In the simplest matched torque configuration, both the driving and retarding torque-speed curves are flat in the region of normal operation. FIG. 2D shows, for purposes of illustration, a simple combination of curves with flat portions. These curves have the shape of the lower curves in FIG. 2B, for apparatus with ferro-magnetic loss drums and low levels of static magnetic flux. Note that while FIG. 2D shows a wide region (in this case flat) where the driving and retarding torque-speed curves are matched (coincident or parallel), it is generally necessary that such a region be only relatively narrow. The required width of the region where the driving and retarding torque-speed curves are matched is governed by the expected motions of the frame during operation.

In FIG. 2D, speed $\omega_m$ is the motor drive speed, that is, the speed of the motor driving the Eddy current coupling. If the drive speed is constant, as would be the case if the drive means were, for example, a synchronous electric motor, then the driving torque-speed curve will remain fixed WRT the frame, as indicated by the solid line. If the motor drive speed is not constant, but varies within a range, then the driving torque-speed curve will also vary, as indicated by the dashed lines.

One advantage of a flat torque-speed curve in the matched torque region is that minor variations in motor speed WRT the frame do not disturb the torque balance. This permits a broader selection of drive means to include non-constant speed motors like fluid drives (such as air drive motors) and non-synchronous electric motors (such as A.C. inductive motors). More generally, the torque-speed curves in the matched torque region will not be flat and driving torque will be sensitive to variations in motor speed. In such cases it is necessary to use a motor with constant speed WRT the frame such as an unexcited synchronous electric motor (which combines synchronous drive speed with the simplicity and low maintenance of no slip rings). In operation the drive motor must operate continuously at a speed or speeds somewhat greater than rotor operating speed (for example, 6000 rev/min). Ideally, the drive motor will have long operating life with low maintenance requirement. Proper selection of motors is well-known to those skilled in the electric motor art and other arts.

In FIG. 2D, the retarding torque-speed curve is the mirror image of the driving torque-speed curve. The dashed curves parallel to the retarding torque-speed curve indicate variations which may be realized by varying the magnitude of the braking torque by varying the current to an electromagnetic Eddy current brake. In the rotor speed-control method described later, such variations are used to govern the speed of the rotor. Note, again, that FIG. 2D is based on rotor speed WRT the frame: the retarding, friction, braking, and driving torques are all functions of speed WRT the frame.

Figure 3:
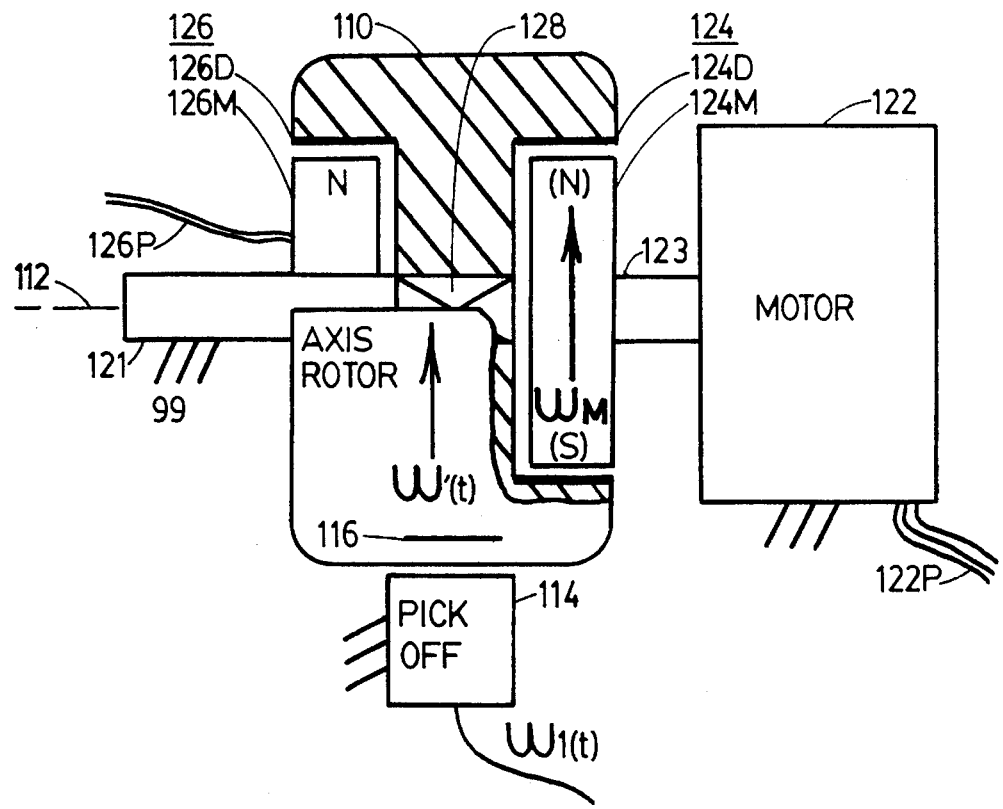
FIG. 3 is a schematic section view representation of an Eddy current matched torque rotor drive.

FIG. 3 is a schematic section view representation of an Eddy current matched torque rotor drive, comprising: axis rotor 110, central support shaft 121, drive motor 122, shaft 123, Eddy current coupling 124 (further comprising rotating magnet array 124M and loss drum 124D), Eddy current brake 126 (further comprising stationary magnet array 126M and loss drum 126D), and support bearing 128. Central support shaft 121 and drive motor 122 are fixed to support frame 99. Pickoff 114 is also fixed to support frame 99. Axis rotor 110 is mounted on support bearing 128 for rotation about shaft 121 and axis 112.

In operation, axis rotor 110 is driven by drive motor 122, through Eddy current coupling 124, and simultaneously braked by Eddy current brake 126. More specifically, drive motor 122 is energized by A.C. power supplied through power supply lines 122P from power supply 400. Drive motor 122 drives rotating magnet array 124M through shaft 123 at motor drive speed $\omega_m$. Rotating magnet array 124M exerts a torque on loss drum 124D, causing axis rotor 110, which is free to rotate on support bearing 128, to also rotate. Simultaneously, stationary magnet array 126M exerts an opposing braking torque on loss drum 126D. The result is that the rotor rotates at some speed intermediate between 0 and $\omega_m$.

Eddy current coupling 124 comprises rotating magnet array 124M and loss drum 124D. Rotating magnet array 124M comprises a permanent magnet, which provides magnetic flux without need for external excitation, slip rings, etc. The '(N)' and the '(S)' indicate that, in operation, the magnetic field rotates WRT frame 99, with no fixed position of the magnetic flux. (As an alternative, it is possible to have the rotating magnet array 124M electrically excited, with power supplied through slip rings or mercury-wetted rotating contacts.) Eddy current coupling 124 is configured to have a driving torque-speed curve as illustrated in FIG. 2D. Because of its fixed configuration and use of a permanent magnet, Eddy current coupling 124 provides for a driving torque-speed curve which remains substantially constant throughout all the time that the apparatus is operating.

Eddy current brake 126 comprises stationary magnet array 126M and loss drum 126D. Stationary magnet array 126M comprises an electromagnet which is supplied with D.C. power from power supply 400 through power supply lines 126P. To reduce power consumption, this stationary magnet array may also comprise a permanent magnet, with the electromagnet used for controlling total magnetic flux by being configured to selectively augment or reduce flux from the permanent magnet. The 'N' and the 'S' indicate that, in operation, the magnetic field is fixed WRT support frame 99. Eddy current brake 126 is configured so that braking torque and friction torque combine to produce a retarding torque-speed curve as illustrated in FIG. 2D. Because of its use of an electro-magnet, Eddy current brake 126 provides for retarding torque-speed curves whose magnitudes are controllable while the apparatus is operating. This capability makes control of the rotor speed possible using a suitable rotor speed-control system, as described later.

Note that Eddy current coupling 124 and Eddy current brake 126 are shown only schematically in FIG. 3, without elements or structures required for flux paths or magnetic isolation, or for dissipation of heat generated by slip. Note also that while Eddy current coupling 124 and Eddy current brake 126 are each shown schematically as a simple magnetic array and loss drum, each may be otherwise configured using suitable combinations of Eddy current brake/coupling elements as described previously. An optimum arrangement of these elements will minimize the external friction, with the necessary torque characteristics and magnetic isolation. It will be apparent to one skilled in the art of Eddy current couplings and brakes how to obtain suitable torque-speed curves.

4. Rotor Speed Control

As described above, with matched (coincident or parallel) driving and retarding torque-speed curves, rotor speed is independent of motions of the support frame 99. With parallel driving and retarding torque-speed curves, the rotor experiences a constant torque imbalance which tends to accelerate or decelerate the rotor at a constant rate. With coincident driving and retarding torque-speed curves, the rotor is at an equilibrium, with no tendency to accelerate or decelerate. However, such an equilibrium is not stable. If the driving torque does not exactly equal the retarding torque, then the torque imbalance, however small, will cause the rotor to accelerate (or decelerate) to higher (or lower) speeds. It is difficult to establish a perfect passive torque balance, and even an initial torque balance may be upset by drift in parameter values (such as may be due to temperature variations) during operation. A passive torque balance is generally not feasible for continuous normal operation. However, it is feasible to maintain torque balance and a substantially constant rotor speed using an active rotor speed feedback control system whereby the magnitude of the retarding torque corresponds to the speed of the rotor WRT an IFR. The following describes such a rotor speed feedback control system.

Figure 4:
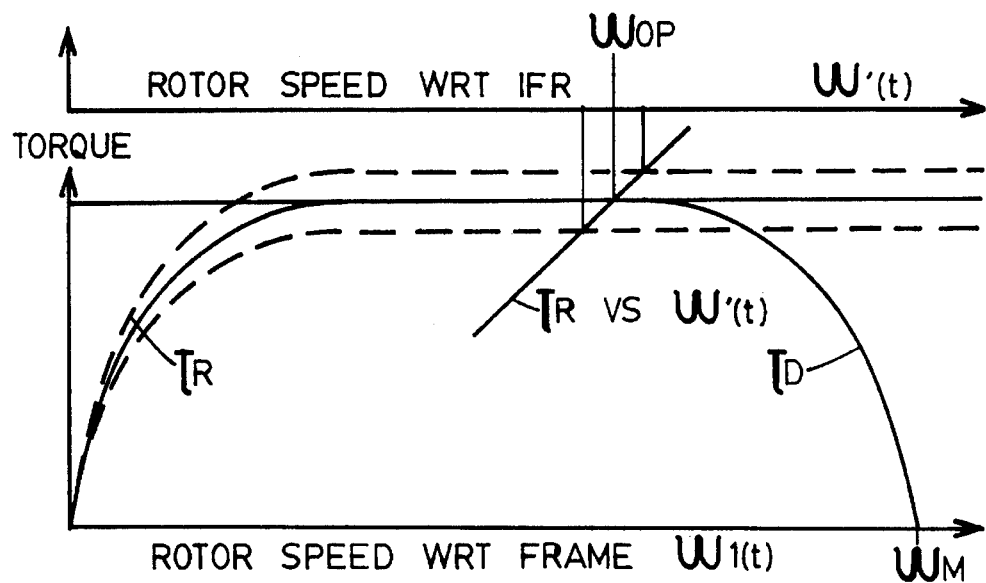
FIG. 4 is a graphical representation of torque-speed curves for an Eddy current matched torque rotor drive with rotor speed control.

FIG. 4 shows driving and retarding torque-speed curves as shown previously in FIG. 2D. FIG. 4 also shows a curve labelled "$\tau_R$ vs $\omega'(t)$" which indicates a correspondence between particular retarding torque-speed curves and particular rotor speeds WRT an IFR. By maintaining such correspondence, with matched torque-speed curves, the rotor speed is kept substantially constant WRT an IFR at operating speed $\omega_{op}$ and independent of frame motions.

If the rotor speed is disturbed to a speed (WRT an IFR) higher than $\omega_{op}$, the retarding torque will be made greater than the driving torque and consequently the torque imbalance will decelerate the rotor toward $\omega_{op}$. Similarly, if the rotor speed is disturbed to a speed (WRT an IFR) lower than $\omega_{op}$, the retarding torque will be made less than the driving torque and consequently the torque imbalance will accelerate the rotor toward $\omega_{op}$.

To maintain the correspondence between particular retarding torque-speed curves and particular rotor speeds WRT an IFR, a feedback control system is used whereby a measure of the rotor speed WRT an IFR is used to control the braking torque. To implement such a feedback control system requires means for controlling either or both the driving and retarding torques. With the Eddy current matched torque rotor drive described previously with reference to FIG. 3, the driving torque $\tau_D$ is essentially fixed. The retarding torque $\tau_R$, on the other hand, is easily controlled, by varying the power to the stationary magnet array 126M, and this in turn varies the braking torque $\tau_B$, the controllable component of the retarding torque.

To implement such a rotor speed feedback control system also requires a measure of rotor speed WRT an IFR. Such a measure may be obtained using appropriate speed determination means. For this purpose, a measure of the axis rotor speed WRT an IFR need only be approximate: it is not necessary to determine the rotor motion with the accuracy required to produce the reference signal $\omega_R(t)$.

For the purpose of rotor speed control, a measure of rotor speed WRT an IFR may be obtained in any of several ways. A few alternative ways are described later. In the method of the preferred embodiment described following, axis rotor speed WRT an IFR is approximated by a running average of rotor speed WRT the frame. Through averaging, the effects of short-term and random movements of the frame are removed. By this method, the speed of the axis rotor is determined without additional sensors and independently of the data-processing to produce the reference signal $\omega_R(t)$ (as described later).

In the preferred embodiment, the rotor speed WRT the IFR is estimated from a low-pass filtered signal representing $\omega_1(t)$ the rotor speed WRT the frame. Such low-pass filtering is roughly equivalent to obtaining a running average. For most applications, average speed of the axis rotor WRT the frame, over even a short time period, is a good approximation to average speed WRT an IFR. This follows because a reasonable rotor speed (for example, 6000 rev/min) is much greater than even maximum frame rotation speeds, for almost all applications, and particularly for ship and aircraft and other manned vehicles applications. (For example, see Udd, E., "Fiberoptic vs Ring Laser Gyros: An Assessment of the Technology", Laser-Focus/Electro-Optics December 1985, pp. 64–74, FIG. 5, p.74.) For such particular applications, the carrying vehicle rarely or never sustains an appreciable rotation rate in the same direction over an appreciable length of time. Even after a relatively long voyage or flight, the total rotational displacement is small, especially along the pitch and roll axes. For example: For an aircraft, during a 1-minute turn, with a rotor speed of 6000 rev/min, the difference between speed WRT the instrument and speed WRT an IFR is only 1 part in 6000. During a typical flight, an aircraft will have less than one rotation about the roll axis or about the pitch axis, and will have only a small number of rotations about the yaw axis, corresponding, perhaps, to time spent in the stack awaiting landing. Assuming 10 rotations about the yaw axis during a flight time of 2 hours, and a rotor speed of 6000 rev/min, the difference between average speed WRT the instrument and speed WRT an IFR is only 1 part in 72,000 (during the entire flight).

Figure 5A:
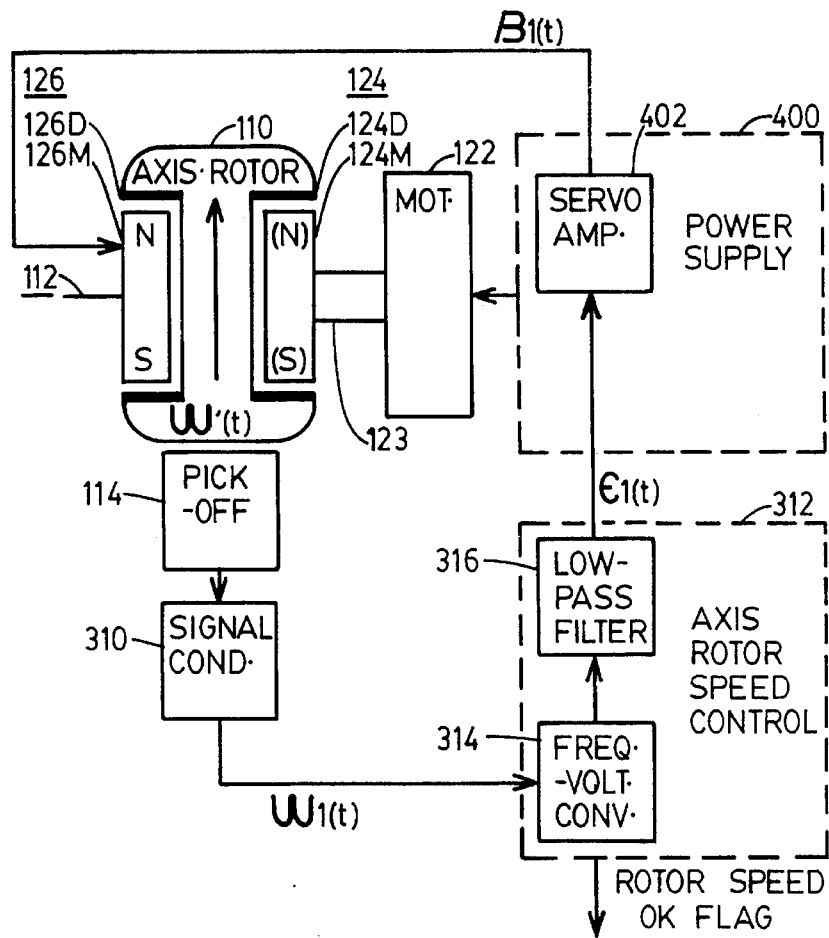
FIG. 5A is a partly schematic and partly block diagram representation of an Eddy current matched torque rotor drive with rotor speed feedback control system.
Figure 5B:
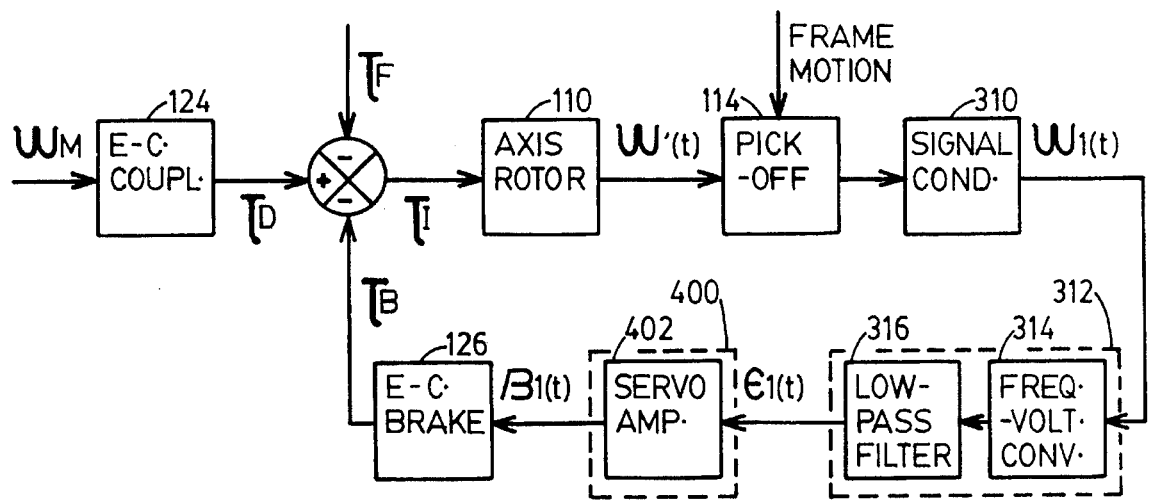
FIG. 5B is a block diagram representation of a rotor speed feedback control system.

FIG. 5A is a partly schematic and partly block diagram representation of the rotor speed feedback control system apparatus of the preferred embodiment, whereby the speed of the axis rotor 110 WRT an IFR is maintained substantially constant and substantially independent of frame motions. FIG. 5B is a block diagram representation of the feedback control system shown in FIG. 5A.

The rotor speed feedback control system shown in FIG. 5A comprises axis rotor 110, drive motor 122, Eddy current coupling 124, Eddy current brake 126, pickoff 114, signal conditioner 310, speed control unit 312 (which further comprises frequency-voltage converter circuit 314 and low-pass filter circuit 316) and power supply 400 (which further comprises servo amplifier circuit 402).

As described previously, power supply 400 provides power to drive motor 122, which applies driving torque to axis rotor 110 through shaft 123 and Eddy current coupling 124. At the same time, power supply 400, and more specifically servo amplifier circuit 402, provides power to Eddy current brake 126 which applies braking torque directly to axis rotor 110. As illustrated in FIG. 4, the driving and retarding torque-speed curves are matched over a range of speeds about $\omega_{op}$, making rotor motion insensitive to motions of the support frame 99.

In operation, pickoff 114 provides the first output signal $\omega_1(t)$, which represents the motion of the axis rotor WRT the support frame 99, through signal conditioner 310 to speed control unit 312. In the speed control unit 312, the frequency-voltage converter circuit 314 converts the frequency of $\omega_1(t)$ into a corresponding voltage signal and the low-pass filter circuit 316 removes all but the low frequency fluctuations in the voltage signal. As indicated in FIG. 5B, the fluctuations are introduced by frame motion at the pickoff 114, which does not maintain a fixed orientation about the rotor WRT an IFR. The output of the low-pass filter circuit 316 is the 'speed signal' $\epsilon_1(t)$ which, as described above, approximates $\omega'(t)$ the speed of axis rotor 110 WRT an IFR.

The speed signal $\epsilon_1(t)$ is transmitted to the power supply 400 where the servo amplifier circuit 402 in turn provides brake power signal $\beta_1(t)$ of a corresponding magnitude to the Eddy current brake stationary magnet 126M. The Eddy current brake 126 applies braking torque $\tau_B$ to the axis rotor 110. The construction and operation of frequency-voltage converter circuits, low-pass filter circuits, and servo amplifier circuits are well-known to those skilled in the art.

In summary, in the feedback loop, the pickoff signal $\omega_1(t)$, which represents the rotor speed WRT the frame, is transformed in speed control 312 into speed signal $\epsilon_1(t)$ representative of $\omega'(t)$ the rotor speed WRT an IFR. The speed signal $\epsilon_1(t)$ is transformed in servo amplifier circuit 402 into brake power signal $\beta_1(t)$ which is supplied to Eddy current brake 126 and energizes it to apply braking torque $\tau_B$ to the axis rotor 110. The axis rotor is also subject to friction torque $\tau_F$ and to driving torque $\tau_D$ which is applied through Eddy current coupling 124. The net torque or torque imbalance $\tau_I$ acts to accelerate or decelerate the axis rotor. The combination of the torques acting on axis rotor 110 is indicated by the summing point shown in FIG. 5B.

The exact correspondence between $\epsilon_1(t)$, which is an approximate representation of $\omega'(t)$ the motion of the axis rotor WRT an IFR, and the retarding torque $\tau_R$, is not crucial. Under operating conditions there may be some slow drift in the driving torque-speed curve and also in the correspondence between $\epsilon_1(t)$ and the retarding torque $\tau_R$. This correspondence must provide for a suitable operating speed $\omega_{op}$ in a speed range where the driving and retarding torque-speed curves are matched (coincident or parallel) for all such operating conditions. Also, this correspondence must be satisfactory for feedback control system purposes. It will be apparent to one skilled in the art of feedback control systems how to implement such a system.

In addition to providing the speed signal $\epsilon_1(t)$, the speed control unit 312 must also provide a rotor speed OK flag signal to indicate to other data-processing apparatus that the rotor speed is suitable for on-going operation of the apparatus. As indicated later, the rotor speed OK flag must be set before other necessary data-processing is first started. The rotor speed OK flag may, for example, be set using a switch which is closed when the speed signal $\epsilon_1(t)$ first reaches a level indicating a suitable rotor speed. Alternatively, the rotor speed OK flag may be set on the simple basis of elapsed time since startup.

The speed control unit 312 may also provide for expediting a quick startup. For example, the braking torque applied by Eddy current brake 126 may be initially withheld by disconnecting the speed signal $\epsilon_1(t)$ input from the power supply 400 until the output of the frequency-voltage converter indicates that the rotor has reached a suitable rotor speed. This would result in maximum initial driving (accelerating) torque to most quickly accelerate the rotor to operating speed. Alternatively, if the stationary magnet array comprised a permanent magnet, the speed control unit might initially provide opposite power to reduce the net magnetic flux. A typical low-pass filter comprises at least one capacitor: startup time could be reduced by pre-charging the capacitor via connection to a suitable voltage source. It will be apparent to one skilled in the art how to implement the apparatus for quick startup.

And it will be clear to one skilled in the art of feedback control systems that many other variations may be made to the system as described above. For example, pickoff 114 and frequency-voltage converter 314 together constitute a tachometer with a voltage output. Other tachometers also exist and some of these could, in principle, be used for this application. One advantage of the system as described is that pickoff 114 is already required for real time orientation measurements.

The speed signal $\epsilon_1(t)$ represents $\omega'(t)$ the speed of the axis rotor WRT an IFR. For rotor speed control, a determination of rotor speed WRT an IFR made by some alternative means may be used as the speed signal $\epsilon_1(t)$. It must, of course, be provided in a suitable form such as a D.C. voltage signal. Alternative ways of determining rotor speed WRT an IFR include the use of centrifugal force sensors or optical rotation sensors as described briefly later.

The alternative ways of determining rotor speed WRT an IFR also include using the computations of rotational motion for producing the reference signal $\omega_R(t)$. This particular alternative has the advantages of high accuracy without requiring additional apparatus (except possibly for data-processing) and essentially complete immunity from motions of the support frame. However, this alternative has a difficulty in that computations are not available immediately at startup. This difficulty can be surmounted by starting the rotor as described above and switching once computed rotor speeds become available. If the determination of rotor speed WRT an IFR is in the form of data obtained from computation, this data can be transformed into a voltage signal using a suitable D/A (digital/analogue) converter.

For rotor speed control, a rougher but simpler alternative to a matched torque rotor drive is to have driving and retarding torque-speed curves cross at a point of stable equilibrium, such as point A in FIG. 2A. With such torque-speed curves, the rotor speed will remain at or near $\omega_A$. With a small relative slope where these curves cross, the change in torque imbalance due to changes in rotor speed WRT the frame may be made small. If this is combined with a sufficiently high rotor inertia, the rotor speed WRT an IFR can be made relatively insensitive to motions of the frame. Such a rotor speed control system has the significant advantage of being passive, and may have useful applications where high accuracy is not crucial.

5. Introduction to Reference Position Determination

The rotational position of the axis rotor 110 WRT an IFR, as a function of time, namely $\omega'(t)$, must be known in order to generate the reference signal $\omega_R(t)$ which represents it. Reference signal means are used to determine $\omega'(t)$, and to produce the reference signal $\omega_R(t)$.

In the preferred embodiment, the reference signal means comprises a test rotor, counters, and computation means (namely one or more microcomputers) which together perform sequences of measurement and computation steps culminating in an 'RTR (Real Time Rotations) equation' which defines rotational position of axis rotor 110 WRT an IFR, as a function of time. Specifically, an RTR equation defines cumulative rotations of the axis rotor WRT an IFR, as a function of time and is so named because it is used to determine rotor position in real time.

The reference signal means also comprises reference signal generator 390 which generates the reference signal using the RTR equation. Specifically, the reference signal generator solves the RTR equation to determine, in advance, each time predetermined point 116 on the axis rotor is adjacent to predetermined reference point 118, and produces a pulse at each of these times. The pulse stream so produced, constitutes the reference signal $\omega_R(t)$ in a form suitable for real-time orientation determination by the apparatus of the preferred embodiment.

The following describes measurement and computation steps to determine the RTR equation. The operation of the reference signal generator 390 is described later.

6. Test Rotor

Figure 6:
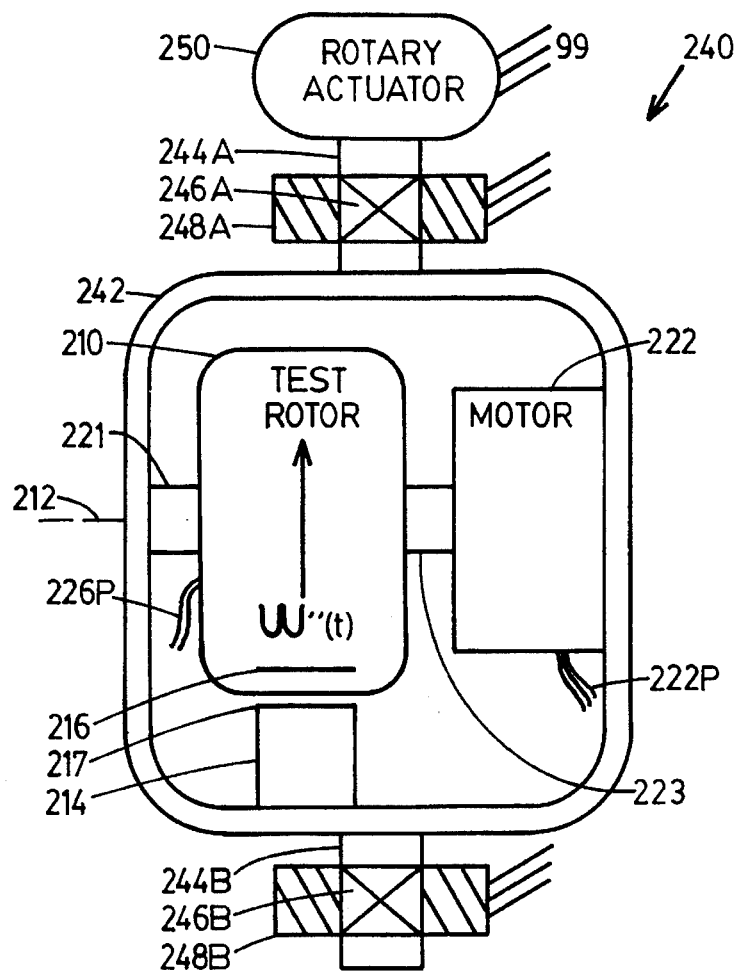
FIG. 6 is a schematic section view representation of a test rotor assembly.

FIG. 6 is a schematic section view representation of a test rotor assembly comprising a "second rotatable member" namely test rotor 210, mounted for rotation in "movable support means" namely pivot assembly 240. A "second rotational drive means" namely an Eddy current matched torque rotor drive, initiates and maintains rotation of test rotor 210 about a "second axis" namely axis of rotation 212 substantially independently of motion of support frame 99 and at substantially constant speed WRT an IFR. The true, but not directly determinable, rotational position of test rotor 210 WRT an IFR, as a function of time, is designated in FIG. 6 and elsewhere by $\omega''(t)$. $\omega''(t)$ is also used to designate, where the context indicates, the true rotational speed of the text rotor WRT and IFR. The construction and operation of the test rotor Eddy current matched torque rotor drive corresponds directly to that for the axis rotor. The test rotor Eddy current matched torque rotor drive comprises test rotor 210, Eddy current coupling 224, and Eddy current brake 226, and further comprises: central support shaft 221; drive motor 222 connected by shaft 223 to rotating magnet array 224M and supplied with A.C. power from power supply 400 through power supply lines 222P; and stationary magnet array 226M supplied with D.C. power from power supply 400 through power supply lines 226P. (Numbered components not shown in FIG. 6 are shown schematically in FIG. 11A.)

Pivot assembly 240 comprises a pivot frame 242, which directly supports central shaft 221 and drive motor 222, and in turn is directly supported by shafts 244A & 244B guided by bearings 246A & 246B, in bearing blocks 248A & 248B, respectively. Rotary actuator 250 rotates and holds pivot assembly 240 as required between a first position and a second position. In the first position, the axis of rotation 212 of test rotor 210 is parallel to the axis of rotation 112 of axis rotor 110, and the two rotors rotate in the same direction: in the second position, the axis of rotation 212 of test rotor 210 is parallel to the axis of rotation 112 of axis rotor 110, and the two rotors rotate in opposite directions.

The rotary actuator 250 may, for example, be a stepping motor which responds to appropriate signals to move between the two positions as required. The rotary actuator may comprise internal stops which define the first and second positions, or external stops (not shown but well-known) may be used. Additionally, the apparatus may comprise a clamping mechanism for securely holding the pivot assembly at the two positions. Rotary actuators, stops and clamps are well-known to those skilled in the electro-mechanical arts.

A "second relative position detector means" namely test rotor pickoff 214 detects the (periodically repeated) rotational position of test rotor 210 WRT pivot frame 242, as a function of time, and produces a "second output signal" namely test rotor pickoff signal $\omega_2(t)$ representative thereof. The test rotor pickoff 214 is fixed WRT pivot frame 242 at a predetermined point 217. Pickoff 214 produces the test rotor pickoff signal $\omega_2(t)$ which is, more specifically, a pulse stream wherein each pulse indicates when a predetermined point 216 on the text rotor is adjacent to the predetermined point 217. (At the first or second positions of the pivot assembly 240, the pivot frame 242 and pickoff 214 are stationary WRT support frame 99. At these positions of the pivot assembly, the rotational positions of the test rotor WRT pivot frame 242, as a function of time, are equivalent to rotational positions of the test rotor WRT support frame 99).

The test rotor provides essential data for determining rotational position of the axis rotor WRT an IFR, as a function of time. Data from the test rotor pickoff signal $\omega_2(t)$ is used in combination with data from the axis rotor pickoff signal $\omega_1(t)$. Data from both of these signals are required from both the first position (same-direction) and from the second position (opposite-direction) of the test rotor. Data from these signals are the raw data for subsequent data-processing, according to analyses described later.

In operation, pivot assembly 240 is rotated and held alternately at the first position for a first time period, and at the second position for a second time period, for a series of such first and second periods. During each time period, the axis rotor pickoff signal $\omega_1(t)$ is monitored, to determine the numbers of rotations of the axis rotor WRT the frame during that time period, and the test rotor pickoff signal $\omega_2(t)$ is also monitored, to determine the numbers of rotations of the test rotor WRT the frame during that same time period. Both the axis rotor pickoff signal $\omega_1(t)$ and the test rotor pickoff signal $\omega_2(t)$ take the form of pulse streams. The monitoring of these signals, to determine the numbers of rotations of the rotors WRT the instrument, takes the form of counting pulses and timing pulses during each time period, according to the analysis described later.

(The axis rotor has a fixed orientation WRT support frame 99 and the axis rotor pickoff signal $\omega_1(t)$ is immediately required for real time orientation determination. The test rotor, on the other hand, has an orientation WRT support frame 99 which is periodically changed and the test rotor pickoff signal $\omega_2(t)$ is not immediately required for real time orientation determination. Otherwise, the construction and continuous operation of the two rotors is identical. In general, therefore, the second rotatable member, the second rotational drive means, the second relative position detector means, and the second output signal may take any one of the forms described previously or subsequently for the first rotatable member, the first rotational drive means, the first relative position detector means, or the first output signal, respectively.)

7. Analysis Introduction

The basic method, which is used for determining the rotational position of the axis rotor WRT an IFR as a function of time, may be used generally for determining the motion WRT an IFR of either or both of a pair of rotating members which maintain substantially constant speed WRT the IFR. This method requires determining the relative motions of the two rotating members. For the present specific application of determining the rotational position of the axis rotor WRT an IFR as a function of time, this method requires determining the relative motions of the axis rotor and test rotor.

In principle, in applying the basic method, these relative motions may be determined directly (WRT each other) or indirectly (each WRT an independent point) and in terms of speeds or rotations (as a function of time). Practically, however, and particularly for application to the preferred embodiment, there are difficulties both in determining relative motions directly and in determining speeds.

One practical difficulty in measuring relative motions directly derives from making motion measurements at low and high relative speeds using the same apparatus: for same direction of rotation measurements, the relative speed may be small: for opposite direction of rotation measurements, the relative speed may be large. (This is primarily a problem if the rotating members have approximately the same speed: this is not a problem if the speed of one rotating member is much greater than the other.) Another difficulty derives from making precise measurements from a rotating member. A related difficulty derives from the need to make relative motion determinations with the rotating members oriented with both same and opposite directions of relative motion. (These latter are primarily problems with two rotating members of 'normal scale', that is, of a typical scale for gyroscope wheels: they may not be problems if at least one member is of relatively large scale.)

Computation difficulties and complication may also arise from determining relative motions in terms of speeds. One complication derives from a need to convert from speeds to rotations. Since a reference pulse is emitted once for each rotation of the axis rotor, at least some of the computations involve rotation. And although this conversion is logically straight-forward, it does introduce a complication.

For the preferred embodiment of orientation sensor for general application, the basic method is applied in a 'primary mode'. Such a primary mode application is suitable for typical situations where the axis and test rotors are of 'normal scale' and the frame may have random motions. In such a primary mode application of the basic method, relative motions of the axis rotor and the test rotor are determined indirectly (each WRT the frame) and in terms of rotations. The difficulties and complications mentioned above are thus avoided.

For the specific purpose of determining the rotational motion of the support frame (or body or carrying vehicle or other supporting structure) WRT an IFR, when the frame itself has substantially constant speed WRT the IFR, the basic method can be usefully applied in a 'secondary mode'. Such a secondary mode application is suitable for situations where the speed of the test rotor is very much greater than the speed of the frame and the scale of the frame is relatively large compared to that of the test rotor. In such a secondary mode application of the basic method, relative motions of the test rotor and the frame are determined directly (WRT each other) and (also) in terms of rotations. The difficulties and complications mentioned above for direct measurements are avoided by the greater speed of the rotor and the greater scale of the frame. (Specific applications of the secondary mode are described later. These include determining orientation of true North-South WRT the frame.)

Comparing the primary and secondary modes: In both modes, relative motions are determined WRT the test rotor which is alternated between same and opposite directions. In the primary mode the motion of the axis rotor, which maintains substantially constant speed WRT an IFR, is determined by indirectly measuring relative motions of the axis rotor and the test rotor. In the secondary mode, the motion of the frame, which maintains substantially constant speed WRT an IFR, is determined by directly measuring relative motions of the frame and the test rotor. Apparatus for employing the primary mode may also employ the secondary mode, with suitable program changes. Alternatively, simpler apparatus employing the secondary mode only may be used.

8. Rotations Determinations

Rotor rotations, of axis rotor 110 and test rotor 210 WRT support frame 99, are the basic data used for computations to determine the rotational position of the axis rotor WRT an IFR, as a function of time. The precision and accuracy of the apparatus depends on the precision and accuracy with which these rotor rotations are determined. The following description applies identically to rotations of axis rotor 110 and test rotor 210 WRT support frame 99.

Rotor rotations are determined over predetermined measurement periods, with arbitrary start and end times. Rotor rotations WRT the frame are indicated by pickoff pulses. More specifically, each pickoff pulse indicates one pass of the predetermined point on the rotor past the predetermined point fixed WRT the frame. Rotor rotations during measurement periods are determined using numbers and times of pickoff pulses obtained from pulse counters and pulse-time counters, respectively, as described later.

The total number of rotor rotations WRT the frame during a measurement period is the sum of: a start part rotation; an integer number of whole rotations; and, an end part rotation. These are illustrated in FIGS. 7A, 7B, 8A & 8B. Occasionally, the start time $T_S$ or the end time $T_E$ may coincide with a pickoff pulse: in such cases the corresponding part rotation is zero.

The integer number of whole rotations equals the number of pickoff pulses during the measurement period, less 1. (The second pickoff pulse indicates completion of the first rotation... the Kth pickoff pulse indicates completion of the K-1 rotation ...) The number of pickoff pulses is determined by counting them in a pulse counter which is enabled for the duration of the measurement period. For example: With a rotor speed of 6000 rev/min, during a measurement period of 1 minute duration there will be 6,000 pickoff pulses, more or less depending on the motion of the frame during this period, corresponding to 5,999 whole rotations of the rotor WRT the frame.

The start and end part rotations are determined from pickoff pulse times by interpolation. These part rotations are determined similarly: for economy of description, the following describes the determination of start part rotations only.

Successive rotor rotations WRT the frame before and after the measurement period start time $T_S$ are indicated by pickoff pulses and represented in FIGS. 7A, 7B, 8A & 8B by ... $\theta_{S-2}, \theta_{S-1}, \theta_{S+1}, \theta_{S+2}$ .... The corresponding times of these pickoff pulses are represented by ... $\theta_{S-2}, \theta_{S-1}, \theta_{S+1}, \theta S+2$ ....

The measurement period start time $T_S$ lies within the time interval between times $T_{S-1}$ and $T_{S+1}$: the corresponding positions of the rotor WRT the frame are as, $\theta_S$. $\theta_{S-1}$ and $\theta_{S+1}$. At $\theta_{S-1}$ at and $\theta_{S+1}$, the predetermined point on the rotor is adjacent to the predetermined point fixed WRT the frame: $\theta_{S-1}$ to $\theta_{S+1}$ indicates 1 rotation of the rotor WRT the frame, during the time interval $T_{S-1}$ to $T_{S+1}$. At $\theta_S$, the predetermined point on the rotor is at some intermediate position WRT the predetermined point fixed WRT the frame. The start part rotation, $\theta_{START-PART}$ is given by:

$$\theta_{START-PART} = (\theta_{S+1} - \theta_S)/(\theta_{S+1} - \theta_{S-1}) \quad (2)$$
$$= (\theta_{S+1} - \theta_S)/1$$
$$= \theta_{S+1} - \theta_S$$

Figure 7A:
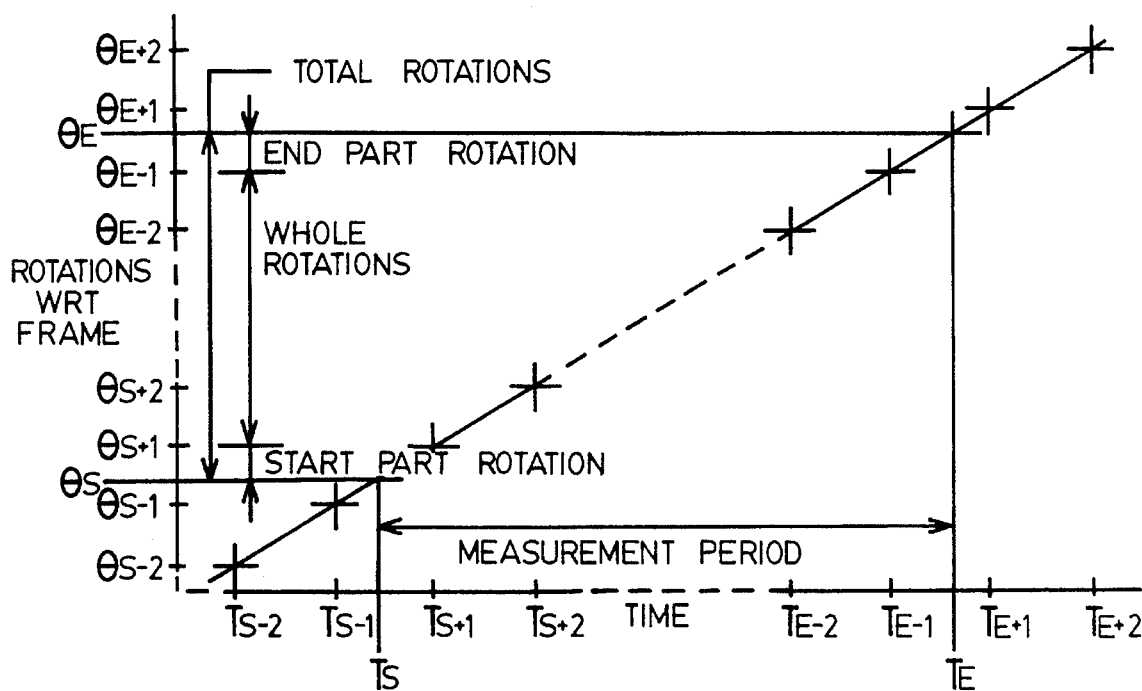
FIGS. 7A and 7B graphical representations of axis rotor rotations (WRT frame) vs time, for linear relative rotations.
Figure 7B:
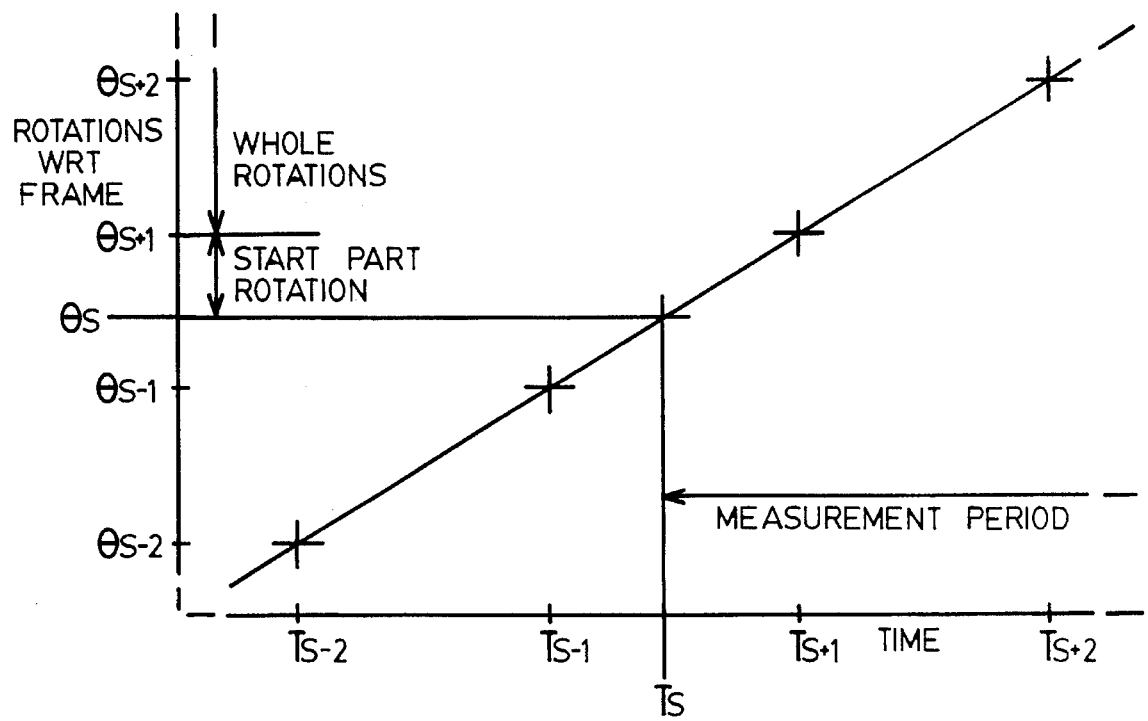

If the speed of the rotor WRT the frame is constant, then the rotor rotations vs time relation will be linear, as in FIGS. 7A & 7B. Such will be the case if, in addition to the speed of the rotor being substantially constant WRT an IFR, the speed of the frame is also substantially constant WRT an IFR during the time interval $T_{S-1}$ to $T_{S+1}$. In this linear case, the start part rotation $\theta_{START-PART}$ can be determined directly from the pickoff pulse-times, through linear interpolation, thus:

$$\theta_{START-PART}=(\theta_{S+1}-\theta_S)/(\theta_{S+1}-\theta_{S-1})=(T_{S+1}-T_S)/(T_{S+1}-T_{S-1}) \quad (3)$$

Each pulse-time, that is, the time of each pickoff pulse, is determined by having the pickoff pulse latch a free-running 'pulse-time counter' whose count represents current time. Each 'pulse-time counter' is fed by timing clock pulses so that its count represents current time at the time of the pulse.

Thus, the pickoff pulse-times ... $T_{S-1}, T_{S+1}, T_{+2}$ ... are determined in terms of timing clock pulses.

For example: with a timing clock frequency of 10 Mhz, and a rotor speed of 6000 rev/min, which corresponds to 1 rotation in 0.01 seconds, there are 100,000 timing clock pulses, more or less depending on the motion of the frame, during a single rotation of the rotor WRT the frame. Consequently, the part rotation may in principle be determined with a precision of approximately 1 part in 100,000. If: $T_{S-1}=1,999,999,971,203$; $T_S=2,000,000,000,000$; and $T_{S+1}=2,000,000,068,472$; the start part rotation $\theta_{START-PART}$ is:

$$\theta_{START-PART} = (T_{S+1} - T_S)/(T_{S+1} - T_{S-1})$$
$$= (2,000,000,068,472 - 2,000,000,000,000)/$$
$$(2,000,000,068,472 - 1,999,999,978,203)$$
$$= 68,472/97,269$$
$$= 0.703,945 \text{ rotations}$$

Figure 8A:
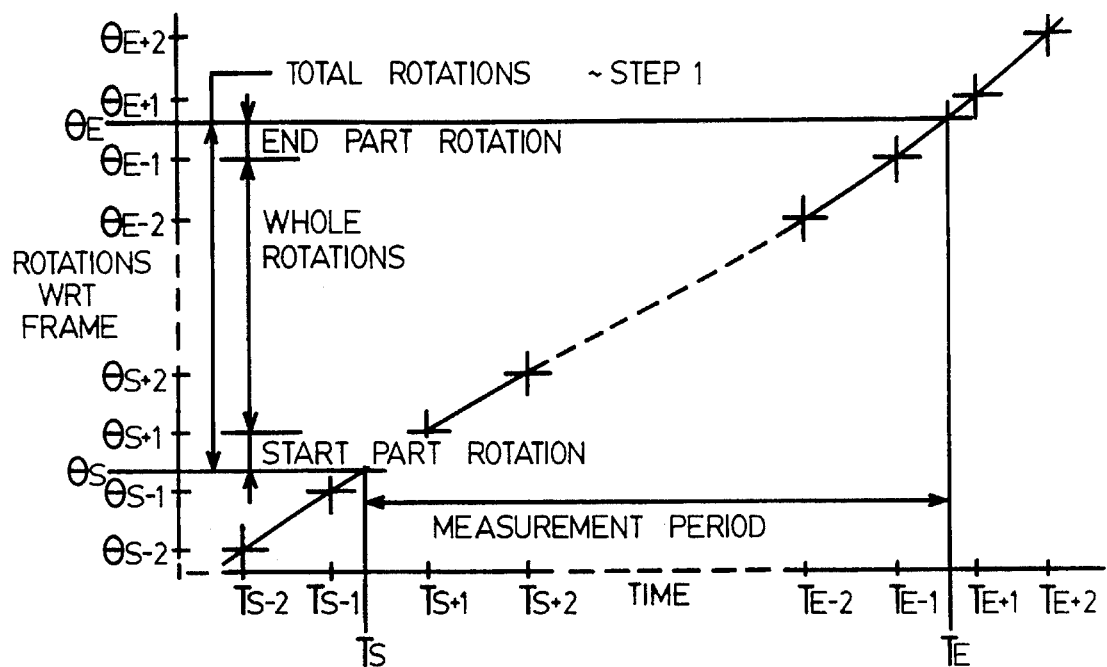
FIGS. 8A and 8B are graphical representations of axis rotor rotations (WRT frame) vs time, for non-linear relative rotations.
Figure 8B:
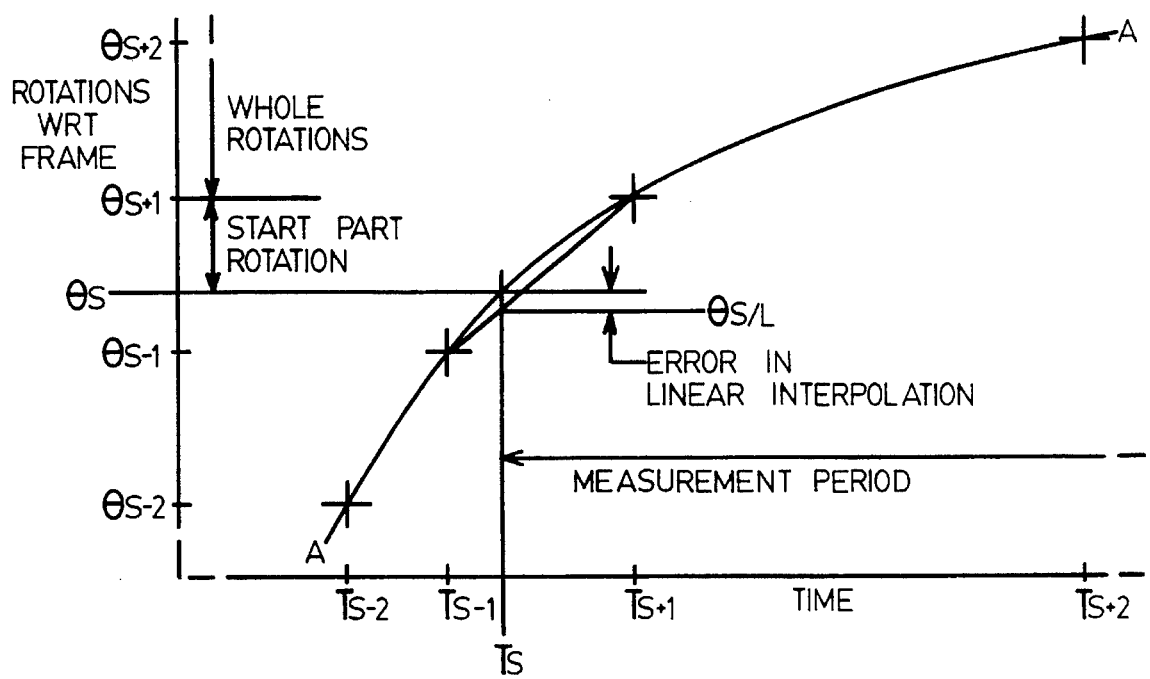

If the speed of the rotor WRT the frame is non-constant, then the rotor rotations vs time relation will be non-linear, as in FIGS. 8A & 8B. Such is generally the case because, while the speed of the rotor is substantially constant WRT an IFR, the frame may have any random motion and will often be accelerating. In this non-linear case, the start part rotation $\theta_{START-PART}$ cannot always be accurately determined directly from the pickoff pulse-times, through linear interpolation: using a linear interpolation may cause unacceptable error. In FIG. 8B, $\theta_{S/L}$ represents the linear approximation to $\theta_S$: the error from using this linear approximation is $\theta_S - \theta_{S/L}$. The notation otherwise used in FIGS. 8A & 8B is the same as that used in FIGS. 7A & 7B.

The start part rotation for the non-linear case illustrated in FIGS. 8A & 8B, is more accurately determined by fitting a curve through pulse-times corresponding to successive rotations ... $(T_{S-2}, \theta_{S-2}), (T_{S-1}, \theta_{S-1}), (T_{S+1}, \theta_{S+1}), (T_{S+2}, \theta_{S+2})$ ... to determine an equation of the form $\theta_k=F(T_k)$, and then solving this equation to determine the rotor rotation $\theta_S$ corresponding to the start time $T_S$, ie $\theta_S = F(T_S)$. (The curve-fitting corresponds to reconstructing the curve A—A (in FIG. 8B) from the (T, $\theta$) data.) Methods for curve-fitting, determining and solving equations are well-known to those skilled in the art. In this non-linear case the start part rotation can be determined thus:

$$\theta_{START-PART} = (\theta_{S+1} - \theta_S)/(\theta_{S+1} - \theta_{S-1}) \quad (4)$$
$$= (\theta_{S+1} - \theta_S)/1$$
$$= \theta_{S+1} - \theta_S$$
$$= \theta_{S+1} - F(T_S)$$

For example, if: $T_S=2,000,000,000,000$; $\theta_{S-1}=5$ and $\theta_{S+1}=6$ (arbitrarily assigned); and $\theta_S=F(T_S)= F(2,000,000,000,000)=5.296,071$ (from curve-fitting); the start part rotation $\theta_{START-PART}$ is:

$$\theta_{START-PART} = \theta_{S+1} - \theta_S$$
$$= \theta_{S+1} - F(T_S)$$
$$= 6 - 5.296,071$$
$$= 0.703,929 \text{ rotations}$$

As used in the above example, for determining part rotations, successive rotations of the rotor WRT the frame can arbitrarily be assigned successive integer numbers such as ... 4, 5, 6, 7 .... The error arising from a linear interpolation equals $\theta_S - \theta_{S/L}$ which, using the above example figures, is equal in magnitude to: 0.703,945–0.703,929= 0.000,016 rotations.

The total rotor rotations during a measurement period equals: $\theta_{START-PART}$+number of whole rotations+$\theta_{END-PART}$. For example: if $\theta_{START-PART}$=0.703,929; number of whole rotations=5,999; and $\theta_{END-PART}$=0.932,778; the total rotor rotations during the measurement period is: 0.703,929+5,999+0.932,778=6,000.636,707.

An alternative to making non-linear interpolations over whole rotor rotations WRT the frame, is to use linear interpolations over sub-divisions of a single rotation. Such sub-divisions may be effected by multiple pickoff points. By making the sub-divisions small enough, the error due to linear interpolation may be made as small as required. In a practical device, such sub-divisions may not be perfect and each sub-division would have to be individually calibrated.

It will be readily understandable to one skilled in the art how to practice the invention either in terms of single pickoff points and non-linear interpolations, or in terms of multiple pickoff points and linear interpolations. Subsequent description is based on the assumption of single pickoff points and non-linear interpolation over whole rotor rotations.

9. Analysis for Primary Mode

The following describes the basic method, and specifically a primary mode application of the basic method to determine rotational position of the axis rotor 110 WRT an IFR, as a function of time, and to determine an RTR equation. The previously mentioned measurement and data-processing difficulties are avoided by determining relative rotations of the axis rotor and the test rotor indirectly WRT the frame. Rotations of the rotors WRT the frame are determined as described previously.

Figure 9A:
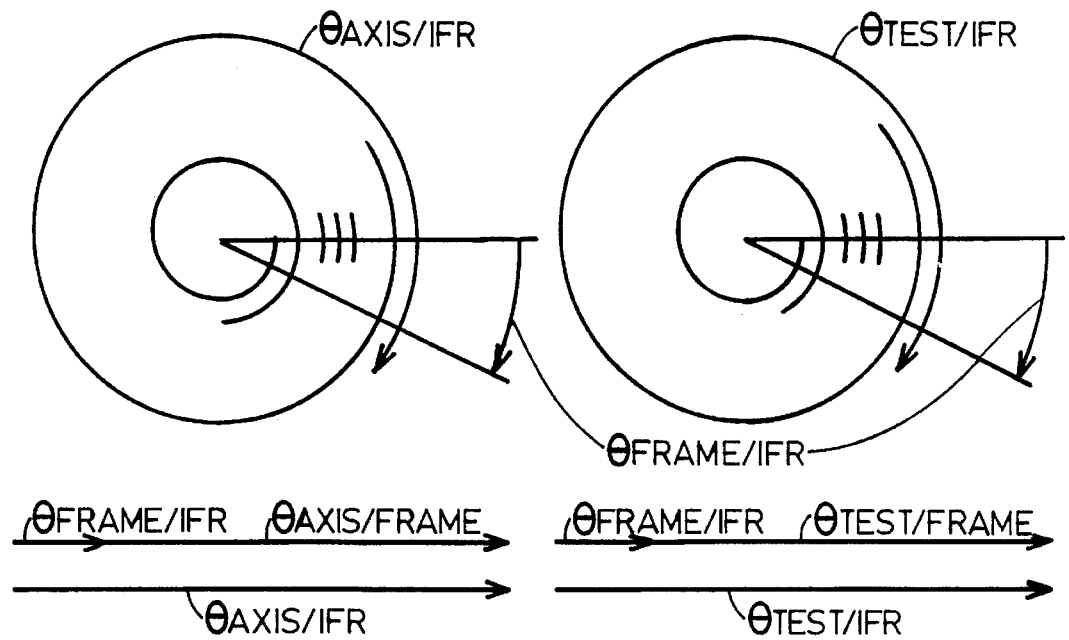
FIGS. 9A & 9B are diagrammatic representations of rotations of the axis rotor, the test rotor and the frame, WRT an IFR during measurement periods.
Figure 9B:
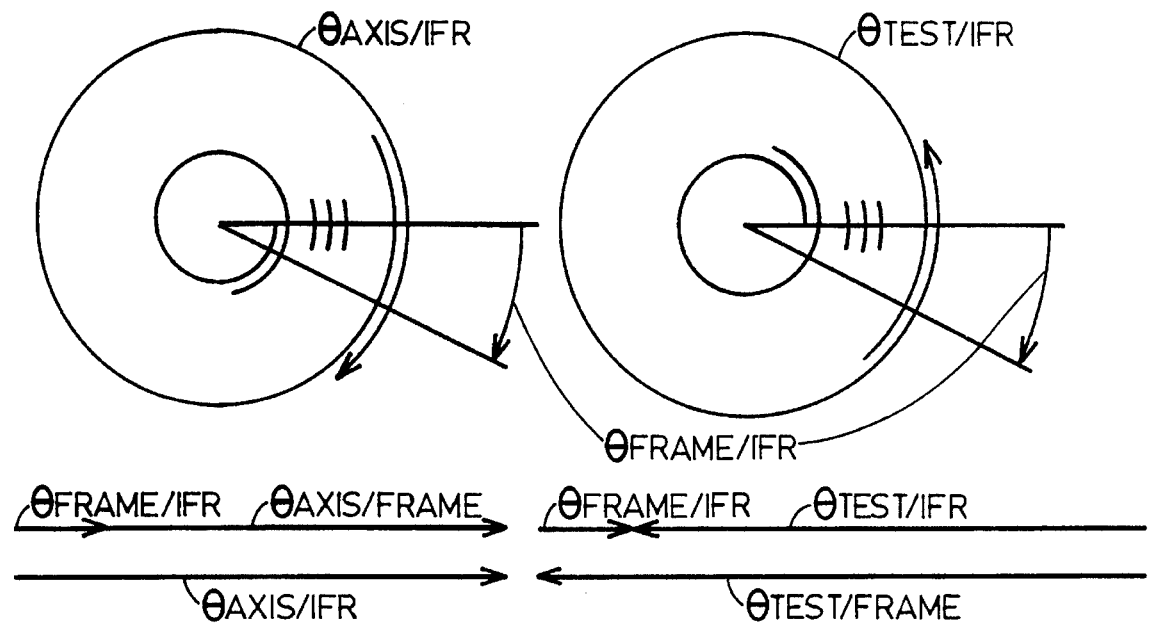

FIGS. 9A & 9B show the notation used for rotations during a measurement period, beginning at a time T and having measurement period duration t*, that is, during the period T to T+t*. The arrow-headed spirals represent the rotations of axis rotor 110 and test rotor 210 WRT the IFR. The short curved arrows represent the rotation of support frame 99 WRT the IFR. The radial lines represent the orientations of the frame WRT the IFR at the start and end of the measurement period. The straight arrows in the lower diagrams also represent the rotations, as designated.

If the axis rotor and the test rotor rotate in the same direction, as in FIG. 9A:

$$\theta_{AXIS/IFR} = \theta_{AXIS/FRAME} + \theta_{FRAME/IFR} \quad (5)$$

and $$\theta_{TEST/IFR} = \theta_{TEST/FRAME} + \theta_{FRAME/IFR} \quad (6)$$

from which, $\theta_{frame/ifr}$, the rotation of the frame WRT an IFR, can be eliminated by subtraction:

$$\theta_{AXIS/IFR} - \theta_{TEST/IFR} = \theta_{AXIS/FRAME} - \theta_{TEST/FRAME} = \theta_{REL/SAME} \quad (7)$$

where:

$\theta_{AXIS/IFR}$=rotation of axis rotor WRT an IFR;
$\theta_{TEST/IFR}$=rotation of test rotor WRT an IFR;
$\theta_{AXIS/FRAME}$=rotation of axis rotor WRT the frame;
$\theta_{TEST/FRAME}$=rotation of test rotor WRT the frame;
$\theta_{FRAME/IFR}$=rotation of frame WRT an IFR; and,
$\theta_{REL/SAME}$=rotation of axis rotor relative to test rotor, for same direction of rotation Equation 7 can be stated in words thus: "For an axis rotor and a test rotor rotating about parallel axes and in the same direction of rotation during the same specific measurement period, the difference in the rotations WRT an IFR is equal to the difference in the rotations WRT the frame, and equals the rotations of the axis rotor relative to the test rotor.".

If the axis rotor and the test rotor rotate in opposite directions, as in FIG. 9B:

$$\theta_{AXIS/IFR} = \theta_{AXIS/FRAME} + \theta_{FRAME/IFR} \quad (5)$$

and $$\theta_{TEST/IFR} = \theta_{TEST/FRAME} - \theta_{FRAME/IFR} \quad (8)$$

from which, $\theta_{FRAME/IFR}$, the rotation of the frame WRT an IFR, can be eliminated by addition:

$$\theta_{AXIS/IFR} + \theta_{TEST/IFR} = \theta_{AXIS/FRAME} + \theta_{TEST/FRAME} = \theta_{REL/OPP} \quad (9)$$

where:

$\theta_{REL/OPP}$=rotation of axis rotor relative to test rotor, for opposite directions of rotation Equation 9 can be stated in words thus: "For an axis rotor and a test rotor rotating about parallel axes and in opposite directions of rotation during the same specific measurement period, the sum of the rotations WRT an IFR is equal to the sum of the rotations WRT the frame, and equals the rotations of the axis rotor relative to the test rotor".

Equations 7 and 9 show how rotations of the rotors WRT an IFR (which cannot readily be determined directly) are related to rotations of the rotors WRT the frame (which can readily be determined directly).

Measurements for $\theta_{REL/OPP}$ and $\theta_{REL/SAME}$ cannot both be made at the same time since they require opposite directions of rotation of the test rotor. However, if the axis rotor and the test rotor maintain substantially constant speeds WRT an IFR, so that $\theta_{REL/OPP}$ and $\theta_{REL/SAME}$ change only slowly if at all, and if at least one measurement of each and preferably multiple measurements of each are available, values valid for the same time can be estimated through polation. Multiple measurements are preferably made in some alternating manner. (The term "polation" is used to indicate interpolation and/or extrapolation.) $\theta_{REL/OPP}$ and $\theta_{REL/SAME}$ values valid for the same time T (that is, for the time period T to T+t*) can be added to (or subtracted from) each other to determine the rotations of the axis rotor (or the test rotor) WRT an IFR (for the same period T to T+t*).

From equations 7 and 9 derived above:

$$\theta_{AXIS/IFR} = (\theta_{REL/OPP} + \theta_{REL/SAME})/2 \quad (10)$$

and $$\theta_{TEST/IFR} = (\theta_{REL/OPP} - \theta_{REL/SAME})/2 \quad (11)$$

As exemplified by the above description, the basic method, by which rotations of the axis rotor relative to the test rotor are used to determine rotations of the axis rotor WRT an IFR, can be simply summarized thus: For the two rotors, determine relative rotations, for both same and opposite directions of rotation, about parallel axes. Through polation (interpolation and/or extrapolation) determine same and opposite relative rotations, for a same time period. The rotations of the axis rotor WRT the IFR during the time period is equal to half the sum of the relative rotations. (The rotations of the test rotor WRT the IFR during the time period is equal to half the difference of the relative rotations.) (Similar analyses and a similar but more general statement of the basic method could be made in terms of relative motions generally for any two rotating bodies which both maintain substantially constant speeds WRT an IFR.)

The axis rotor and the test rotor are constructed and operated specifically so that their speeds remain substantially constant WRT an IFR. Consequently, $\theta_{REL/OPP}$ and $\theta_{REL/SAME}$ values also remain substantially constant. This makes accurate polation possible, whereby relative motions for the same time period may be determined. The apparatus is operated so that a time series of individual $\theta_{REL/OPP}$ values and an interwoven time series of individual $\theta_{REL/SAME}$ values are determined. Each individual $\theta_{REL/OPP}$ and $\theta_{REL/SAME}$ value applies to some specific measurement period.

From the individual $\theta_{REL/OPP}$ vs time values, a continuous function $\theta_{REL/OPP}$=f(t) is determined, using known curve-fitting techniques. (For any time t, this function $\theta_{REL/OPP}$= f(t) represents numbers of rotations of the axis rotor relative to the test rotor, for opposite directions of rotation, during the period t to t+t*.) Similarly, from the individual $\theta_{REL/SAME}$ vs time values, a continuous function $\theta_{REL/SAME}$=g(t) is determined. (For any time t, this function $\theta_{REL/SAME}$=g(t) represents numbers of rotations of the axis rotor relative to the test rotor, for same direction of rotation, during the period t to t+t*.) If the rotors' speed control systems predispose the rotors' speeds to specific kinds of time variations (for example, sinusoidal) these can be employed in curve-fitting for determining f(t) and g(t).

From $\theta_{REL/OPP}$=f(t) and $\theta_{REL/SAME}$=g(t), a function $\theta_{AXIS/IFR}$=h(t), which defines rotations of the axis rotor WRT an IFR, is determined by substitution into Equation 10, thus:

$$\theta_{AXIS/IFR}=(\theta_{REL/OPP}+\theta_{REL/SAME})/2 \quad (10)$$

$$=h(t)=[f(t)+g(t)]/2 \quad (12)$$

(For any time t, this function $\theta_{AXIS/IFR}$=h(t) represents numbers of rotations of the axis rotor WRT an IFR, during the period t to t+t*.)

For any time t, the average speed of the axis rotor WRT an IFR, during the period t to t+t*, can be determined by dividing h(t) by t*, thus:

$$\text{Average axis rotor speed}=h(t)/t^* \quad (13)$$

This average speed of the axis rotor can be evaluated for any time t, including present time. As mentioned previously, such a computed rotor speed can be used in an axis rotor speed feedback control system, as an alternative to the method described.

Rotations of the test rotor can be determined similarly, as follows: From $\theta_{REL/OPP}$=f(t) and $\theta_{REL/SAME}$=g(t), a function $\theta_{TEST/IFR}$=h'(t), which defines rotations of the test rotor WRT an IFR, may be determined by substitution into Equation 11, thus:

$$\theta_{TEST/IFR}=(\theta_{REL/OPP}-\theta_{REL/SAME})/2 \quad (11)$$

$$=h'(t)=[f(t)-g(t)]/2 \quad (14)$$

(For any time t, this function $\theta_{TEST/IFR}$=h'(t) represents numbers of rotations of the test rotor WRT an IFR, during the period t to t+t*.)

For any time t, the average speed of the test rotor WRT an IFR, during the period t to t+t*, can be determined by dividing h'(t) by t*, thus:

$$\text{Average test rotor speed}=h'(t)/t^* \quad (15)$$

As for the axis rotor, this average speed of the test rotor can be evaluated for any time t, including present time, and used in a test rotor speed feedback control system, as an alternative to the method described.

Figure 10A:
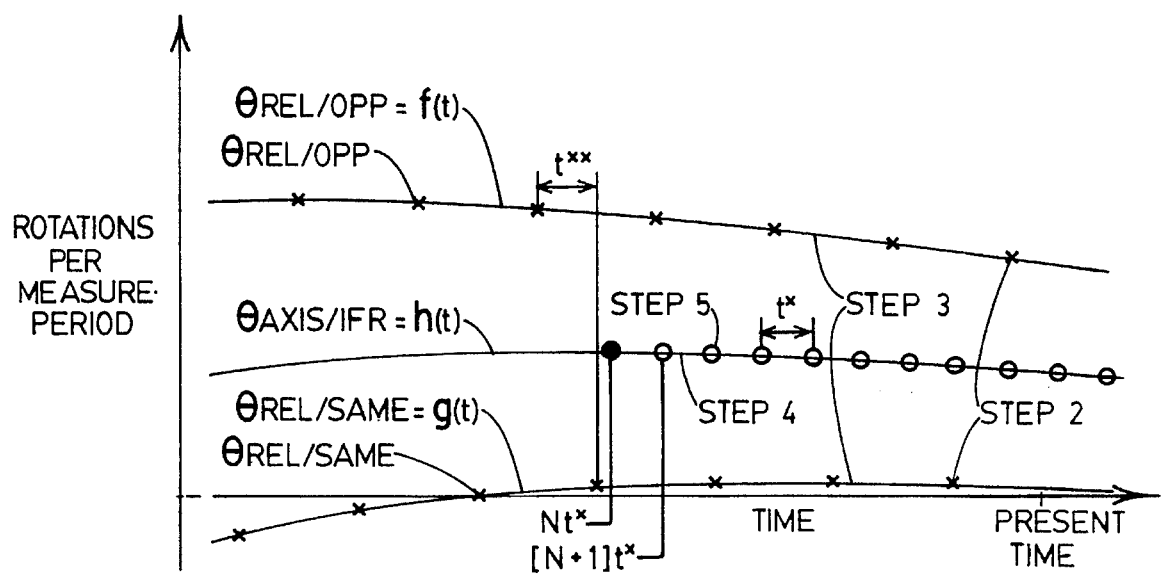
FIG. 10A is a graphical representation of rotor rotations (during measurement periods) vs time.

FIG. 10A shows the functions $\theta_{REL/OPP}$=f(t), $\theta_{REL/SAME}$=g(t), and $\theta_{AXIS/IFR}$=h(t) plotted vs time, t. The functions f(t), g(t) and h(t) indicate numbers of rotations during the time period t to t+t*, where t* represents the duration of a measurement period. FIG. 10A also shows (the start of) individually measured values of $\theta_{REL/OPP}$ and $\theta_{REL/SAME}$ (indicated by crosses). These values of $\theta_{REL/OPP}$ and $\theta_{REL/SAME}$ are spaced (alternately) one measurement cycle period t apart. (A measurement cycle period t is longer than a measurement period t*, to allow time for reorienting the test rotor. For example: If t*=60 seconds, t**=65 sec may be reasonable.) FIG. 10A also shows (the start of) individually evaluated values of $\theta_{AXIS/IFR}$ (indicated by circles). As described following, these values of $\theta_{AXIS/IFR}$=h(t) are evaluated for times at integer multiples kt* of the measurement period t*, and used to determine cumulative rotations of the axis rotor WRT an IFR.

In principle, discrete values of a function $\theta_{AXIS/CUM}$=H(t), which defines cumulative rotations of the axis rotor WRT an IFR vs time, are determined by summing individually evaluated values of the function $\theta_{AXIS/IFR}$=h(t). More specifically, $\theta_{AXIS/CUM}$=H(nt*), where nt* is an integer multiple of the measurement period t*, is in principle determined by summing individually evaluated values h(kt*), where kt* is an integer multiple of the measurement period, thus:

$$\begin{aligned} H(nt^*) &= h(0)+h(t^*)+h(2t^*)+\ldots+h(kt^*) \\ &\quad +\ldots+h([n-2]t^*)+h([n-1]t^*) \\ &= \Sigma h(kt^*) \text{ [summation from } k=0 \text{ to } k=n-1] \end{aligned} \quad (16)$$

Equation 16 follows from the fact that the function $\theta_{AXIS/IFR}$=h(t) represents the numbers of rotations, of the axis rotor WRT an IFR, about its sensitive axis, during the time period from t to t+t*: h(0) represents rotations from 0 to t*; h(t*) represents rotations from t* to 2t*; h(2t*) represents rotations from 2t* to 3t*; ... h([n-2]t*) represents rotations from [n-2]t* to [n-1]t*; and h([n-1]t*) represents rotations from [n-1]t* to nt*: the sum of these therefore represents total rotations during the time period from 0 to nt*.

Figure 10B:
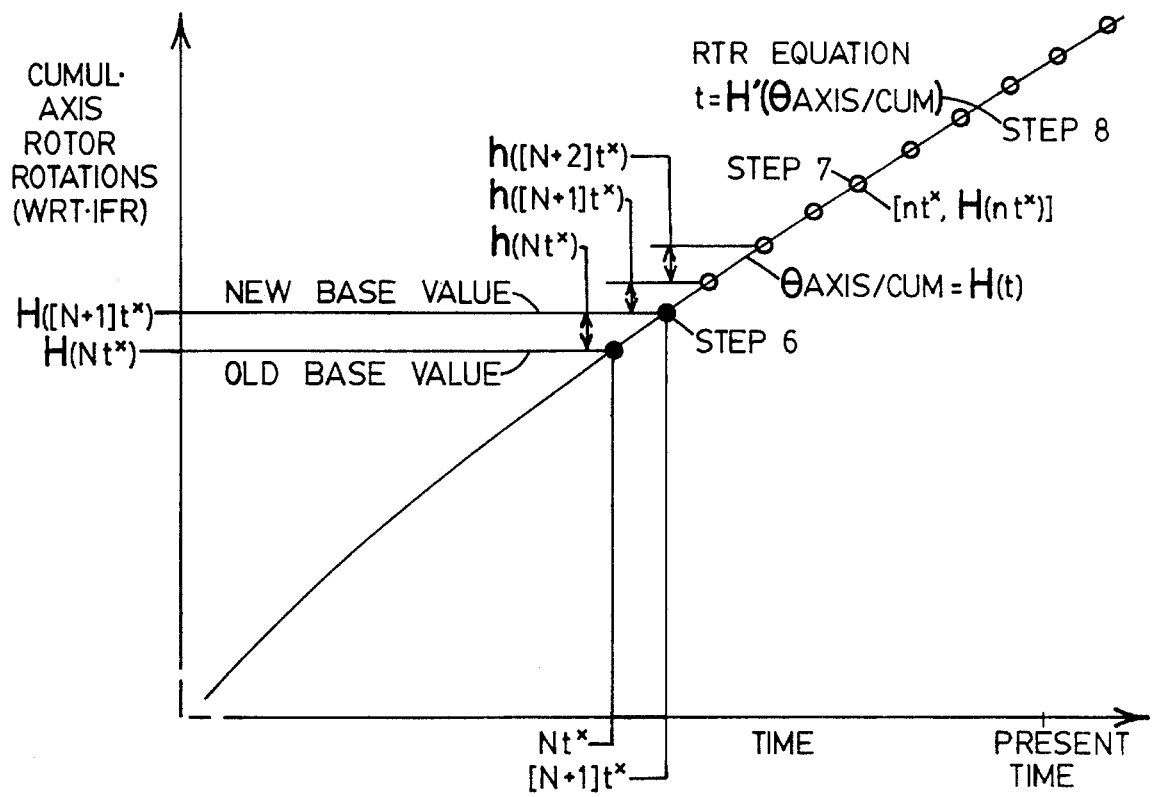
FIG. 10B is a graphical representation of cumulative axis rotor rotations (WRT an IFR) vs time.

FIG. 10B shows discrete values for H(nt*) (indicated by circles) and the continuous function $\theta_{AXIS/CUM}$=H(t) plotted vs time, t. The discrete values for H(t) are determined for times corresponding to integer multiples of the measurement period t*. From these discrete values, the continuous function $\theta_{AXIS/CUM}$=H(t) is constructed by curve-fitting. (Note that while the horizontal (time) scales of FIGS. 10A and 10B are identical, the vertical (rotations) scale of FIG. 10A is much greater than that of FIG. 10B.)

The part of the continuous function $\theta_{AXIS/CUM}$=H(t) which is of most interest, is that part extrapolated to times beyond the measured data, to and beyond present time (that is, in 'real time'). This is the RTR equation, which is most directly useful if expressed in the inverse form t=H'($\theta_{AXIS/CUM}$). Since both cumulative rotations $\theta_{AXIS/CUM}$ and time t increase monotonically, this inverse form is readily determined from [nt*, H(nt*)] pairs. The RTR equation, t= H'($\theta_{AXIS/CUM}$) is indicated on FIG. 10B.

To generate the reference pulses, the RTR equation, t=H'($\theta_{AXIS/CUM}$) is solved for each succeeding integer value of $\theta_{AXIS/CUM}$ to determine the corresponding reference signal pulse time $T_{REF-PULSE}$. At any given moment, the time for the next reference signal pulse $T_{REF-PULSE}$, corresponding to the next integer cumulative rotation, is determined in advance. When current time T reaches $T_{REF-PULSE}$, the reference signal generator 390 emits a reference pulse. This procedure is repeated for every pulse. For example: If the rotor speed is 6000 rev/min=100 rev/sec WRT an IFR, this procedure is repeated 100 times each second.

As described above, the RTR equation is determined from discrete values of $\theta_{AXIS/CUM}$=H(t) determined from a single function of $\theta_{AXIS/IFR}$=h(t) which is evaluated for t=0, t=t*, t=2t*, ... t=kt*, ... and t=(n-1)t*, as per equation 16. The function $\theta_{AXIS/IFR}$=h(t) is in turn determined from continuous functions $\theta_{REL/OPP}$=f(t) and $\theta_{REL/SAME}$= g(t) determined by fitting curves through all previous individually measured $\theta_{REL/OPP}$ and $\theta_{REL/SAME}$ values (respectively).

Practically, there are problems associated with the approach described above. Because new values for $\theta_{REL/OPP}$ and $\theta_{REL/SAME}$ are obtained on a continuous basis, their number is proportional to the time that the apparatus has been operating. Memory storage for these values would have to be provided. The number of evaluations of h(kt*) in order to determine H(nt*) is also proportional to the time that the apparatus has been operating. The computations to determine the continuous functions $\theta_{REL/OPP}$=f(t) and $\theta_{REL/SAME}$=g(t) from individual $\theta_{REL/OPP}$ and $\theta_{REL/SAME}$ values, respectively, also increase in number and complexity. Perhaps most seriously, the resulting functions may become less accurate with an increase in the numbers of individual values.

In the method of the preferred embodiment, the problems noted above are avoided by making the calculations from a limited specified number of measured $\theta_{REL/OPP}$ and $\theta_{REL/SAME}$ values and from a single 'base value' H(Nt*) kept in memory. As a new $\theta_{REL/OPP}$ or $\theta_{REL/SAME}$ value becomes available (one or the other each measurement cycle period t**), this new value is retained in memory while the oldest one is discarded. From each new $\theta_{REL/OPP}$ or $\theta_{REL/SAME}$ value, a corresponding new $\theta_{REL/OPP}$=f(t) function or a new $\theta_{REL/SAME}$=g(t) function, respectively, is determined by curve-fitting. Using this new function, and the last other function (that is, g(t) or f(t)), a new $\theta_{AXIS/IFR}$=hK(t) function is determined.

The single base value H (Nt*) kept in memory represents cumulative rotations of the axis rotor from some arbitrary start time to time Nt*. The base value H(Nt*) is updated once (or twice) each measurement cycle period t**, and the new base value is retained in memory while the old one (or two) is discarded. Each new $\theta_{AXIS/IFR}$=hK(t) function is used to update the base value, from H(Nt*) to H([N+1]t*) thus:

$$H([N+1]t^*) = H(Nt^*) + hK(Nt^*) \quad (17)$$

As indicated in FIGS. 10A & 10B, the base value is updated for time Nt* which is at the most accurate portion of the $\theta_{AXIS/IFR}$=h(t) curve, namely that portion central to the times for the specified number of individual measured $\theta_{REL/OPP}$ and $\theta_{REL/SAME}$ values kept in memory.

Generally, the base value H(Nt*) is updated once each measurement cycle period, that is, once for each hK(t) function, as in equation 17. Occasionally it is necessary to update the base value twice for a given $\theta_{AXIS/IFR}$=hK(t) function, in order to keep the base value corresponding to the central portion of the limited specified numbers of $\theta_{REL/OPP}$ and $\theta_{REL/SAME}$ values. This is because a measurement cycle period t** is longer than a measurement period t*, due to the time required to reorient the test rotor. After some time in operation, the base value H(Nt') will have been determined from a series of $\theta_{AXIS/IFR}$=hI(t) functions, each of which will have, in its turn, contributed one or two updates to a base value.

In addition to being used to update the base value $\theta_{AXIS/CUM}$=H(Nt'), each new function $\theta_{AXIS/IFR}$=hK(t) is also used to determine a new series of H(nt*) values corresponding to times nt*, and determined by addition from the base value. The new [nt*, H(nt*)] pairs are used to construct a new RTR equation, as indicated in FIG. 10B.

At startup, it is necessary to deal with having fewer than the specified number of $\theta_{REL/OPP}$ and $\theta_{REL/SAME}$ values kept for making the required computations. (This specified number is a compromise: With fewer than this number, the $\theta_{AXIS/IFR}$=hI(t) functions may be less accurate than desirable. With more than this number, computations become cumbersome.) To surmount this startup problem of too few numbers, further computations are delayed until the specified number have been determined. But before the first series of H(t) values can be determined, and the first RTR equation produced, it is necessary to set an initial base value H(to) corresponding to some start time to. This initial base value for H(t) can be set arbitrarily. Setting it is equivalent to setting the orientation of the reference direction 118, which, as noted previously, has typically no objective significance. Most simply, the initial base value can be set equal to zero, for a time $t_0$=mt* which is an integer multiple of the measurement period t* and central to the initial individual $\theta_{REL/OPP}$ and $\theta_{REL/SAME}$ values, that is, $H(t_0)$=H(mt*)=0. With this also completed, data-processing can proceed as described previously.

In view of the above discussion, equation 16 can be rewritten, to reflect the initial base value H(mt*) and the different functions hI(t), thus:

from:
$$H(nt^*) = h(0) + h(t^*) + h(2t^*) + \ldots \quad (16)$$
$$+ h(kt^*) + \ldots$$
$$+ h([N-1]t^*) + h(Nt^*)$$
$$+ h([N+1]t^*) + \ldots$$
$$+ h([n-2]t^*) + h([n-1]t^*)$$

to:
$$H(nt^*) = H(mt^*) + h1(mt^*) + \ldots \quad (18A)$$
$$+ hI(kt^*) + \ldots$$
$$+ hJ([N-1]t^*) + hK(Nt^*)$$
$$+ hK([N+1]t^*) + \ldots$$
$$+ hK([n-2]t^*) + hK([n-1]t^*)$$

$$= H(Nt^*) + hK(Nt^*) \quad (18B)$$
$$+ hK([N+1]t^*) + \ldots$$
$$+ hK([n-2]t^*) + hK([n-1]t^*)$$

$$= H([N+1]t^*) \quad (18C)$$
$$+ hK([N+1]t^*) + \ldots$$
$$+ hK([n-2]t^*) + hK([n-1]t^*)$$

where:

h(t) in equation 16 represents a single continuous function of $\theta_{AXIS/IFR}$ vs time t, which is evaluated at times t from t=0 to t=[n-1]t*.

H(mt*) in equation 18A represents the initial base value for $\theta_{AXIS/CUM}$, while h1(mt*) represents the first evaluation of the first $\theta_{AXIS/IFR}$ function, for time t=mt*. h1(t) ... hI(t), ... hJ(t) in equation 18A represent different continuous functions of $\theta_{AXIS/IFR}$ vs time t. Each of these functions contributes one or two values to the base value H(Nt*). In most cases, each contributes only once, but because the measurement cycle period t** is greater than the measurement period t*, periodically a function must contribute twice. In principle, these functions of $\theta_{AXIS/IFR}$ vs time t should be identical: practically they may differ slightly. The last function hK(t) also represents a continuous function of $\theta_{AXIS/IFR}$ vs time t. This function is evaluated for a number of values, namely for times t=Nt* to t=[n-1]t*. This function contributes, like the others, once (or twice) to determine the new base value H([N+1]t*) (or H([N+2]t*)).

H(Nt*) in equation 18B is the old base value for $\theta_{AXIS/CUM}$ on which the last RTR Equation was based. H(Nt*) is the sum of the evaluations of h1(0), h2(t*), h3(2t*), ... hI(kt*), ... hJ([N+1]t).

H([N+1]t*) in equation 18C is the new base value for $\theta_{AXIS/CUM}$ on which the current RTR Equation is based. It is obtained from the old base value thus: H([N+1]t*)=H(Nt*)+ hK(Nt*).

(An alternative approach to determining the orientation signal φ(t) is as follows: Determine a continuous function $\theta_{AXIS/CUM}$=H(t), which defines cumulative rotations of the axis rotor WRT the IFR, as a function of time. Determine the time $T_{pp}$ of each pulse in the axis rotor pickoff pulse stream $\omega_1$(t), as it is emitted by pickoff 114, using pulse-time counters. Solve the function $\theta_{AXIS/CUM}$=H(t) for each time $T_{pp}$, that is, determine $\theta_{AXIS/CUM}$= H($T_{pp}$). The fractional portion of each H($T_{pp}$) equals the phase shift for that pickoff pulse, and can be used as the orientation signal φ(t). Each pickoff pulse occurs when predetermined point 116 on the axis rotor is adjacent to predetermined point 117 fixed to the support frame 99. Each integer value for the function $\theta_{AXIS/CUM}$=H(t) corresponds to a time t when predetermined point 116 on the axis rotor is adjacent to reference point 118. If the fractional portion of H($T_{pp}$) is zero, this indicates that, at time $T_{pp}$, predetermined point 117 on the frame is adjacent to reference point 118. If the fractional portion of H($T_{pp}$) is small, this indicates that, at time $T_{pp}$, predetermined point 117 on the frame is displaced a small amount, in the direction of rotation of the rotor, from reference point 118. And so on . . . . In this alternative approach, the continuous function $\theta_{AXIS/CUM}$=H(t) serves the function of the "reference signal", while the computation means by which $\theta_{AXIS/CUM}$=H(t) is solved for t=$T_{pp}$ serves the function of "comparator means". An advantage of this alternative approach is that the phase shift is determined directly, in one operation, without the necessity of producing a reference pulse stream and without the necessity of separate phase comparator apparatus. Also, the phase shift information is immediately in digital form for downstream processing.)

10. Summary of Computation Steps for an RTR Equation

The following is a summary of the measurement and computation steps for determining an RTR equation. These steps are repeated continuously, with a new RTR equation determined for each measurement cycle period t**, during all the time that the apparatus is in operation. These steps comprise:

1. Make measurements and determine rotations (WRT the frame) of the axis rotor and the test rotor, over identical measurement period of duration t*. (The test rotor is oriented so that its direction of rotation is, for alternate measurement periods, in the same direction as the axis rotor and in the opposite direction.) Each rotation includes a start part rotation; an integer number of whole rotations; and an end part rotation. [Step 1 in FIG. 8A.]

2. Determine the value of $\theta_{REL/OPP}$ (if the rotors had opposite directions of rotation) or the value of $\theta_{REL/SAME}$ (if the rotors had the same direction of rotation). Store this value in memory and discard any excess value. [Equation 9 or 7: Step 2 in FIG. 10A.]

3. Construct a new $\theta_{REL/OPP}$=f(t) function, or a new $\theta_{REL/SAME}$=g(t) function, as appropriate, to encompass the latest value. [Step 3 in FIG. 10A.]

4. Determine a new $\theta_{AXIS/IFR}$=h(t)=hK(t) function. [Step 4 in FIG. 10A.]

5. Evaluate $\theta_{AXIS/IFR}$=hK(t) for integer multiples of t*, namely for hK(Nt*), hK([N+1]t*), ... hK(nt*), ... [Step 5 in FIG. 10A.]

6. Determine a new $\theta_{AXIS/CUM}$=H([N+1]t*) base value, and store this new base value in memory. [Step 6 in FIG. 10B.]

7. Determine additional new $\theta_{AXIS/CUM}$=H(nt*) values. [Step 7 in FIG. 10B.]

8. Determine a new RTR equation t=H'($\theta_{AXIS/CUM}$). [Step 8 in FIG. 10B.]

11. Analysis for Secondary Mode

The application of the basic method in the secondary mode comprises determining rotational motion, or position as a function of time, of the frame (or body or carrying vehicle or other supporting structure) WRT an IFR, about a first axis fixed WRT the frame, when the frame itself has substantially constant rotational speed WRT an IFR. For this application, a rotatable member, namely a test rotor, is mounted for rotation about a second axis and rotated about this second axis such that rotational motion of the test rotor remains substantially independent of motion of the frame and at a speed substantially constant WRT the IFR. The second axis is alternately positioned at a first position, in which this second axis is substantially parallel to the first axis and the test rotor rotates about it in the same direction of rotation as the frame rotates about the first axis, and at a second position, in which this second axis is substantially parallel to the first axis and the test rotor rotates about it in the opposite direction of rotation. The relative motions of the test rotor and the frames are determined at both positions.

The right-hand diagrams of FIGS. 9A & 9B show the notation used for rotations of the test rotor and the frame during a measurement period, beginning at a time T and having measurement period duration t* that is, for the period T to T+t*. If the test rotor and the frame rotate in the same direction, as in FIG. 9A, then:

$$\theta_{TEST/IFR}=\theta_{TEST/FRAME}+\theta_{FRAME/IFR} \quad (6)$$

from which:

$$\theta_{TEST/FRAME}=\theta_{TEST/IFR}-\theta_{FRAME/IFR}=\theta_{*REL/SAME} \quad (19)$$

On the other hand, if the test rotor and the frame rotate in opposite directions, as in FIG. 9B, then:

$$\theta_{TEST/IFR}-\theta_{TEST/FRAME}-\theta_{FRAME/IFR} \quad (8)$$

from which:

$$\theta_{TEST/FRAME}=\theta_{TEST/IFR}+\theta_{FRAME/IFR}=\theta_{*REL/OPP} \quad (20)$$

The parameters used in equations 19 & 20, are as defined previously, with the addition of the following, which are introduced for clarity:

$\theta_{*REL/SAME}$=rotations of test rotor relative to the frame, for same direction of rotation $\theta_{*REL/OPP}$=rotations of test rotor relative to the frame, for opposite directions of rotation ($\theta_{*REL/SAME}$ in equation 19 corresponds to $\theta_{REL/SAME}$ in equation 7, and $\theta_{*REL/OPP}$ in equation 20 corresponds to $\theta_{REL/OPP}$ in equation 9.)

If the direction of rotation of the frame (WRT an IFR and about the sensitive axis) is initially unknown (as might usually be the case), this can be simply ascertained: The lesser of the relative speeds indicates the same direction of rotation of the test rotor and frame, that is, $\theta_{REL/SAME}$; the greater indicates opposite directions of rotation, that is, $\theta_{*REL/OPP}$.

Similarly as for $\theta_{REL/OPP}$ and $\theta_{REL/SAME}$ in the primary mode, measurements for $\theta_{*REL/OPP}$ and $\theta_{*REL/SAME}$ cannot both be made at the same time since they require opposite directions of rotation of the test rotor. However, if the frame and the test rotor both maintain substantially constant speed, so that $\theta_{*REL/OPP}$ and $\theta_{*REL/SAME}$ change only slowly, if at all, and if at least one measurement of each and preferably multiple measurements of each are available, concurrent values, that is, values valid for the same time, can be estimated through polation (that is, interpolation and/or extrapolation). Multiple measurements are preferably made in some alternating manner. $\theta_{*REL/OPP}$ and $\theta_{*REL/SAME}$ values valid for the same specific time T (that is, for the time period T to T+t*) can be subtracted from (or added to) each other to determine the rotations of the frame (or the test rotor) WRT an IFR (for the same time period T to T+t*).

From equations 19 and 20 derived above:

$$\theta_{FRAME/IFR} = (\theta_{REL/OPP} - \theta_{*REL/SAME})/2 \quad (21)$$

and $$\theta_{TEST/IFR} = (\theta_{REL/OPP} + \theta_{*REL/SAME})/2 \quad (22)$$

$\theta_{FRAME/IFR}$ represents the rotation of the frame WRT an IFR and about the sensitive axis, during the measurement period T to T+t*. Further processing depends on the specific application: To monitor rotations of the frame, or to determine cumulative rotations of the frame, the measurement and computation steps can be repeated on a continuous basis, as for the primary mode. To obtain an average rotational speed during the measurement period, $\theta_{FRAME/IFR}$ can simply be divided by t*.

Equation 21 is similar in form to equation 11 and equation 22 is similar in form to equation 10. The measurements and computations for the two modes are essentially identical. However, because the secondary mode uses only half the measurements and rotation determinations of the primary mode, it is simpler and potentially more accurate and quicker. Apparatus to be used solely for secondary mode motion determinations may be simpler than for general purpose orientation determination, since only a test rotor is used. On the other hand, apparatus for general purpose orientation determination can also be used for secondary mode motion determinations, with only the test rotor output used, and appropriate changes to programs.

As noted, the basic method can be applied in the secondary mode to determining rotational motions WRT an IFR of the frame (or body or carrying vehicle or other support structure) for situations in which the frame itself has substantially constant rotational speed WRT an IFR. The feasibility of a specific application clearly depends on the accuracy obtainable using particular apparatus.

One potential general application of this secondary mode is for determining the orientation of true North-South WRT the frame. This is accomplished by determining the orientation WRT the frame of the Earth's rotation 'vector' (which is oriented in a true North-South direction and which remains substantially constant WRT an IFR). More specifically, this is accomplished by determining the component, or components, of the Earth's rotation vector parallel to an axis, or axes, fixed WRT the frame. For a complete determination of the Earth's rotation vector, three sets of apparatus orthogonally arranged, or a single apparatus directable along three orthogonal axes, may be used.

One specific field of application for determining true North-South is for navigation. In principle, true North-South could be determined from a ship tied up at the dock, from an aircraft stopped on the tarmac, or from a carrying vehicle or other support structure otherwise stationary WRT the Earth.

Another specific field of application for determining true North-South is for surveying. For surveying, the advantages of this mode include the fact that it requires no external observations (of astronomical or terrestrial objects) and is not affected by magnetic or gravitational anomalies. In principle, it could be used for under-ground, as well as for above-ground surveying. For general surveying work, general purpose orientation apparatus, as for navigation, can be used. Apparatus exclusively for determining the true North-South orientation could be simpler.

Other applications for this secondary mode include determining the rotational motions of satellites or celestial bodies.

12. Introduction to Power Supply, Measurements, and Data Processing Components

Figure 11A:
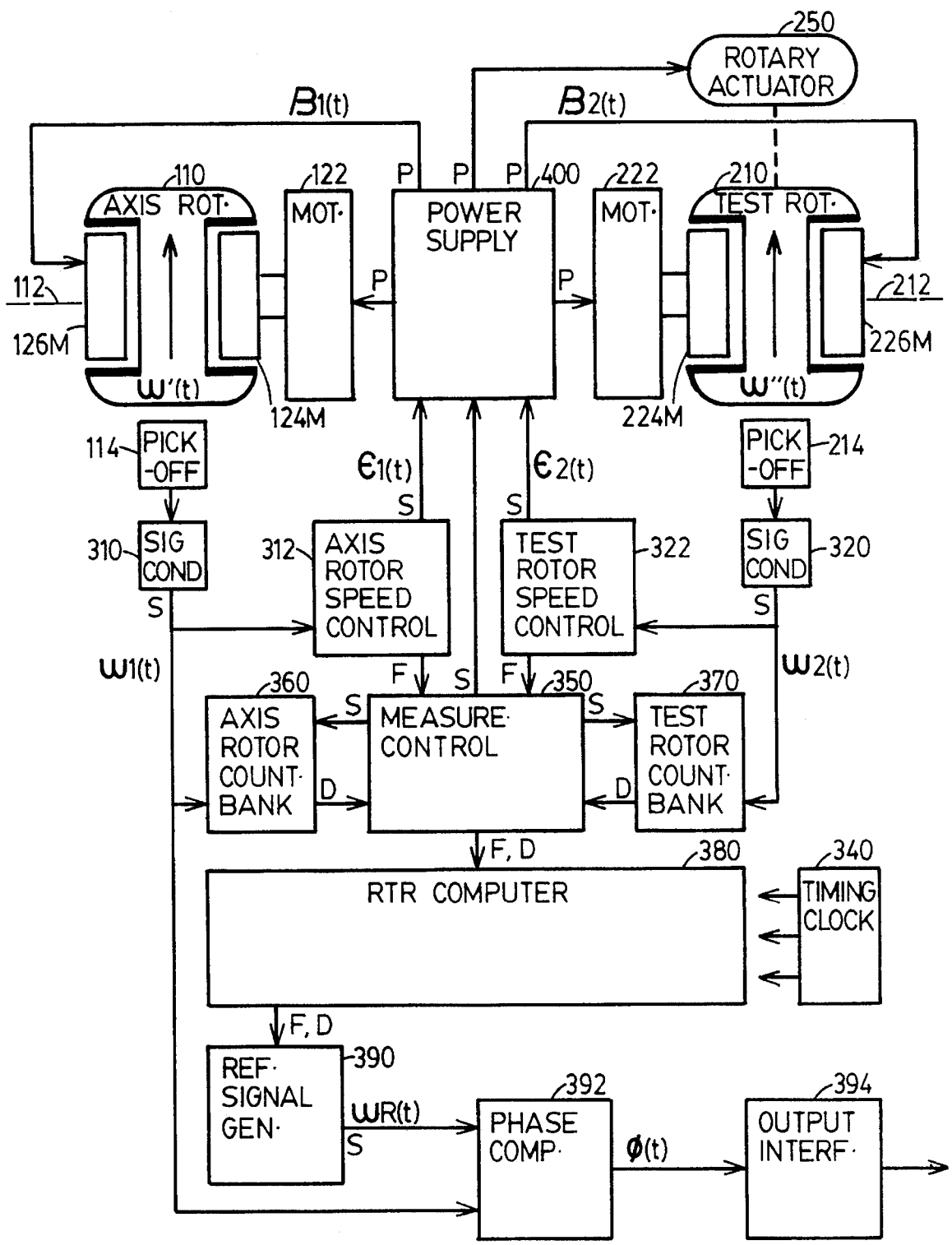
FIG. 11A is a partly schematic and partly block diagram representation of the apparatus of the preferred embodiment.

FIG. 11A is a partly schematic and partly block diagram representation of components of the preferred embodiment of the invention. The Eddy current matched torque rotor drives for axis rotor 110 and test rotor 210, and the rotary actuator 250, are shown schematically. Other components are shown in functional block diagram form. Each block represents identifiable apparatus and/or function: but each does not necessarily represent either a single or a separate piece of apparatus or function. Arrows indicate the directions of flow (from originator) of power signals (P), control & data signals (S), data transfer (D), and flags (F).

The components represented in FIG. 11A can be conveniently considered in terms of five interacting functional groups: 1-Components for real time orientation determination. (The operation of these components has been described, especially with reference to FIG. 1, except for the reference signal generator 390 which is described later); 2-Components for axis rotor 110 operation and speed control. (The operation and speed control for the axis rotor Eddy current matched torque rotor drive has been described, especially with reference to FIGS. 2A through 5.); 3-Components for test rotor 210 operation and speed control. (The operation and speed control for the test rotor Eddy current matched torque rotor drive is identical to that described for the axis rotor. The operation of the rotary actuator 250 has been described, especially with reference to FIG. 6.); 4-Components for power supply. (These are described briefly following.); and 5-Components for measurements and data processing. (The operation of these is described following, especially with reference to FIGS. 8A through 14, and the analyses described previously.)

The components represented in FIG. 11A are started when the apparatus is turned on. The axis rotor speed feedback control system and the test rotor speed feedback control system begin immediately to bring these rotors to operating speed.

The measurements control 350, the RTR computer 380, and the reference signal generator 390 are, for convenience of description, each described following as separately comprising computation means, namely a microcomputer, which executes a corresponding sequence of program steps. In a practical embodiment, a single microcomputer of suitable form may be used for multiple functions. In any event, data transfer and flagging are effected through memory which is commonly accessible by these components/functions.

The term "computation means" is used in this description of the invention to indicate means for executing sequences of program steps. Such means include microcomputers and single-purpose algorithm-specific processors, well-known to those skilled in the art. The term "microcomputer" is used in this description of the invention to indicate a digital computer of standard form including a central processing unit (CPU) set which executes an operating program permanently stored in read-only memory (ROM), which also stores tables and constants as necessary to make the required computations, and a random access memory (RAM) into which data may be temporarily stored and from which data may be read at various address locations determined in accord with the program stored in the ROM, analogue and digital inputs and outputs, and interrupt controller.

The measurements control 350, the RTR computer 380, and the reference signal generator 390, begin executing their programs immediately when the apparatus is turned on. However, they halt and do not proceed with program execution pending the signals to proceed or the availability of required data. The measurements control program (FIG. 12) begins but then halts until both the axis rotor and the test rotor have reached normal operating speeds, as indicated by the rotor speed OK flags. The RTR computer program (FIG. 13) begins but then halts until the first measurements have been completed, as indicated by the measurements completed flag. The reference signal generator program (FIG. 14) begins but then halts until the first RTR equation has been determined, as indicated by the new RTR equation flag.

13. Power Supply

The power supply 400 provides controlled power to all the apparatus of the invention. Note that while it is shown in FIG. 11A as a single block, for convenience of illustration, a practical embodiment of the power supply would comprise different sub-units each operating on principles and with characteristics well known to those skilled in the electrical/electronics arts and other arts, and which may be located at various locations relative to other apparatus.

The power supply 400 provides controlled power to the following apparatus: 1-Measurements and data-processing apparatus, including the pickoffs. (Power is supplied throughout all the time that the apparatus is operating. For clarity of illustration, connections between power supply 400 and measurements and data-processing apparatus is not shown in FIG. 11A); 2-Axis rotor 110 and test rotor 210. (The correct frequency and amplitude of A.C. power is provided to the rotor drive motors. The frequency of the A.C. power may be determined using the signal from the timing clock 340); 3-Eddy current brakes 126 and 226, for axis rotor 110 and test rotor 210, respectively. (D.C. power signal $\beta_1(t)$ is supplied to Eddy current brake 126 by servo amplifier circuit 402, according to speed-control signal $\epsilon_1(t)$ from axis rotor speed-control unit 312. Similarly, D.C. power signal $\beta_2(t)$ is supplied to Eddy current brake 226.); and, 4-The rotary actuator 250. (Power is supplied to energize the rotary actuator, to make it turn to the desired orientation and hold it as required, according to signals from the measurements control 350.)

4. Timing Clock

The timing clock 340 provides a stable high frequency signal for timing and control purposes. This clock signal is divided as required to meet the demands of various functions, such as for controlling the frequency of the A.C. power supplied to the rotor drive motors 122 & 222.

For timing purposes, the clock signal is fed into free-running pulse-time counters whose counts represent current time. For the operations of the measurements control 350, the counter banks 360 & 370, and the reference signal generator 390, it is necessary that all have the same time reference. That is, it is necessary that all base their operations on the same time. In the description of the operation of these components, all references to "current time" refer to the same time.

(For clarity of illustration, connections between the timing clock 340 and components which require timing signals are not shown in FIG. 11A. For the purpose of examples, a timing clock signal frequency of 10 Megahertz has been assumed.)

15. Measurements Control

The measurements control 350 controls the sequence and the timing of the periodically repeated rotations measurements by controlling the operation of counter banks 360 & 370 and the orientation of test rotor 210.

The measurements control 350 comprises computation means, namely a microcomputer, which executes a sequence of program steps: these steps are described later, with reference to the logic flow diagram of FIG. 12. The measurements control interacts with the power supply 400 and with other measurement and data-processing components, as indicated in FIG. 11A, thus: starts when the rotor speed OK flags have been set by the axis rotor speed-control unit 312 and by the test rotor speed-control unit 322; controls the orientation of rotary actuator 250 through timed control signals to the power supply 400; controls the operation of the counter banks 360 & 370 through timed control signals; obtains rotations counts data from the counter banks 360 & 370; makes this rotations counts data available to the RTR computer 380; sets the orientation flag to indicate to the RTR computer the orientation of the test rotor corresponding to the rotations count data; and, sets the measurements completed flag to indicate to the RTR computer 380 that measurements have been completed and rotations counts data is available for computation.

At startup, following initialization, the sequence of steps followed by the measurements control 350 begins after both the axis rotor speed OK flag and the test rotor speed OK flag have been set. Thereafter, the measurements control repeats the sequence of steps continuously, once for each measurement cycle period t**, throughout all the time that the apparatus is operating.

16. Counter Banks

The axis rotor counter bank 360 and the test rotor counter bank 370 are substantially identical. The function of these counter banks is to obtain rotations counts data for determining rotations of the rotors WRT the frame, as described previously.

Each counter bank comprises a gate control which responds to signals from the measurements control 350, and two modes of counters. Each counter bank interacts with other data-processing components, as indicated in FIG. 11A, thus: the axis rotor counter bank 360 receives the axis rotor pickoff (pulse stream) signal $\omega_1(t)$, through signal conditioner 310; the test rotor counter bank 370 receives the test rotor pickoff (pulse stream) signal $\omega_2(t)$, through signal conditioner 320; both counter banks receive timed control signals from the measurements control 350; and both counter banks provide rotations counts data directly to the measurements control 350 (which makes it available to the RTR computer 380).

Figure 11B:
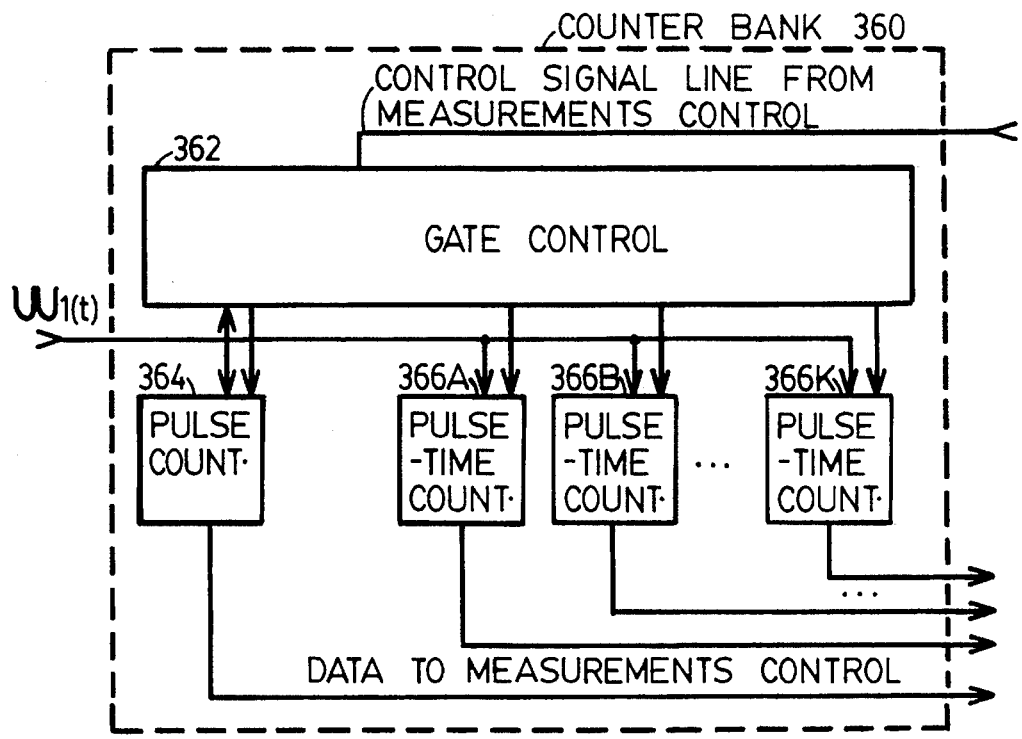
FIG. 11B is a block diagram representation of a counter bank.

The apparatus and operation of the axis rotor counter bank 360 and the test rotor counter bank 370 are substantially identical. For economy of description, the following specifically describes the apparatus and operation of the axis rotor counter bank 360: similar description applies to the test rotor counter bank 370. FIG. 11B is a block diagram representation of the axis rotor counter bank 360, comprising gate control 362, pulse counter 364, and pulse-time counters 366A, 366B . . . 366K.

Counter bank 360 comprises one pulse counter 364 (or more for redundancy) which counts the numbers of pickoff pulses in the axis rotor pickoff pulse stream during a measurement period of duration t*. Each 'pulse count' indicates the number of whole rotations of the axis rotor WRT the frame during a measurement period. The pulse counter 364 is enabled at the start of the measurement period, when the gate control 362 receives the appropriate control signal from the measurement control unit 350. The pulse counter is disabled at the end of the measurement period, when the gate control receives the appropriate control signal from the measurement control unit. The pulse count must unambiguously enumerate all the pulses during the measurement period and none outside it. At the end of each measurement period, the pulse count is read and stored by the measurements control 350, and the pulse counter is reset to zero, in readiness for the next measurement period.

Counter bank 360 also comprises a number of pulse-time counters 366A, 366B, . . . 366k which determine the times of individual pickoff pulses in the axis rotor pickoff pulse stream, at the start and at the end of a measurement period. Each 'pulse-time count' indicates the time of an individual pickoff pulse.

Each pulse-time counter is a free-running counter which counts the high frequency pulses from the timing clock 340: at any moment, the count in each counter represents current time. Each pulse-time counter is latched to temporarily 'freeze' the count upon receiving the appropriate latch signal: consequently, the 'frozen' count in the pulse-time counter represents time at the moment the pulse-time counter received the latch signal. The counter bank gate control circuitry is arranged so that it responds to the signal from the measurement control 350 to initiate the pulse-time counters, by having the subsequent 1st pickoff pulse latch the 1st pulse-time counter (366A), the 2nd pickoff pulse latch the 2nd pulse-time counter (366B), . . . until all of the pulse-time counters have been latched. After sufficient time has been allowed to latch all of the pulse-time counters in the counter bank, the measurement control 350 reads and stores these pulse-time counts (which indicate the times of the 1st pickoff pulse, the 2nd pickoff pulse . . . ) and unlatches the pulse-time counters for the next measurements.

One such series of pulse-times (pulse-time counts) is obtained at the start and another series is obtained at the end of each measurement period. These pulse-times are obtained for non-linear interpolations to determine the start-part and end-part rotations of the rotor WRT the frame, as described earlier, especially with reference to FIGS. 8A & 8B. Consequently, the first pulse-time of a series is for shortly before the start (or the end) of a measurement period, and the last pulse-time of a series is for shortly after the start (or end) of the measurement period. The counter bank comprises a sufficient number of pulse-time counters to ensure sufficient data for the non-linear interpolations, under all expected operating conditions.

Those skilled in the art will readily understand how to construct and operate a gate control and counters to meet the requirements of a specific application.

17. Measurements Control Program

FIG. 12 is a logic flow diagram illustrating sequential steps performed by the measurements control 350, to obtain rotations counts data.

FIG. 12 is an outline, for illustration purposes, of one particular sequence of program steps for measurements control. This program begins when the apparatus is turned on, but does not proceed past the first steps until the axis rotor speed OK flag and the test rotor speed OK flag have been set. The first part of the program (steps 12-1 to 12-5) is for initialization: this part is executed only once. The remainder of the program (steps 12-6 to 12-26) is for obtaining rotations counts data (ie, pulse counts and pulse-time counts): this part is repeated continuously throughout all the time that the apparatus is operating.

At step 12-1 the program initializes parameter values and flags. Specifically, this includes clearing the axis rotor speed OK flag and the test rotor speed OK flag and setting to zero the initial counts in all the counters whose counts represents current time (including the pulse-time counters in the counter banks), ensuring that these pulse-time counters are unlatched, and setting the pulse counters to zero. The program then proceeds to step 12-2 where it determines whether the axis rotor speed OK flag is set. This flag is set by the axis rotor speed control unit 312 to indicate that the axis rotor is at operating speed. Assuming that this flag is initially not set, the program halts here until it is. The program then proceeds to step 12-3 where it determines whether the test rotor speed OK flag is set. Assuming that this flag is initially not set, the program halts here until it is. The program then proceeds to step 12-4. At this step in the program, both the axis rotor and the test rotor are at operating speeds.

At step 12-4 the program initiates orienting the test rotor to the same orientation as the axis rotor, by sending the appropriate signal to the power supply 400, which directly energizes the rotary actuator 250. At step 12-5 the program further initializes parameter values and flags. Specifically, this includes setting initial values for the measurement period start time $T_S$ and the measurement period end time $T_E$, based on current time, and setting the orientation flag to same orientation.

With the completion of step 12-5, the initialization is completed and the first set of rotations measurements can be started. The following program steps comprise a repeating sequence for obtaining the rotations counts which indicate the numbers and times of pick-off pulses. These steps are repeated once every measurement cycle period t**. (As described, these rotations counts are the raw data used by the RTR computer to determine the rotations of the axis and test rotors WRT the frame, on which the other computations are based.)

The program then proceeds to step 12-6 where the program determines whether the current time T has reached $T_S$-t' (where $T_S$ is the next measurement start time, and t' is a time allowance sufficient for several pickoff pulses before $T_S$). Assuming that initially the current time T has not reached $T_S$-t', the program halts at this step until it has. Once the current time T has reached $T_S$-t', the program proceeds to step 12-7 where it initiates the pulse-time counters in the axis and test rotor counter banks 360 & 370 by sending appropriate signals to the counter banks. In both of these counter banks, the gate control circuitry is arranged so that the subsequent 1st pick-off pulse latches the 1st pulse-time counter, the 2nd pick-off pulse latches the 2nd pulse-time counter, . . . as described previously.

After initiating the pulse-time counters, the program proceeds to step 12-8 where it determines whether the current time T has reached $T_S$. Assuming that initially it has not, the program halts at this step until it has. The program then proceeds to step 12-9 where it initiates the axis and test rotors pulse counters, to count the numbers of pick-off pulses during the measurement period between times $T_S$ and $T_E$. This is done by sending appropriate signals to the counter banks' gate controls to enable the pulse counters. (It is vital to determine the precise number of pulses during the measurement time period between $T_S$ and $T_E$, since these indicate the number of whole rotor rotations during the measurement period. This is an important consideration for detailed design because occasionally the first pulse or the last pulse will coincide or nearly coincide with $T_S$ or $T_E$, respectively. One method of dealing with such potential ambiguity is to have, in each counter bank, one pulse-time counter which is latched by the first pick-off pulse after the pulse counter has been enabled, and another pulse-time counter which is latched by the first pick-off pulse after the pulse counter has been disabled. An examination of the pulse-times, perhaps as a sub-routine executed by the RTR computer, can then be used to clear up any potential ambiguity and make a correction if indicated.)

The program then proceeds to step 12-10 where it determines whether the current time T has reached $T_S+t''$ (where $t''$ is a time allowance sufficient to ensure that all the pulse-time counters in the counter banks have been latched). Assuming that it has not, the program halts at this step until it has. The time allowances $t'$ and $t''$ ensure that sufficient pulse-time counts are recorded in the counter banks to make non-linear interpolations for the start part and end part rotations. These non-linear interpolations are as described previously with reference to FIGS. 8A & 8B, and executed at steps 13-7 and 13-8 of the RTR computer program, FIG. 13. Sufficient time allowances and a sufficient number of pulse-time counters are provided to ensure sufficient data. The same time allowances are provided before and after $T_E$.

Once the current time T has reached $T_S+t''$, the program proceeds to step 12-11 where it reads and stores the start pulse-time counts for later use by the RTR computer program (FIG. 13) and then unlatches the pulse-time counters so that they are available for the end part rotations measurements. At step 12-12 the program increments $T_S$ to $T_S+t''$, for the start of the next measurement period. (As described, $t^{**}$ is the measurement cycle period.)

The program then proceeds to step 12-13 where it determines whether the current time T has reached $T_E-t'$ (where $T_E$ is the measurement period end time). Assuming that initially it has not, the program halts at this step until it has. Once the current time T has reached $T_E-t'$, the program proceeds to step 12-14 where it initiates the pulse-time counters, as described above for step 12-7.

The program then proceeds to step 12-15 where it determines whether the current time T has reached $T_E$. Assuming that it has not, the program halts at this step until it has. Once the current time T has reached $T_E$, the program proceeds to step 12-16 where it terminates the axis and test rotors pulse counters. This is done by sending appropriate signals to the counter banks' gate controls to disable the pulse counters.

The program then proceeds to step 12-17 where it determines whether the current time T has reached $T_E+t''$. Assuming that it has not, the program halts at this step until it has. Once the current time T has reached $T_E+t''$, the program proceeds to step 12-18 where it reads and stores the end pulse-time counts for later use by the RTR computer program (FIG. 13) and then unlatches the pulse-time counters so that they are available for later use. At step 12-19 the program reads and stores the pulse counts for later use by the RTR computer program (FIG. 13) and then resets the pulse counters to zero so that they are available for subsequent measurements. At step 12-20, the program increments $T_E$ to $T_E+t^{**}$, for the end of the next measurement period.

The program then proceeds to step 12-21 where it determines whether or not the orientation flag is set to orientation same. Assuming that it is (indicating that the just-completed measurements have been made with the axis and test rotors rotating in the same direction), the program proceeds to step 12-22 where it clears the flag (to indicate orientation opposite). It then proceeds to step 12-23 where it initiates orienting the test rotor to the opposite orientation as the axis rotor, by sending the appropriate signal to the power supply 400, which directly energizes the rotary actuator. (The next measurements will be made with the axis and test rotors rotating in opposite directions.) The program then proceeds to step 12-26 where it sets the measurements completed flag to indicate to the RTR computer 380 that measurements have been completed and rotations counts data is available for computation.

The program then returns to step 12-6 where it again determines whether the current time T has reached $T_S-t'$, to begin the next measurement period. Assuming that it has not, the program halts here until it has. The program then proceeds through steps 12-7 to 12-20. At step 12-21 the program again determines whether or not the orientation same flag is set. Assuming now that it is not, the program proceeds to step 12-24 where it sets the flag (to indicate orientation same). It then proceeds to step 12-25 where it initiates orienting the test rotor to the same orientation as the axis rotor, by sending the appropriate signal to the power supply 400, which directly energizes the rotary actuator. (The next measurements will be made with the axis and test rotors rotating in the same direction.) The program then proceeds to step 12-26 where it again sets the measurements completed flag.

The program repeats steps 12-6 through 12-26 continuously during all the time that the apparatus is operating, with the test rotor alternating between same and opposite orientations during alternate passes through these steps. The program repeats these steps once each measurement cycle time period $t^{**}$.

18. RTR Computer

The RTR computer 380 determines the RTR equation following the steps described previously, especially with reference to FIGS. 8A, 8B, 10A & 10B, and the summary of computation steps.

The RTR computer 380 comprises computation means, namely a microcomputer, which executes a sequence of program steps: these steps are described following, with reference to the logic flow diagram of FIG. 13. The RTR computer interacts with other data-processing components, as indicated in FIG. 11A, thus: starts computations after the measurements completed flag has been set by the measurements control 350 to indicate that rotations counts data is available for the computations; makes computations according to the orientation of the test rotor, as indicated by the orientation flag which is also set by the measurements control 350; obtains rotations counts data from the counter banks 360 & 370 indirectly through measurements control 350; makes RTR equations available to the reference signal generator 390; and sets the new RTR equation flag to indicate to the reference signal generator 390 that a new RTR equation is available.

At startup, following initialization, the sequence of computations by the RTR computer 380 begins after the measurements completed flag has been first set by the measurements control 350 to indicate the availability of a set of rotations counts data. Thereafter the RTR computer repeats the computations continuously as rotations counts data become available, once for each measurement cycle period $t^{**}$, with computations for same direction of rotation alternating with computations for opposite direction of rotation according to the orientation of the test rotor, throughout all the time the instrument is operating.

19. RTR Computer Program

FIG. 13 is a logic flow diagram illustrating sequential steps performed by RTR Computer 380 to produce an RTR equation.

FIG. 13 is an outline, for illustration purposes, of one particular sequence of program steps to produce an RTR equation. This program begins when the apparatus is turned on, but does not proceed past the second step (13-2) until the first measurements completed flag has been set. The first part of the program (step 13-1) is for initialization. The second part of the program (steps 13-2 to 13-10) is for determining the rotations of the axis and test rotors WRT the frame. The third part of the program (steps 13-11 to 13-22) is for combining the rotations determined in the first part of the program, to determine relative rotations of the axis and test rotors, according to their relative orientation. The fourth and last part of the program (steps 13-23 to 13-31) is for determining the RTR equation. The first step of the program is executed only once: the remainder of the program is repeated continuously, as rotations counts data become available, once each measurement cycle period t**, with computations for same direction of rotation alternating with computations for opposite direction of rotation, throughout all the time that the apparatus is operating.

At step 13-1 the program initializes data processing parameters. Specifically, this includes clearing the measurements completed flag and clearing memory of previous data values, particularly values for $\theta_{REL/SAME}$ and $\theta_{REL/OPP}$, and setting the base value to zero. The program then proceeds to step 13-2 where it determines whether the measurements completed flag is set. Assuming that initially it is not set, the program halts here until it is. This flag is set at measurements control program step 12-26 (FIG. 12) to indicate that the pulse-time counts and the pulse counts have been read from the axis and test rotors' counter banks 360 & 370 and stored, and are available for further processing.

The program then proceeds to step 13-3 where it clears the measurements completed flag, to step 13-4 where it reads and stores the start pulse-time counts (for both the axis rotor and the test rotor), to step 13-5 where it reads and stores the end pulse-time counts (for both the axis rotor and the test rotor), and to step 13-6 where it reads and stores the pulse counts (for both the axis rotor and the test rotor). These rotations counts are read from memory, as stored by the measurements control program (FIG. 12), and then stored again by the RTR computer program for its own use. Steps 13-4, 13-5 and 13-6 must be completed before corresponding new data is stored by the measurements control program (FIG. 12), at steps 12-11, 12-18 and 12-19, respectively.

At step 13-7 the program determines the start part rotations (of the axis rotor and the test rotor). This is accomplished through non-linear interpolation, as described earlier with reference to equation 4 and FIGS. 8A & 8B. The program then proceeds to step 13-8 where it similarly determines the end part rotations (of the axis rotor and the test rotor). At step 13-9, the program determines the integer number of whole rotations (of the axis rotor and the test rotor). (See also the note corresponding to step 12-9 in the measurements control program of FIG. 12.)

At step 13-10 the program determines the total rotations of the axis rotor and the test rotor WRT the frame, during the measurement period t*. This is accomplished by adding together the start part rotation (determined at step 13-7), the end part rotation (determined at step 13-8) and the integer number of whole rotations (determined at step 13-9). The total rotations of the axis rotor and the test rotor WRT the frame during the measurement period t* are designated by $\theta_{AXIS/FRAME}$ and $\theta_{TEST/FRAME}$, respectively. These rotations are illustrated in FIGS. 8A, 8B, 9A & 9B and are first used in equations 5 and 6. Determining these total rotations is designated as STEP 1 in FIG. 8A and in the summary of computation steps.

The program then proceeds to step 13-11 where it determines whether the orientation of the just-completed measurements was for same or opposite directions of rotation. This is accomplished by determining the present status of the orientation flag, as set at measurement control step 12-24 or cleared at step 12-22: the status for the just-completed measurements, for which the present calculations are being made, is opposite to the present status. (Step 13-11 must be completed before the next time the orientation flag is set or cleared.) Assuming that the orientation was for same direction of rotation, the program proceeds to step 13-12.

At step 13-12 $\theta_{REL/SAME}$ is determined according to equation 7 (STEP 2 in FIG. 10A). At step 13-13 this new $\theta_{REL/SAME}$ value is stored and any excess outdated value (in excess of the specified number kept for computations) is discarded. At step 13-14 the program determines whether the specified number of $\theta_{REL/SAME}$ values exist. Initially there are fewer than this number and the program bypasses further processing and returns directly to step 13-2.

At step 13-2, the program again determines whether the measurements completed flag is set, indicating that a new set of rotation measurements (namely pulse-time counts and pulse counts) is available for the just-completed measurement period. Assuming that the flag is initially not set, the program halts here until it is.

From step 13-2 the program proceeds as described previously, through to step 13-11 where it again determines whether the orientation status of the just-completed measurements was for same or opposite directions of rotation. Assuming now that the orientation was for opposite directions of rotation, the program proceeds to step 13-18.

At step 13-18 $\theta_{REL/OPP}$ is determined according to equation 9 (STEP 2 in FIG. 10A). At step 13-19 this new $\theta_{REL/OPP}$ value is stored and any excess outdated value (in excess of the specified number kept for computations) is discarded. At step 13-20 the program determines whether the specified number of $\theta_{REL/OPP}$ values exist. Initially there are fewer than this number and the program bypasses further processing and returns directly to step 13-2.

From step 13-2 the program proceeds as described previously, through to step 13-11 where it again determines whether the orientation status of the just-completed measurements was for same or opposite directions of rotation, and then proceeds as appropriate. The program continues to cycle through the steps from step 13-2 to step 13-14 or step 13-20 until the specified number of $\theta_{REL/SAME}$ values are available. When this happens, the program determines at step 13-14 that the specified number of $\theta_{REL/SAME}$ values is available, and proceeds to step 13-15. (It is assumed that the same specified number of values is set for both $\theta_{REL/SAME}$ and $\theta_{REL/OPP}$.)

At step 13-15 the program determines a new $\theta_{REL/SAME}=g(t)$ function by fitting a curve through the $\theta_{REL/SAME}$ values (STEP 3 in FIG. 10A). At step 13-16 this new $\theta_{REL/SAME}=g(t)$ function is stored for further processing.

At step 13-17 the program determines whether any $\theta_{REL/OPP}=f(t)$ function exists. The first time step 13-17 is reached, the first g(t) function is available, but no f(t) function is available. With no f(t) function available, the program bypasses further processing and returns directly to step 13-2. Since further processing requires both functions f(t) and g(t) this bypass is necessary. This bypass is used only once, this first time the program reaches step 13-17.

On the next pass, the program proceeds from step 13-2 to step 13-20 where it once more determines whether the specified number of $\theta_{REL/OPP}$ values exist. On this pass there will be the specified number. The program then proceeds to step 13-21 where it determines a new $\theta_{REL/OPP}=f(t)$ function by fitting a curve through the $\theta_{REL/OPP}$ values (STEP 3 in FIG. 10A). At step 13-22 this new $\theta_{RELJOPP}$=f(t) function is stored for further processing. The program then proceeds to step 13-23.

At step 13-23, the program recalls the functions $\theta_{RELJ\ OPP}$=f(t) and $\theta_{RELJSAME}$=g(t). At step 13-24 these functions are used to determine $\theta_{AXIS/IFR}$=h(t) according to equation 12 (STEP 4 in FIG. 10A). At step 13-25 a series of values of $\theta_{AXIS/IFR}$=h(nt*) are determined for integer multiples (n=N and greater) of the measurement time period t* (STEP 5 in FIG. 10A). At step 13-26, h(Nt*) (or h(Nt*)+h([N+1] t*)) is used to determine a new base value for H(t), namely H([N+1]t*) (or H([N+2]t*)) (STEP 6 in FIG. 10B). On the first pass, the old base value will be zero, as set arbitrarily at step 13-1. At step 13-27 the new base value is stored for later use.

At step 13-28 the series of values of $\theta_{AXIS/IFR}$= h(nt*) determined at step 13-25, is used to determine a series of values for $\theta_{AXIS/CUM}$=H([n+1]t*) (STEP 7 in FIG. 10B). At step 13-29 a new RTR equation t=H'($\theta_{AXIS/CUM}$) is determined by fitting a curve through the series of $\theta_{AXIS/CUM}$ vs time values (STEP 8 in FIG. 10B). At step 13-30 this new RTR equation is stored for use by the reference signal generator 390. At step 13-31 the program sets the new RTR equation flag, to indicate that a new RTR equation is available. The program then returns to step 13-2.

After the first complete pass through steps 13-2 to 13-31, the bypasses at steps 13-14, 13-17, and 13-20 are not used again. Thereafter the program repeats the steps 13-2 to 13-31 continuously, as rotations counts data become available, once for each measurement cycle period t, with computations for same direction of rotation alternating with computations for opposite direction of rotation according to the orientation of the test rotor, throughout all the time the instrument is operating. A complete pass through this program must take no longer than a measurement cycle period t, in order to keep up with the measurements control program. Normally, it will take less time, and consequently the program will wait each time at step 13-2.

20. Reference Signal Generator

The reference signal generator 390 produces the reference signal pulses according to the times defined by the RTR equation.

Figure 14:
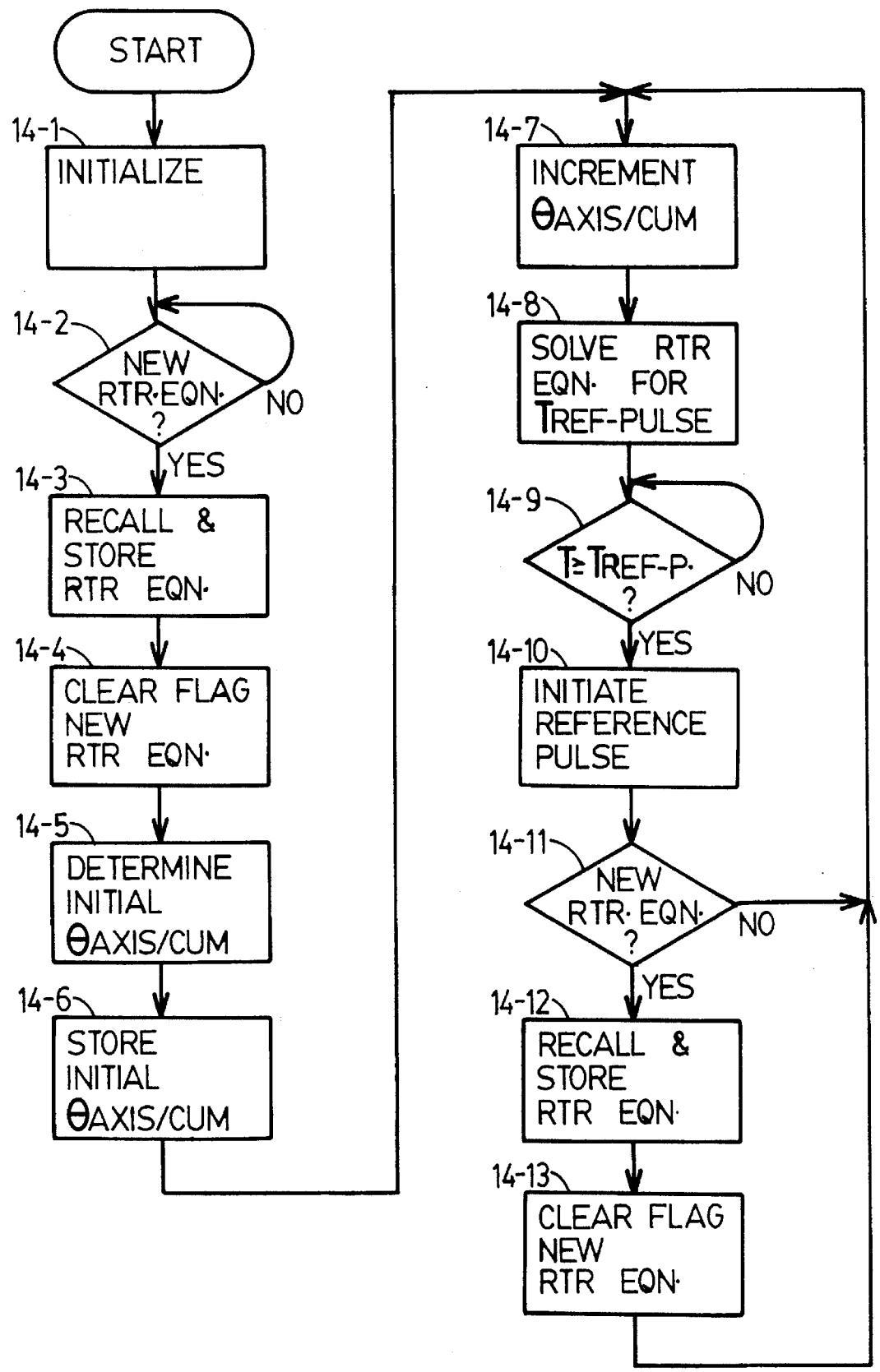
FIG. 14 is a logic flow diagram illustrating sequential steps to produce reference pulses.

The reference signal generator 390 comprises computation means, namely a microcomputer, which executes a sequence of program steps: these steps are described following, with reference to the logic flow diagram of FIG. 14. The reference signal generator also comprises means for producing reference pulses in the form required as input to the phase comparator 392. The reference signal generator 390 interacts with other data-processing components, as indicated in FIG. 11A, thus: obtains a new RTR equation from memory, after the new RTR equation flag has been set by the RTR computer 380; and, provides the reference (pulse stream) signal $\omega_R(t)$ to phase comparator 392.

At startup, following initialization, the sequence of computations by the reference signal generator begins after the new RTR equation flag has been first set by the RTR computer program to indicate the availability of a new RTR equation. The reference signal generator 390 uses an RTR equation to produce the reference pulse stream in real time, as described previously. More specifically, the reference signal generator 390 solves the RTR equation, which defines time as a function of cumulative rotations of the axis rotor WRT an IFR, to determine successive (future) times which correspond to successive (future) integer values of cumulative rotations, and produces a pulse whenever present time reaches such a time. The computations and pulse generation are repeated continuously, once for each rotation of the axis rotor WRT an IFR. An RTR equation is used until a newer one becomes available, as indicated by the next setting of the RTR equation flag.

21. Reference Signal Generator Program

FIG. 14 is a logic flow diagram illustrating sequential steps performed by the reference signal generator 390 to produce reference pulses.

FIG. 14 is an outline, for illustration purposes, of one particular sequence of program steps for producing reference pulses. This program begins when the apparatus is turned on, but does not proceed past the second step (14-2) until the new RTR equation flag is first set. The first part of the program (steps 14-1 to 14-6) is executed only once: the second part of the program (steps 14-7 to 14-13) is repeated continuously throughout all the time that the apparatus is operating, once for each rotation of the axis rotor WRT an IFR.

At step 14-1 the program initializes the data-processing parameters. Specifically, this includes clearing the new RTR equation flag. At step 14-2 the program determines whether the new RTR equation flag is set. This flag is set at step 13-31 of the RTR computer program (FIG. 13) to indicate that a new RTR equation is available. Since at startup none is available, the program halts here until it is.

Once the first RTR equation is available, the program proceeds to step 14-3 where it recalls the new RTR equation t=H'($\theta_{AXIS/CUM}$) from memory (where it was stored at step 13-30 of the RTR computer program) and stores it again in a way to be readily used by this program. At step 14-4 the program clears the new RTR equation flag.

At step 14-5 the program determines an initial value for $\theta_{AXIS/CUM}$. To do this, the program solves the RTR equation t=H'($\theta_{AXIS/CUM}$) to determine the value of $\theta_{AXIS/CUM}$ which corresponds to t=T, the current time: the integer portion of this value of $\theta_{AXIS/CUM}$ is used as the initial value for further computations. This initial value of $\theta_{AXIS/CUM}$ corresponds to the time for the last reference pulse. At step 14-6 this initial value of $\theta_{AXIS/CUM}$ is stored for further computations.

The program then proceeds to step 14-7 where it increments the initial value of $\theta_{AXIS/CUM}$ by 1 to the next integer value. (At the completion of this step, $\theta_{AXIS/CUM}$ has the integer value corresponding to the time for the next reference pulse.)

At step 14-8 the program solves the RTR equation t=H'($\theta_{AXIS/CUM}$), using the newly incremented integer value of $\theta_{AXIS/CUM}$, to determine the corresponding time, $T_{REF-PULSE}$. This time, $T_{REF-PULSE}$, indicates the (future) time of the next integer rotation of the axis rotor. The program then proceeds to step 14-9 where it determines if current time T has reached or passed pulse time $T_{REF-PULSE}$. Assuming that initially it has not, the program halts here until it has. When current time T reaches or passes the pulse time $T_{REF-PULSE}$, the program proceeds to step 14-10 where it initiates a reference pulse.

The program then proceeds to step 14-11 where it again determines whether or not the RTR equation flag is set. Assuming that it is not (thus indicating that a new RTR equation is not available and the one used previously must be used), the program bypasses steps 14-12 and 14-13.

The program then returns to step 14-7 where it again increments $\theta_{AXIS/CUM}$ to obtain the next integer value, and then on to step 14-8 where it again solves the RTR equation for this next value of $\theta_{AXIS/CUM}$ to determine the corresponding next pulse time $T_{REF-PULSE}$. The program then proceeds to step 14-9 where it waits until current time T reaches or passes pulse time $T_{REF-PULSE}$, and then to step 14-10 where it initiates another reference pulse. The program then continues on to step 14-11 where it again determines whether or not the RTR equation flag is set.

The program continues to cycle through steps 14-7 to 14-11, once for each rotation of the axis rotor WRT the IFR, during all the time that the apparatus is operating. In most cases the program will bypass steps 14-12 and 14-13. Occasionally, the new RTR equation flag will be set, indicating that a new RTR equation is available. When this occurs, the program proceeds through step 14-12, where it obtains the new RTR equation and stores it in a way to be readily used by this program, and step 14-13, where it clears the flag. It then returns to step 14-7 where it proceeds again as described above. For example: With a rotor speed of 6000 rev/min=100 rps WRT an IFR, the program cycles through the loop once every 0.01 seconds. With a measurement cycle period $t^{}$ of 65 seconds, a new RTR equation is available at 65 second time intervals. Consequently, the program obtains a new RTR equation and goes through steps 14-12 and 14-13** once every 6,500 times through the loop.

22. Summary of Operation of Preferred Embodiment

The operation of the preferred embodiment can be summarized with reference to FIGS. 1 and 11A. Axis rotor 110 is made to rotate about axis 112 substantially independently of motion of the support frame and at a speed $\omega'(t)$ substantially constant WRT an IFR and substantially greater than the speed of the frame. Pickoff 114 detects the position of a predetermined point on the rotor relative to the pickoff which is at predetermined point 117 on the frame, as a function of time, and transmits a pickoff signal, in the form of a pulse stream, through signal conditioner 310 to phase comparator 392. In this axis rotor pickoff (pulse stream) signal $\omega_1(t)$, each pulse indicates when the predetermined point on the rotor is adjacent to the predetermined point on the frame.

Simultaneously, reference signal generator 390 produces a reference (pulse stream) signal $\omega_R(t)$, wherein each pulse indicates when the predetermined point on the rotor is adjacent to predetermined point 118 which remains at a fixed orientation about axis 112 WRT an IFR. The reference signal $\omega_R(t)$ is also transmitted to phase comparator 392 which determines the phase relationship between this reference signal and the pickoff signal. If the frame rotates about axis 112, in the same (or opposite) direction as rotation of the axis rotor, the pickoff signal $\omega_1(t)$ will be delayed (or advanced) relative to the reference signal $\omega_R(t)$ and the phase relationship will be shifted correspondingly. If the frame rotates about an axis orthogonal to axis 112, there will be no change in either the pickoff signal $\omega_1(t)$ or the reference signal $\omega_R(t)$ and the phase relationship will not change. Each orientation of the frame about axis 112 corresponds to a unique phase relationship and orientation signal $\phi(t)$: each change in orientation of the frame about axis 112 results in a corresponding non-transient change in the phase relationship and orientation signal $\phi(t)$. Phase comparator 392 transmits the orientation signal $\phi(t)$ to output interface 394 which transforms it as required into a form useful for downstream apparatus and further processing such as for 3-axis orientation determination.

Axis rotor 110 is made to rotate at substantially constant speed WRT an IFR by an Eddy current matched torque rotor drive wherein the axis rotor is simultaneously driven by drive motor 122 through Eddy current coupling 124 and braked by Eddy current brake 126. Braking torque applied by the Eddy current brake is controllably varied to maintain the speed of the rotor constant using a feedback control system wherein the speed of the rotor WRT the IFR is estimated by a 'running average' of the speed of the rotor WRT the frame, as indicated by the frequency of the pickoff signal $\omega_1(t)$. The 'running average' is obtained by converting the frequency of the pickoff signal to a voltage, in a frequency-voltage converter, and filtering the voltage signal in a low-pass filter. The speed signal $\epsilon_1(t)$ so produced is transmitted to a servo amplifier circuit in the power supply 400 which supplies a corresponding brake signal $\beta_1(t)$ to Eddy current brake 126. The Eddy current brake 126 applies a corresponding brake torque to the axis rotor.

The reference signal $\omega_R(t)$ is produced as a result of sequences of measurement and computation steps by the reference signal means which include a test rotor 210, counters, and microcomputers and reference signal generator 390. The test rotor is similar in construction and operation to the axis rotor. It is made to rotate about axis 212 substantially independently of motion of the support frame and at a speed $\omega''(t)$ substantially constant WRT an IFR and substantially greater than the speed of the frame. The most salient difference between the test rotor and the axis rotor is that while the axis rotor is fixed WRT the frame, the test rotor is mounted in a pivot assembly and variably oriented by rotary actuator 250. On demand the test rotor is oriented at a first position, where the two rotors rotate about parallel axes in the same direction, or at a second position, where the two rotors rotate about parallel axes in opposite directions.

To determine the reference signal $\omega_R(t)$, the measurements comprise measuring rotations of the axis rotor and the test rotor WRT the frame during identical preset measurement periods. These measurements are made by counting pickoff pulses and determining pickoff pulse-times, in the axis rotor counter bank 360 and the test rotor counter bank 370. These counter banks are controlled by measurements control 350. The pulse counts and pulse-times are used in appropriate algorithms, by RTR computer 380. The RTR computer produces an RTR equation which defines cumulative rotations of the axis rotor WRT the IFR. The reference signal generator 390 solves the RTR equation to determine, in advance, the times for the reference signal pulses, and produces the reference pulses at these times.

The power supply 400 provides power to all the apparatus, as required. The timing clock 340 provides a stable high frequency clock signal for timing purposes, divided as necessary, to all apparatus requiring it and especially to the measurements control and pulse-time counters.

23. Alternative Embodiments

While the preferred embodiment of the invention has been described and illustrated, it will be appreciated by one skilled in the art that alternative embodiments of both apparatus and method may be usefully employed. Some alternatives have been indicated previously. Other alternatives are described following.

23.(a) Centrifugal Force Speed Control

For the purpose of rotor speed control, the rotational speed of a rotor WRT an IFR may be determined from a measure of 'centrifugal force' (centripetal acceleration) which is a simple function of speed WRT an IFR. Devices suitable for measuring centrifugal force include devices specifically for that purpose and devices for measuring linear acceleration (which can be used singly or in a suitable array). Such devices are well-known to those skilled in the art.

Figure 15:
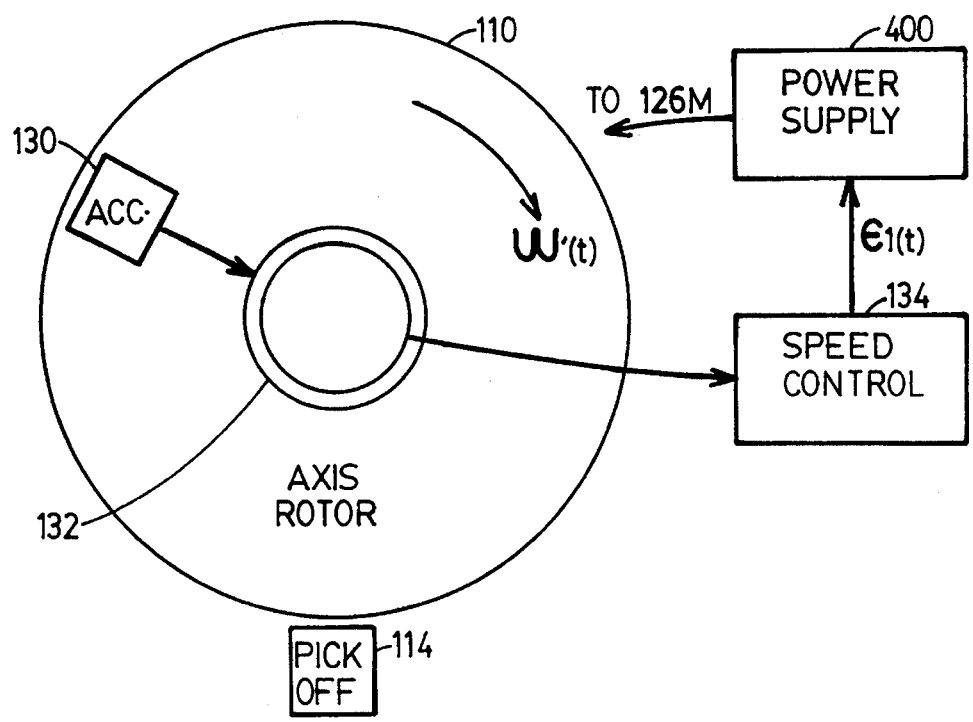
FIG. 15 is a partly schematic and partly block diagram representation of speed control apparatus comprising a centrifugal force sensor.

In principle, there are many possibilities for rotor speed feedback control systems in which the output from a device for measuring centrifugal force is used, directly or indirectly, to govern rotor speed. FIG. 15 is a partly schematic and partly block diagram representation of a portion of such a rotor speed feedback control system comprising an accelerometer 130 which is mounted on or within axis rotor 110 and connected through mercury-wetted rotating contacts 132 to a speed-control unit 134.

In the embodiment illustrated in FIG. 15, accelerometer 130 outputs a D.C. voltage signal corresponding to centrifugal force (centripetal acceleration) due to rotation of the axis rotor. This D.C. voltage signal is directly transmitted through mercury-wetted rotating contacts 132 to speed-control unit 134 which transforms it as required to produce a speed signal $\epsilon_1(t)$ representing the speed of the rotor WRT the IFR. Speed-control unit 134 also performs startup functions similar to that of the speed-control unit 312 of the preferred embodiment. An advantage of a rotor speed feedback control system using a measure of centrifugal force is that the speed signal $\epsilon_1(t)$ may be available immediately on startup and continuously thereafter.

It will be apparent to one skilled in the art of feedback control systems how a suitable rotor speed feedback control system comprising a device for measuring centrifugal force may be constructed and operated, especially in light of previous comments regarding the preferred embodiment.

23.(d) Freewheeling Drive

In a freewheeling drive, the driving torque, which may be generated by any one of a number of suitable means, initiates rotation and drives the rotor until its speed reaches a preselected speed, and thereafter ceases to drive the rotor which continues to 'freewheel', that is, rotate freely subject to friction. In other words, in such an embodiment, the rotational drive means applies driving torque to the rotor until it gets up to speed and thereafter stops applying driving torque to the rotor.

In this context, the term 'rotational drive means' implies a suitable means for generating the driving torque to rotate the rotor. Such suitable means may take any of a number of forms, including: electric motor drive, gas or other fluid drive, or spring drive. In this context, the term 'maintain rotation' implies that the apparatus permits the rotor to freely rotate (freewheel) at a speed greater than some suitable minimum throughout the period during which it is required to operate. To help maintain the rotation, the apparatus may comprise very low friction bearings and environment.

Such an embodiment of rotational drive means has potential applications where orientation determinations are required for a limited time only. The motion of the rotor can be determined using suitable reference signal means.

23.(c) Optical Rotation Sensor

One alternative embodiment of reference signal means comprises an optical rotation sensor which is coupled to the axis rotor to directly sense motions of the axis rotor WRT an IFR. Optical rotation sensors include fiberoptic and ring laser devices which are well-known to those skilled in the art. Although in principle either fiberoptic or ring laser sensors could be employed, this application lends itself most readily to the use of a fiberoptic sensor.

Figure 16A:
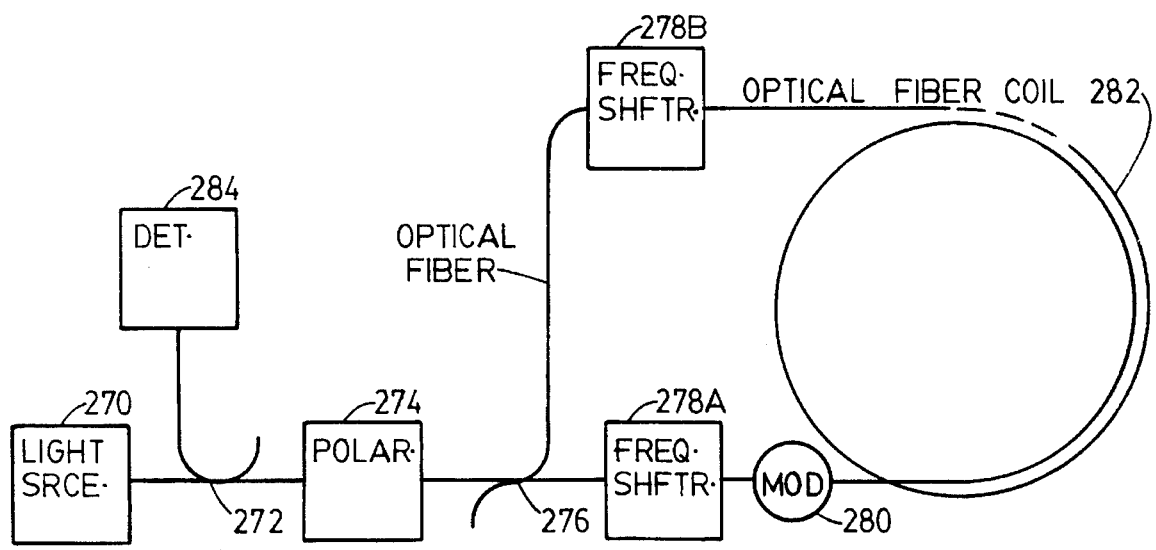
FIG. 16A is a partly schematic and partly block diagram representation of a fiber-optic rotation sensor (see FIG. 4 on page 68 of the aforementioned article by Udd).

FIG. 16A is a PRIOR ART schematic block diagram representation of a digital fiberoptic rotation sensor (gyro), from Udd, E., 1985, FIG. 4, p.68. The digital fiberoptic rotation sensor represented in FIG. 16A comprises the following components, connected by optical fiber: a light source 270, beam splitter 272, polarizer 274, beam splitter 276, frequency shifters 278A & 278B, phase modulator 280, optical fiber coil 282, and detector 284.

Figure 16B:
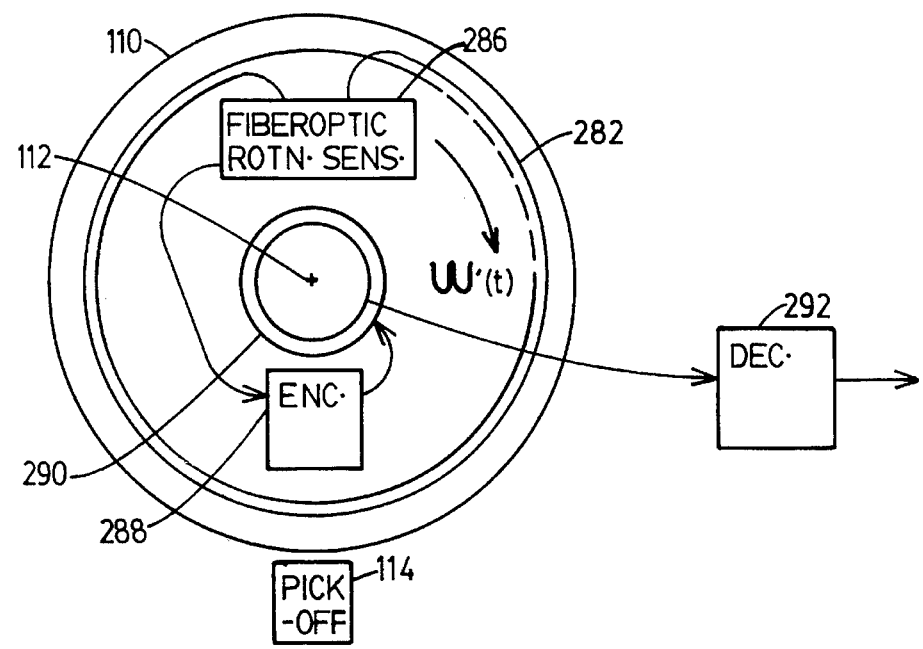
FIG. 16B is a partly schematic and partly block diagram representation of a portion of reference signal means determination apparatus comprising a fiber-optic rotation sensor.

FIG. 16B illustrates a fiberoptic rotation sensor installed within the axis rotor 110. In FIG. 16B, block 286 represents all the components of the fiberoptic rotation sensor, except the optical fiber coil 282 which is shown installed with its (sensitive) axis parallel to the axis of rotation 112 of the axis rotor.

The output from the fiberoptic rotation sensor is transmitted, using suitable transmission means, to computation means for producing the RTR equation. Depending on the specific embodiment of rotational drive means, the output may also be transmitted to appropriate rotor speed feedback control system apparatus. The transmission means may take any one of a number of forms well-known to those skilled in the art. In FIG. 16B the transmission means comprises an encoder 288 for converting the output from the fiberoptic rotation sensor into a signal suitable for transmission through slip ring(s) 290, and decoder 292 for converting the signal into a data form suitable for use by data-processing apparatus for producing the RTR equation.

It will be apparent to one skilled in the art how to adapt an optical rotation sensor for this application. The advantages in using an optical rotation sensor for this application include the ability to determine rotational motion of the axis rotor WRT an IFR almost immediately after startup: this results in reduced start-up time. Another advantage lies in the ability to determine rotational motion continuously after start-up: this results in shorter extrapolation times for the measured rotational motion of the axis rotor, resulting potentially in greater accuracy. Another advantage lies in requiring no test rotor.

23.(d) Variations in Reference Signal

In order for the instrument depicted in FIG. 1 to work as described, it is necessary to have a reference signal $\omega_R(t)$ which represents $\omega'(t)$ the true but not directly determinable rotational position of the axis rotor WRT an IFR as a function of time.

$\omega'(t)$ the rotational position of the axis rotor WRT an IFR, as a function of time, must be determined using reference signal means in order to produce the reference signal $\omega_R(t)$. Such means may be integral with the instrument or separable from it, and may be used on an ongoing periodic basis while the instrument is operating, or may be used only once or a few times.

In the preferred embodiment, the reference signal means, namely the test rotor and associated apparatus and the reference signal generator 390, are integral with the instrument and used on an on-going periodic basis while the instrument is operating. The reference signal is obtained from short-term extrapolations of the measured data. Other reference signal means suitable for such on-going use include optical rotation sensors.

For some applications, however, it may be not feasible or not desirable to have all of the reference signal means integral with the part of the instrument necessary for real-time orientation determination. Such applications may include those with weight and/or size restrictions, and those in which the instrument is expendable, able, especially those with limited required operating times and/or limited accuracy requirements. For such applications, part of the reference signal means may be separable and the reference signal obtained from longer-term extrapolations of the measured data, as a "predefined estimate".

A predefined estimate may be based on an initial determination of rotational motion of the axis rotor and possibly on final and/or intermediate determinations. The final and intermediate determinations may be used as a check on operation, and possibly to make corrections. The predefined estimate may also be based on theoretical and/or experimental data related to motions of the rotor with time. For example: In an embodiment comprising a free-wheeling drive, such a predefined estimate might be based on an accurate initial determination of rotor motion and on an experimentally determined slow-down rate. Generally, reference signals based on a predefined estimate will lack the precision of those based on ongoing periodic determinations.

Seperable reference signal means may be attached temporarily to the support frame (or body or carrying vehicle or other supporting structure). Such means may take the same forms as for on-going use (eg. test rotor) or take other forms. For example: Such means might comprise means for determining the orientation of an instrument which is stationary WRT the Earth and WRT true North-South whereby the initial motion of the rotor WRT an IFR may be determined from its motion WRT the instrument and the known motion of the Earth.

One specific potential application for instruments employing such predefined estimates is for well-logging in the petroleum industry. In this application, there are size limitations and limited operating time. Also, it is feasible to determine the rotor motion and orientation WRT the Earth at the beginning and the end of a measurement period.

If a rotational drive means accurately maintains the motion of the axis rotor at a known constant speed WRT an IFR, it is only necessary that the reference signal means produces the reference signal in a suitable form, on an on-going basis. Although the demands for such a constant speed drive means are severe, such drive means are, in principle, achievable. For example: A constant speed rotor could be based on centrifugal force (centripetal acceleration), which is a simple function of rotation WRT an IFR. Other possibilities include devices based on the speed of light or other wave forms, or based on atomic processes.

A constant speed drive means such as described above may be in a form or operate at a speed which is not suitable for use as an axis rotor. But it could possibly be used as a "reference rotor" as an alternative reference signal means. That is, the motion of the axis rotor WRT an IFR could be determined WRT such a reference rotor by comparisons of motions over corresponding periods. Such a reference rotor would have the advantage over a test rotor in that it would not have to be mounted in movable support means.

24. Conclusions, Ramifications & Scope of the Invention

In summary, improved inertial rotation sensing apparatus and method, which provide numerous advantages, and disadvantages of the prior art, have been described in detail. More specifically, the invention provides inertial rotation sensing means with: mechanical simplicity; wide dynamic range without hysteresis or dead-band; fast reaction time; and potential for high accuracy.

While the preferred embodiment and some specific alternative embodiments of the apparatus and method of the invention have been described and illustrated, it will be appreciated that various additional changes may be made therein without departing from the spirit and scope of the invention.

While specific embodiments of rotational drive means have been described, it is clear that other means whereby the speed of a rotor is maintained substantially constant WRT an IFR could also be used.

While particular sequences of program steps, for various functions, have been outlined for purposes of illustration, other sequences could also be used. And while a specific mathematical approach has been taken to the analysis and data-processing, other approaches are also possible.

While the invention has been described in conjunction with orientation apparatus for use in navigable vehicles and with determining true North-South for use in navigation and surveying, the invention may also find use in other environments wherein the motions of a body WRT an IFR may need to be determined without recourse to external references. As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Inertial rotation sensing apparatus for determining orientation of a body, about a first axis fixed with respect to said body, and with respect to an inertial frame of reference, said apparatus comprising:

(a) a first rotatable member rotatable about said first axis;

(b) a first rotational drive means for initiating and maintaining rotation of said first rotatable member about said first axis, substantially independently of motion of said body and at a speed substantially constant with respect to said inertial frame of reference and substantially greater than rotational speeds of said body with respect to said inertial frame of reference;

(c) a first relative position detector means for detecting rotational position of said first rotatable member with respect to said body, and for producing a first output signal $\omega_1(t)$ representative thereof;

(d) reference signal means for generating a reference signal $\omega_R(t)$ representative of rotational position of said first rotatable member with respect to said inertial frame of reference; and (e) comparator means for comparing phase of said first output signal $\omega_1(t)$ with phase of said reference signal $\omega_R(t)$, and for producing an orientation signal $\phi(t)$ representative of said orientation of said body about said first axis and with respect to said inertial frame of reference.

2. Apparatus as defined in claim 1, wherein said reference signal means comprises an optical rotation sensor.

3. Apparatus as defined in claim 1, wherein said first rotational drive means further comprises means for detecting centrifugal force.

4. Apparatus as defined in claim 1, wherein said reference signal means comprises:

(a) a second rotatable member rotatable about a second axis;

(b) a second rotational drive means for initiating and maintaining rotation of said second rotatable member about said second axis, substantially independently of motion of said body and at a speed substantially constant with respect to said inertial frame of reference and substantially greater than rotational speeds of said body with respect to said inertial frame of reference;

(c) a second relative position detector means for detecting rotational position of said second rotatable member with respect to said body, and for producing a second output signal $\omega_2(t)$ representative thereof;

(d) movable support means for supporting said second axis for movement between:
  (i) a first position in which said first and second axes are substantially parallel and said first and second rotatable members rotate in a same direction; and
  (ii) a second position in which said first and second axes are substantially parallel and said first and second rotatable members rotate in opposite directions; and, (e) computation means for combining said first output signal $\omega_1$ with said second output signal $\omega_2(t)$.

5. Apparatus as defined in claim 4, wherein said first rotational drive means further comprises means for detecting centrifugal force.

6. Apparatus as defined in claim 4, wherein said first rotational drive means comprises a matched torque drive wherein driving torque and retarding torque are matched over a speed range and wherein said matched torque drive further comprises speed control means for varying either or both of said driving torque and said retarding torque to maintain the speed of said rotatable member within said speed range and substantially constant with respect to said inertial frame of reference.

7. Apparatus as defined in claim 6, wherein said first rotational drive means further comprises means for detecting centrifugal force.

8. Apparatus as defined in claim 6, wherein said driving torque is supplied through an Eddy current coupling.

9. Apparatus as defined in claim 6, wherein said retarding torque is applied, at least in part, by an Eddy current brake.

10. Apparatus as defined in claim 1, wherein said first rotational drive means comprises a matched torque drive wherein driving torque and retarding torque are matched over a speed range and wherein said matched torque drive further comprises speed control means for varying either or both of said driving torque and said retarding torque to maintain the speed of said rotatable member within said speed range and substantially constant with respect to said inertial frame of reference.

11. Apparatus as defined in claim 10, wherein said driving torque is supplied through an Eddy current coupling.

12. Apparatus as defined in claim 10, wherein said retarding torque is applied, at least in part, by an Eddy current brake.

13. Apparatus as defined in claim 10, wherein said first rotational drive means further comprises means for detecting centrifugal force.

14. Inertial rotation sensing method for determining orientation of a body, about a first axis fixed with respect to said body, and with respect to an inertial frame of reference, said method comprising the steps of:
  (a) coupling a first rotatable member to said body for rotation of said first rotatable member about said first axis;
  (b) rotating said first rotatable member about said first axis, such that rotational motion of said first rotatable member remains substantially independent of motion of said body and at a speed substantially constant with respect to said inertial frame of reference and substantially greater than rotational speeds of said body with respect to said inertial frame of reference;
  (c) determining the rotational motion $\omega_1(t)$ of said first rotatable member with respect to said body:
  (d) providing a reference signal $\omega_R(t)$ representative of rotational position of said first rotatable member with respect to said inertial frame of reference; and
  (e) comparing phase of said first output signal $\omega_1(t)$ with phase of said reference signal $\omega_R(t)$, and producing an orientation signal $\phi(t)$ representative of said orientation of said body about said first axis and with respect to said inertial frame of reference.

15. A method as defined in claim 14, further comprising providing said reference signal as a predefined estimate of said rotational motion of said first rotatable member with respect to said inertial frame of reference.

16. A method as defined in claim 14, further comprising allowing said first rotatable member to freewheel after the rotational speed of said first rotatable member has reached or exceeded a pre-selected speed.

17. A method as defined in claim 14, wherein said providing of said reference signal comprises:
  (a) coupling an optical rotation sensor to said body body; and,
  (b) monitoring the output from said sensor.

18. A method as defined in claim 14, wherein said providing of said reference signal comprises:
  (a) mounting a second rotatable member rotatable about a second axis;
  (b) rotating said second rotatable member about said second axis, such that rotational motion of said second rotatable member remains substantially independent of motion of said body and at a speed substantially constant with respect to said inertial frame of reference and substantially greater than rotational speeds of said body with respect to said inertial frame of reference;
  (c) (i) positioning said second axis such that, during a first interval, said second axis is substantially parallel to said first axis and said second rotatable member rotates about said second axis in a same direction as said first rotatable member rotates about said first axis;
  (ii) determining the relative motion of said first and second rotatable members during said first interval;
  (d) (i) positioning said second axis such that, during a second interval, said second axis is substantially parallel to said first axis and said second rotatable member rotates about said second axis in an opposite direction as said first rotatable member rotates about said first axis;
  (ii) determining the relative motion of said first and second rotatable members during said second interval;
  (e) polating to determine corresponding concurrent values, for relative motion in which said first and second rotatable members rotate in said same direction, and for relative motion in which said first and second rotatable members rotate in said opposite directions; and,
  (f) combining said corresponding concurrent values of relative motion.

19. A method as defined in claim 18, further comprising allowing said first rotatable member to freewheel after the rotational speed of said first rotatable member has reached or exceeded a pre-selected speed.

20. A method as defined in claim 18, wherein said providing of said reference signal further comprises:
  (a) repeating said positioning, determining, polating and combining steps throughout a series of said first and second intervals; and,
  (b) extrapolating to determine combinations corresponding to present time or future times.

21. Inertial rotation sensing method for determining rotational motion of a body, about a first axis fixed with respect to said body, and with respect to an inertial frame of reference, wherein said body maintains a speed which is substantially constant with respect to said inertial frame of reference, said method comprising the steps of:
  (a) mounting a rotatable member for rotation about a second axis;
  (b) rotating said rotatable member about said second axis, such that rotational motion of said rotatable member remains substantially independent of motion of said body and at a speed substantially constant with respect to said inertial frame of reference;

(c) (i) positioning said second axis such that, during a first interval, said second axis is substantially parallel to said first axis and said rotatable member rotates about said second axis in a same direction as said body rotates about said first axis;
 (ii) determining the relative motion of said body and said rotatable member during said first interval;

(d) (i) positioning said second axis such that, during a second interval, said second axis is substantially parallel to said first axis and said rotatable member rotates about said second axis in an opposite direction as said body rotates about said first axis;
 (ii) determining the relative motion of said body and said rotatable member during said second interval;

(e) polating to determine corresponding concurrent values, for relative motion in which said body and said rotatable member rotate in said same direction, and for relative motion in which said body and said rotatable member rotate in said opposite directions; and, (f) combining said corresponding concurrent values of relative motion.

22. A method as defined in claim 21, further comprising allowing said rotatable member to freewheel after the rotational speed of said rotatable member has reached or exceeded a pre-selected speed.

23. A method as defined in claim 21, wherein said determination of said rotational motion further comprises:

(a) repeating said positioning, determining, polating and combining steps throughout a series of said first and second intervals; and, (b) extrapolating to determine combinations corresponding to present time or future times.

* * * * *